(12) United States Patent
Balog et al.

(10) Patent No.: US 12,413,071 B2
(45) Date of Patent: Sep. 9, 2025

(54) POWER QUALITY COMPENSATION SYSTEM, A POWER ELECTRONIC CONTROLLER AND CONTROL METHOD OF THE SAME

(71) Applicant: Qatar Foundation for Education, Science and Community Development, Doha (QA)

(72) Inventors: Robert S. Balog, Doha (QA); Mohammad Shadmand, Doha (QA); Morcos Metry, Doha (QA); Wesam Rohouma, Doha (QA); Miroslav Begovic, Doha (QA); Aaqib Peerzada, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 149 days.

(21) Appl. No.: 17/920,641

(22) PCT Filed: Apr. 23, 2021

(86) PCT No.: PCT/QA2021/050006
§ 371 (c)(1),
(2) Date: Oct. 21, 2022

(87) PCT Pub. No.: WO2021/215949
PCT Pub. Date: Oct. 28, 2021

(65) Prior Publication Data
US 2023/0147308 A1    May 11, 2023

Related U.S. Application Data

(60) Provisional application No. 63/023,346, filed on May 12, 2020, provisional application No. 63/014,991, filed on Apr. 24, 2020.

(51) Int. Cl.
*H02J 3/18* (2006.01)
*H02J 3/01* (2006.01)
(Continued)

(52) U.S. Cl.
CPC ............. *H02J 3/01* (2013.01); *H02J 3/1842* (2013.01); *H02J 3/1864* (2013.01); *H02J 3/12* (2013.01);
(Continued)

(58) Field of Classification Search
CPC ........ H02J 3/01; H02J 3/12; H02J 3/16; H02J 3/18; H02J 3/1821; H02J 3/1835–1864;
(Continued)

(56) References Cited

U.S. PATENT DOCUMENTS 5,691,896 A    11/1997  Zou
2010/0208500 A1    8/2010  Yan
(Continued)

OTHER PUBLICATIONS

P. Cortes et al., "Guidelines for weighting factors design in Model Predictive Control of power converters and drives," 2009 IEEE International Conference on Industrial Technology, Churchill, VIC, Australia, 2009, pp. 1-7, doi: 10.1109/ICIT.2009.4939742. (Year: 2009).*

(Continued)

*Primary Examiner* — Fred E Finch, III
(74) *Attorney, Agent, or Firm* — K&L Gates LLP

(57) ABSTRACT

A power quality compensation system and a power quality compensation method are provided. The power quality compensation apparatus includes an input filter, a power electronic converter, a controller configured to control the power electronic converter, and a plurality of inductors connected to the power electronic converter. The power quality compensation method includes receiving signals from one or more sensors configured to detect voltage and current from
(Continued)

an input side and an output side of the power quality compensation system, calculating reference signals, and using model predictive control to track the reference signals.

17 Claims, 54 Drawing Sheets

(51) Int. Cl.
  *H02M 1/44* (2007.01)
  *H02M 5/293* (2006.01)
  *H02J 3/12* (2006.01)
  *H02J 3/38* (2006.01)
  *H02M 1/00* (2006.01)
  *H02M 1/12* (2006.01)

(52) U.S. Cl.
  CPC .......... *H02J 3/381* (2013.01); *H02J 2300/26* (2020.01); *H02M 1/0054* (2021.05); *H02M 1/12* (2013.01); *H02M 1/44* (2013.01); *H02M 5/2932* (2021.05)

(58) Field of Classification Search
  CPC .... H02M 1/0048; H02M 1/0054; H02M 1/12; H02M 1/123; H02M 1/42; H02M 1/4208; H02M 1/4233; H02M 5/22; H02M 5/275; H02M 5/293–297; Y02E 40/40
  See application file for complete search history.

(56) References Cited

U.S. PATENT DOCUMENTS

| | | | |
|---|---|---|---|
| 2014/0184190 A1* | 7/2014 | Jankovic | H02P 1/42 323/311 |
| 2017/0160760 A1* | 6/2017 | Blasko | G05B 13/048 |

OTHER PUBLICATIONS

M. B. Shadmand et al., "Auto-tuning the cost function weight factors in a model predictive controller for a matrix converter VAR compensator," 2015 IEEE Energy Conversion Congress and Exposition (ECCE), Montreal, QC, Canada, 2015, pp. 3807-3814, doi: 10.1109/ECCE.2015.7310198. Retrieved Mar. 14, 2024. (Year: 2015).*
M. B. Shadmand et al., "Model Predictive Control of a Capacitor-less Matrix Converter-Based STATCOM," in IEEE Journal of Emerging and Selected Topics in Power Electronics, vol. 5, No. 2, pp. 796-808, Jun. 2017, doi: 10.1109/JESTPE.2016.2638883. Retrieved on Aug. 3, 2024. (Year: 2017).*
W. Rohouma et al., "Capacitor-less D-STATCOM for reactive power compensation," 2018 IEEE 12th International Conference on Compatibility, Power Electronics and Power Engineering (CPE-POWERENG 2018), Doha, Qatar, 2018, pp. 1-6, doi: 10.1109/CPE.2018.8372590. Retrieved Mar. 14, 2024. (Year: 2018).*
W. Rohouma et al., "D-STATCOM for a Distribution Network with Distributed PV Generation," 2018 International Conference on Photovoltaic Science and Technologies (PVCon), Ankara, Turkey, 2018, pp. 4849-4854, doi: 10.1109/PVCon.2018.8523892. Retrieved Mar. 14, 2024. (Year: 2018).*
W. Rohouma et al., "Development of a Capacitor-less D-STATCOM for Power Quality Improvement in Low Voltage Network", 2019 IEEE 13th Int. Conf. CPE-POWERENG (with conf. program), Sonderborg, Denmark, Apr. 23-25, 2019, pp. 1-5, doi: 10.1109/CPE.2019.8862419. Retrieved on Aug. 3, 2024. (Year: 2019).*
EPSMA Technical Committee, "PFC Harmonic Current Emissions—Guide to EN61000-3-2:2014", Euro. Power Supplies Manuf. Ass'n, Oxfordshire, UK, second ed., Jul. 2018. Available: https://www.epsma.org/wp-content/uploads/2021/01/PFC-Guide_03032018-3-final-7-7.pdf. [Accessed Nov. 20, 2024]. (Year: 2018).*
Extended European Search Report for related European Application No. 21791979.4; completed May 29, 2024; (17 pages).
Rohouma, et al.; Capacitor-Less D-STATCOM for Reactive Power Compensation; IEEE; 2018; (6 pages).
Hirota, et al.; "Nine Switches Matrix Converter Using Bi-Directional GaN Device"; The 2018 International Power Electronics Conference; (6 pages).
Kwak; "Four-Leg-Based Fault-Tolerant Matrix Converter Schemes Based on Switching Function and Space Vector Methods"; IEEE Transactions on Industrial Electronics; vol. 59, No. 1; Jan. 2012; (9 pages).
International Search Report for related International Application No. PCT/QA2021/050006; report dated Oct. 28, 2021; (4 pages).
Written Opinion for related International Application No. PCT/QA2021/050006; report dated Oct. 28, 2021; (4 pages).
Rohouma, et al.; D-STATCOM for harmonic mitigation in low voltage distribution network with high penetration of nonlinear loads; Renewable Energy 145; Jun. 1, 2019; (16 pages).
Shadmand, et al.; "Model Predictive Control of a Capacitor-less VAR Compensator Based on a Matrix Converter"; ECON 2014; Feb. 26, 2015; (9 pages).

* cited by examiner

Capacitor-less power quality compensation system

FIG. 42A
FIG. 42B
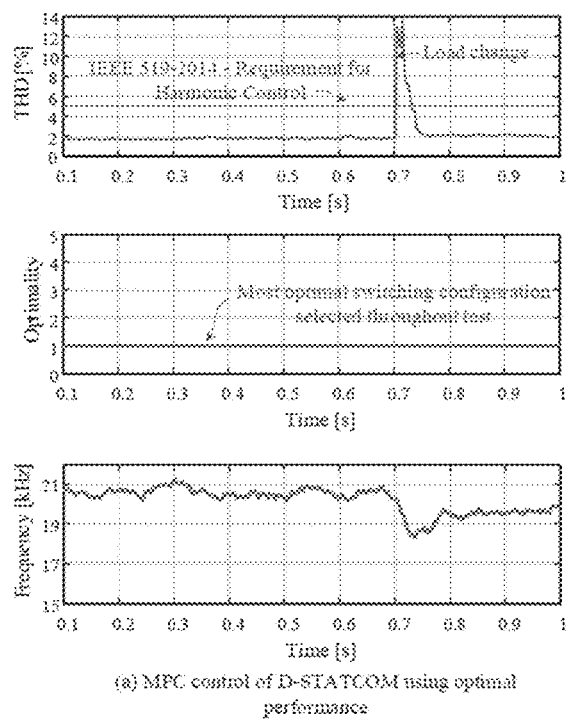
(a) MPC control of D-STATCOM using optimal performance
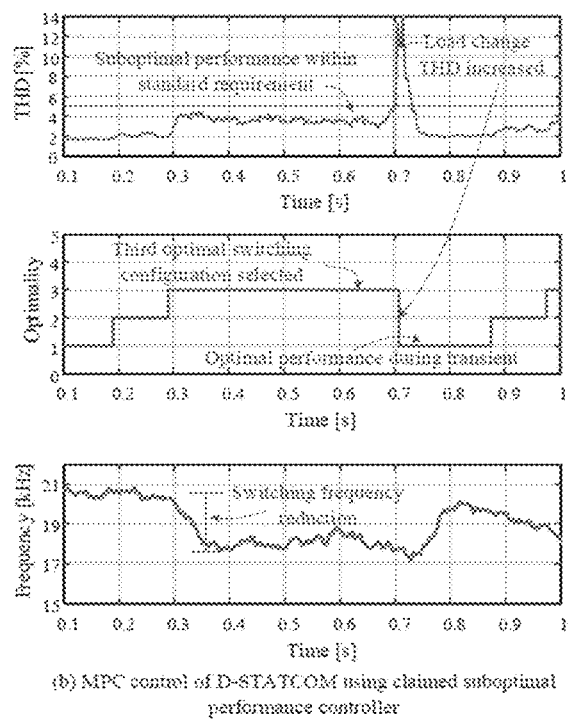
(b) MPC control of D-STATCOM using claimed suboptimal performance controller

POWER QUALITY COMPENSATION SYSTEM, A POWER ELECTRONIC CONTROLLER AND CONTROL METHOD OF THE SAME

CROSS-REFERENCE TO RELATED APPLICATIONS

The present application is a National Stage filing under 35 U.S.C. 371 of International Application No. PCT/QA2021/050006, filed on Apr. 23, 2021 which claims priority to and the benefit of U.S. Provisional Patent Application No. 63/014,991, filed Apr. 24, 2020 and U.S. Provisional Application 63/023,346, filed May 12, 2020, the disclosures of which are incorporated into this specification by reference in its entirety.

BACKGROUND

The wide application of power electronic-based loads such as variable speed drives, inverter-based home appliances, solid-state LED lights, personal electronics in distribution networks has given rise to problems related to power quality. These problems include current/voltage harmonics, voltage sag/swell, unbalance, and fluctuations. These power quality issues can have a deleterious impact on utility and consumers including increased system losses, malfunction to protection equipment and interference with other loads, damage to electrical devices. Accordingly, there is a need for an improved power quality compensation system, controller and/or control method to address these issues.

SUMMARY

The present disclosure generally relates to a power quality compensation system, a power electronic controller and control method of the same.

In light of the present disclosure, and without limiting the scope of the disclosure in any way, in an aspect of the present disclosure, which may be combined with any other aspect listed herein unless specified otherwise, a power quality compensation apparatus is provided. The power quality compensation apparatus includes a matrix converter, a controller configured to control the matrix converter, and a plurality of inductors connected to the matrix converter. The controller is configured to use model predictive control to control the matrix converter.

In an aspect of the present disclosure, which may be combined with any other aspect listed herein unless specified otherwise, the matrix converter includes at least three phase-legs.

In an aspect of the present disclosure, which may be combined with any other aspect listed herein unless specified otherwise, each phase-leg of the matrix converter includes three bidirectional switches.

In an aspect of the present disclosure, which may be combined with any other aspect listed herein unless specified otherwise, the bidirectional switches each includes two insulated-gate bipolar-transistor (IGBT) diode pairs.

In an aspect of the present disclosure, which may be combined with any other aspect listed herein unless specified otherwise, the two insulated-gate bipolar-transistor (IGBT) diode pairs are connected in anti-parallel to support bidirectional current flow.

In an aspect of the present disclosure, which may be combined with any other aspect listed herein unless specified otherwise, the matrix converter includes four phase-legs.

In an aspect of the present disclosure, which may be combined with any other aspect listed herein unless specified otherwise, the controller switches to a redundant phase-leg when the controller detects fault.

In an aspect of the present disclosure, which may be combined with any other aspect listed herein unless specified otherwise, one of the four phase-legs includes three bidirectional switches and is configured to provide fault tolerance.

In an aspect of the present disclosure, which may be combined with any other aspect listed herein unless specified otherwise, the power quality compensation apparatus is connected to a bus power line through an input filter.

In an aspect of the present disclosure, which may be combined with any other aspect listed herein unless specified otherwise, the input filter is configured to eliminate switching frequency and harmonics from a grid.

In an aspect of the present disclosure, which may be combined with any other aspect listed herein unless specified otherwise, the power quality compensation apparatus is configured to provide reactive power compensation.

In an aspect of the present disclosure, which may be combined with any other aspect listed herein unless specified otherwise, the power quality compensation apparatus is configured to provide harmonic power compensation.

In an aspect of the present disclosure, which may be combined with any other aspect listed herein unless specified otherwise, the power quality compensation apparatus is configured to provide bus voltage regulation.

In an aspect of the present disclosure, which may be combined with any other aspect listed herein unless specified otherwise, the model predictive control includes a cost function.

In an aspect of the present disclosure, which may be combined with any other aspect listed herein unless specified otherwise, the controller is configured to perform auto-tuning on weight factors for multi-objective control.

In an aspect of the present disclosure, which may be combined with any other aspect listed herein unless specified otherwise, the controller is configured to perform auto-tuning on cost function weighting factors for maximum power point tracking.

In an aspect of the present disclosure, which may be combined with any other aspect listed herein unless specified otherwise, the controller is configured to adjust switching frequency and reduce switching loss.

In an aspect of the present disclosure, which may be combined with any other aspect listed herein unless specified otherwise, the controller is configured to adjust fidelity to improve reliability of a power converter.

In an aspect of the present disclosure, which may be combined with any other aspect listed herein unless specified otherwise, a power quality compensation method is provided. The power quality compensation method includes receiving, by the controller, signals from one or more sensors configured to detect voltage and current from an input side and an output side of the power quality compensation system, calculating reference signals, and using model predictive control to track the reference signals.

In an aspect of the present disclosure, which may be combined with any other aspect listed herein unless specified otherwise, the controller is based on a finite-set model predictive control to minimize a cost function, and the cost function includes multiple terms each including an adjustable weighting function.

The reader will appreciate the foregoing details, as well as others, upon considering the following detailed description of certain non-limiting embodiments of the power quality compensation system, controller and control method of the same according to the present disclosure.

BRIEF DESCRIPTION OF THE DRAWING

Features and advantages of the power quality compensation system, controller and control method described herein may be better understood by reference to the accompanying drawing in which:

FIG. 35A shows power waveform for the experimental setup running the present technology; FIG. 35B shows power waveform calculated from a ten-minute portion of the test measurements for the experimental setup running Incremental conductance MPPT. The waveform in FIG. 35A shows better performance, lower settling time, lower steady-steady error and less oscillations than FIG. 35B.

FIG. 36 shows that energy capturing improvement is scalable the longer the period for a whole PV farm.

FIG. 42A and FIG. 42B include diagrams illustrating a capacitor-less D-STATCOM example showing source current THD on top, the optimality of the switching configuration with '1' being the most optimal configuration, and the switching frequency according to an embodiment of the present disclosure. FIG. 42A illustrates the system controlled using the standard MPC controllers that optimizes fidelity and selects the most optimal switching configuration for each sampling time. The THD is 2% which is much lower than the standard. The output of optimal fidelity is high switching frequency of 20 kHz; and FIG. 42B illustrates the system controlled using the present technology that optimizes fidelity and switching loss by operating on suboptimal switching configurations. As can be seen selecting the third optimal switching configuration, switching frequency is reduced to 18 kHz while operating at a THD lower than recommended standard.

Figure 1:
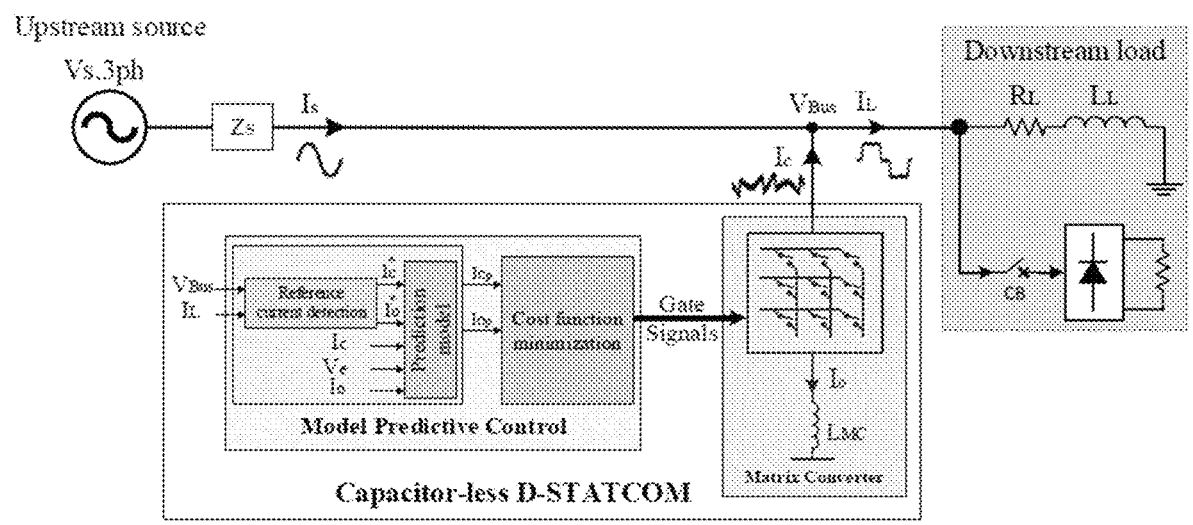
FIG. 1 is a schematic illustration of a capacitor-less power quality compensation system according to an embodiment of the present disclosure.

The reader will appreciate the foregoing details, as well as others, upon considering the following detailed description of certain non-limiting embodiments according to the present disclosure.

DETAILED DESCRIPTION

The present disclosure generally relates to a power quality compensation system, a power electronic controller and a control method of the same.

The embodiments are described more fully hereinafter with reference to the accompanying drawings, in which some, but not all embodiments of the present technology are shown. Indeed, the present technology may be embodied in many different forms and should not be construed as limited to the embodiments set forth herein.

Likewise, many modifications and other embodiments of the power quality compensation system, controller and control method of the same described herein will come to mind to one of skill in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in an embodiment" as used herein does not necessarily refer to the same embodiment or implementation and the phrase "in another embodiment" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The terminology used herein is for the purpose of describing particular example embodiments only and is not intended to be limiting. The terms "comprise", "comprises", "comprised" or "comprising", "including" or "having" and the like in the present specification and claims are used in an inclusive sense, that is to specify the presence of the stated features but not preclude the presence of additional or further features.

One of the purposes of the present technology is to correct poor power quality in a low-voltage electrical distribution system. The low-voltage electrical distribution system is the "last mile" where the customer connects to the electrical utility system. Because of the large number of connections and equipment in these low-voltage electrical distribution systems, the utility often lacks information about the power quality in these systems, and thus hardly control and/or improve the power quality.

The present disclosure provides a power quality compensation system, a power electronic controller and a control method of the same configured to overcome the limitations in the conventional electrical power system, and to a safer, more reliable electrical distribution system. For example, the present disclosure addresses two types of power quality: reactive power and harmonic power within one grid-edge device. The reactive power can be typically absorbed by inductive loads, and can be filtered out using shunt capacitors to changes in the voltage of the distribution system.

In the conventional technology, the power quality correction is based on Voltage Source Converters (VSC) which requires electrolytic capacitors (e-caps) to store the needed energy. However, e-caps are regarded as the weak-link components of a power electronic system, and severely restrict the overall service life of a power electronic device. The present disclosure provides a cap-less-power quality compensation (Capacitor-less-PQC) technology that is a superior solution for power quality mitigation especially in in hot and/or humid environments. This present technology uses inductors to store the energy instead of the failure-prone e-caps in combination with a matrix converter using model predictive control (MPC-MC). Inductors are known to be robust and reliable, but inductors also consume reactive power which is the opposite behavior of the capacitor. The present technology interfaces an inductor bank to the power grid via a direct matrix converter (MC). Model predictive control (MPC) is used control the direct matrix converter so that the phase of the input and output current is inverse. Thus, the inductors supply, through the MC, reactive power into the electricity grid and emulate the behavior of the capacitor without introducing the reliability limitations of the capacitor. Similarly, harmonic power is injected into the distribution system to cancel harmonic power generated by loads. As a result, power quality compensation by this present technology is achieved using reliable and robust technology and is capable of providing long service life even in austere environments such as Qatar, the countries of the Gulf Cooperation Council (GCC) and/or similar regions.

According to an embodiment of the present disclosure, a power quality compensation system is provided. FIG. 1 is a schematic illustration of a capacitor-less power quality compensation system according to an embodiment of the present disclosure. The capacitor-less power quality compensator (Capacitor-less-PQC) system as illustrated in FIG. 1 is fault-tolerant and is configured to provide power quality compensation (PQC) that include reactive power compensation, harmonic mitigation and voltage support and regulation in the distribution network. The capacitor-less power quality compensator system enables the use of inductive energy storage instead of electrolytic capacitors so that the compensator can meet the expectations of long service life, and hence can increase system reliability and decrease the operation and maintenance cost.

The Capacitor-less-PQC system includes a matrix converter (MC) and a power electronic controller based on finite control set model predictive control (FCS-MPC). The FCS-MPC control the MC to make sure that the converter provides the required compensation to the system. The FCS-MPC enables the use of multiple objectives in the cost function to perform different tasks including current tracking and losses minimization. As a result, the power quality compensation is achieved without using capacitors.

Figure 2:
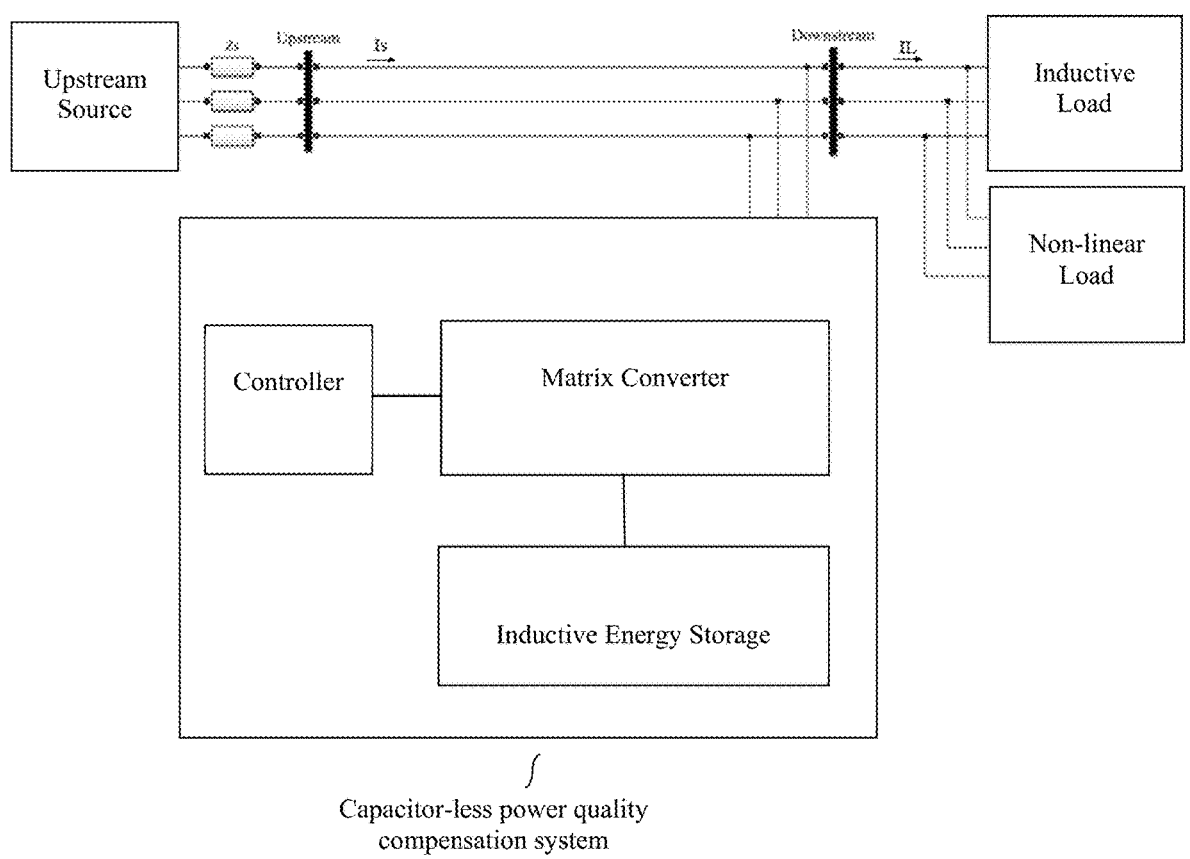
FIG. 2 is a block diagram of a capacitor-less power quality compensation system according to an embodiment of the present disclosure.
Figure 3:
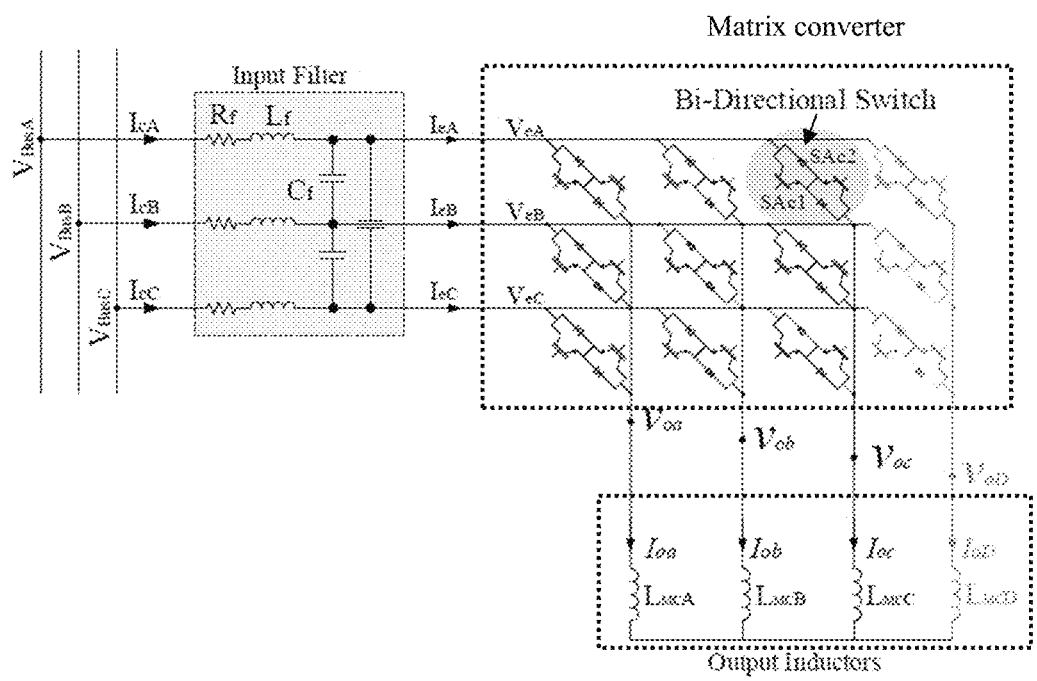
FIG. 3 is a schematic illustration of a four phase-leg matrix converter according to an embodiment of the present disclosure. Without loss of generality, the matrix converter may include a plurality of phase-legs. In an embodiment of a three-phase converter, phase legs beyond three may be used for redundancy and fault-tolerant operation. For example, the fourth phase-leg as illustrated in FIG. 3 (grey) is used for redundancy and fault-tolerant operation.

FIG. 2 is a block diagram of capacitor-less power quality compensation system according to an embodiment of the present disclosure. The capacitor-less power quality compensation system as illustrated in FIG. 2 may be based on a four phase-leg matrix converter topology. Each phase-leg includes three bidirectional switches each including two insulated-gate bipolar-transistor (IGBT) and diode pairs connected in anti-parallel to support bidirectional current flow as shown in FIG. 3. The fourth phase-leg (as illustrated in FIG. 3 in grey) may be used during faults to provide the fault-tolerant capability of the converter for more reliable operation. The Capacitor-less-PQC is connected to the bus through an input filter $L_f$, $C_f$, $R_f$, which is used to eliminate switching-frequencies and harmonics from propagating to the rest of the distribution network.

According to an embodiment of the present disclosure, a number of phase-legs in the power electronic converter is more than a number of input phases. For example, the matrix converter may includes four or more phase-legs.

The output voltages and input currents of the MC are calculated according to equations (1) and (2) as a function of MC input voltages, output currents and the switching function. The inductive load constrains the switching to avoid interruption of MC output current. The voltage-source input constrains the switching to avoid shorting the input phases given in equation (3) below.

$$\begin{bmatrix} V_{oa} \\ V_{ob} \\ V_{oc} \end{bmatrix} = \begin{bmatrix} S_{Aa} & S_{Ba} & S_{Ca} \\ S_{Ab} & S_{Bb} & S_{Cb} \\ S_{Ac} & S_{Bc} & S_{Cc} \end{bmatrix} \cdot \begin{bmatrix} V_{SA} \\ V_{SB} \\ V_{SC} \end{bmatrix} \quad (1)$$

$$\begin{bmatrix} I_{inA} \\ I_{inB} \\ I_{inC} \end{bmatrix} = \begin{bmatrix} S_{Aa} & S_{Ab} & S_{Ac} \\ S_{Ba} & S_{Bb} & S_{Bc} \\ S_{Ca} & S_{Cb} & S_{Cc} \end{bmatrix} \cdot \begin{bmatrix} I_{oa} \\ I_{ob} \\ I_{oc} \end{bmatrix} \quad (2)$$

$$S_{Aj} + S_{Bj} + S_{Cj} = 1 \quad (3)$$

where $V_{oa}(t)$, $V_{ob}(t)$ and $V_{oc}(t)$, $I_{oa}(t)$, $I_{ob}(t)$, $I_{oc}(t)$ and $I_{oD}(t)$ are the output voltages and currents of the matrix converter respectively. While, $V_{BusA}(t)$, $V_{BusB}(t)$ and $V_{BusC}(t)$, $I_{cA}(t)$, $I_{cB}(t)$ and $I_{cC}(t)$ are the input voltages and currents of the matrix converter, and Sij(t) is the switching function between the MC input phase with i∈[A, B, C], and the MC output phase with j∈[a, b, c]. Proper choice of S will lead to a phase-reversal of the current so that the inductive load appears capacitive at the input to the MC to supply reactive power to the network. If there is a fault in the system, the faulty leg will be disabled and the replaced with the redundant fourth leg in less-than 20 ms.

The performance of the Capacitor-less-PQC may depend on the reference current detection method and the control strategy. The synchronous rotating reference frame (SRF) method has been adopted for reference current detection, while FCS-MPC is used to control the converter. To detect the load current harmonics, the load currents and voltages are measured, filtered, and reference currents are extracted according to the synchronous reference frame (SRF) method. SRF theory is based on the transformation of currents in synchronously rotating d-q frame. The transformation to the d-q reference frame from the ABC reference frame is given in equation (4) below.

$$\begin{bmatrix} Id \\ Iq \\ I0 \end{bmatrix} = \sqrt{\frac{2}{3}} \begin{bmatrix} \cos(\omega t) & \cos(\omega t - 2\pi/3) & (\omega t + 2\pi/3) \\ -\sin(\omega t) & -\sin(\omega t - 2\pi/3) & -\sin(\omega t + 2\pi/3) \\ 1/\sqrt{2} & 1/\sqrt{2} & 1/\sqrt{2} \end{bmatrix} \cdot \begin{bmatrix} I_{LA} \\ I_{LB} \\ I_{Lc} \end{bmatrix} \quad (4)$$

Figure 4:
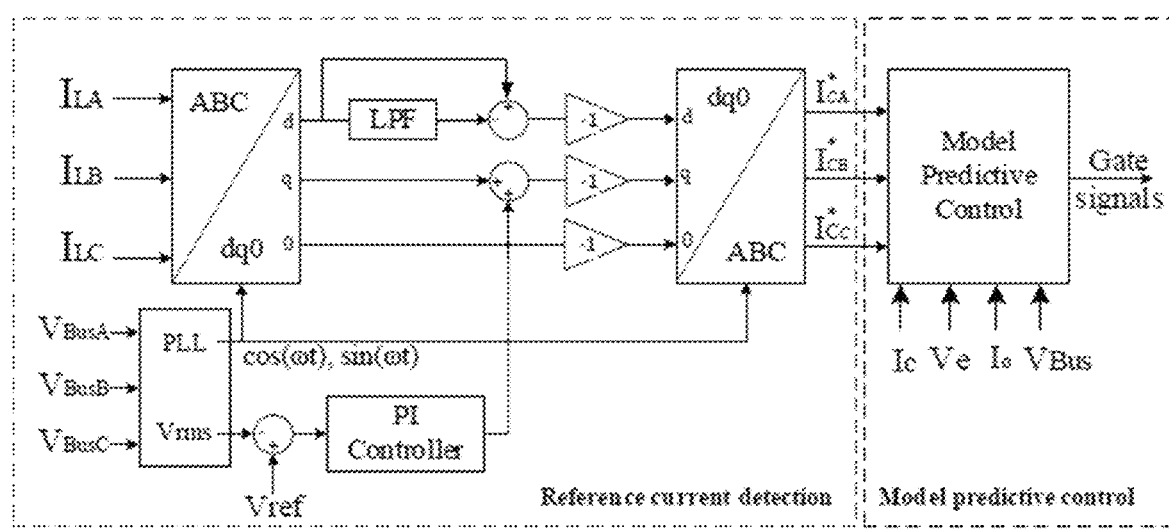
FIG. 4 is block diagram of a synchronous reference frame (SRF) reference current detection method according to an embodiment of the present disclosure.

The block diagram of the SRF method is shown in FIG. 4. The three-phase load current is measured then transformed to the dq0 reference frame to extract the active and reactive current components of the load current; the new components consist of DC part that represents the fundamental component of the current and the AC part that represent the harmonics. Using a high pass filter (HPF), the harmonic component can be extracted and then transformed back to the ABC reference frame to be used as a reference current for the controller.

The output currents, of the MC shown in FIG. 3, are modeled using the per-phase differential equation (5) below.

$$L_{MCj} \frac{di_{oj}(t)}{dt} = v_{oj}(t) - R_{L_{MCj}} i_{oj}(t) \quad (5)$$

where $v_{oj}$ is the per-phase output voltage of the MC, $i_{oj}$ is the per phase output current of the MC, $L_{MCj}$ and RMCj is the per-phase inductance and parasitic resistance of the output chokes. To make the model compatible with the MPC formulation, the continuous-time derivative in (5) is approximated using the forward Euler method for each $k^{th}$ discrete sample time steps:

$$\frac{di_{oj}(t)}{dt} \approx \frac{i_{oj}(k+1) - i_{oj}(k)}{T_S} \quad (6)$$

From equations (5) and (6), the discrete-time model estimates the current at the next sample (k+1) is given as $$i_{oj}^p(k+1) = \left(1 - \frac{R_{L_{MCj}} T_s}{L_{MCj}}\right) i_{oj}(k) + \frac{T_s}{L_{MCj}} v_{oj}(k) \quad (7)$$

Input filters are required in power electronics converters to eliminate the high-order harmonics generated by converter switching to going back to the supply. The input filter as shown in FIG. 4 can be represented using Kirchoff's voltage and current equations as:

$$V_{Busi}(t) = R_{fi}i_{ci}(t) + L_{fi}\frac{d}{dt}i_{ci}(t) + V_{ei}(t) \quad (8)$$

$$i_{ci}(t) = i_{ei}(t) + C_{fi}\frac{d}{dt}V_{ei}(t) \quad (9)$$

where $V_{Bus}$, $V_{ei}$ are the per-phase input and output voltages of the filter and $i_{ci}$ and $i_{ei}$ are the input and output currents of the filter, $R_{fi}$ is the per-phase parasitic resistance of the input inductors. The state-space model of the filter can be written as:

$$\begin{bmatrix} V_{ei}^*(t) \\ i_{ci}^*(t) \end{bmatrix} = A_c \begin{bmatrix} V_{ei}(t) \\ i_{ci}(t) \end{bmatrix} + B_c \begin{bmatrix} V_{Busi}(t) \\ i_{ei}(t) \end{bmatrix} \quad (10)$$

$$\begin{bmatrix} V_{ei}^*(t) \\ i_{ci}^*(t) \end{bmatrix} = \underbrace{\begin{bmatrix} 0 & \frac{1}{C_f} \\ -\frac{1}{L_f} & -\frac{R_f}{L_f} \end{bmatrix}}_{A_c} \begin{bmatrix} V_{ei}(t) \\ i_{ci}(t) \end{bmatrix} + \underbrace{\begin{bmatrix} 0 & -\frac{1}{C_f} \\ \frac{1}{L_f} & 0 \end{bmatrix}}_{B_c} \begin{bmatrix} V_{Busi}(t) \\ i_{ei}(t) \end{bmatrix} \quad (11)$$

Finally, the discrete model of the input filter using zero-order hold and sample time $T_s$ is given by:

$$\begin{bmatrix} V_{ei}(k+1) \\ i_{ci}(k+1) \end{bmatrix} = A_c \begin{bmatrix} V_{ei}(k) \\ i_{ci}(k) \end{bmatrix} + B_c \begin{bmatrix} V_{Busi}(k) \\ i_{ei}(k) \end{bmatrix} \quad (12)$$

$$A_c = e^{A_c T_s} \text{ and } B_c \int_0^{T_s} e^{A_C(T_s-\tau)} B_c d\tau \quad (13)$$

The system structure with the FCS-MPC is illustrated in FIG. 1. One of the objectives here is to control input current of the converter so it will track the reference current, the reactive input power and output currents of the MC. The input reactive power and the input current of the converter can be written in orthogonal coordinates as:

$$Q^p(k+1) = V_{Bus\beta}(k)i_{c\alpha}(k) - V_{Bus\alpha}(k)i_{c\beta}(k) \quad (14)$$

$$cn^P(k+1) = A_{q(2,1)}V_{en}(k) + A_{q(2,2)}i_{cn}(k) + B_{q(2,1)}V_{Busn}(k) + B_{q(2,2)}i_e(k) \quad (15)$$

where $\alpha$ and $\beta$ are the real and imaginary components of the associated voltage and current vectors. $i_{cm}^P(k+1)$ is the predicted value of the PQC input current for the sampling interval (k+1).

The cost function J is given as $$J = \lambda_1(|I_{cA}^P - i^*_{cA}| + |I_{cB}^P - i^*_{cB}| + |I_{cC}^P - i^*_{cC}|) + \lambda_2(|I_{oa}^P - i^*_{oa}| + |I_{ob}^P - i^*_{ob}| + |I_{oc}^P - i^*_{oc}|) \quad (16)$$

where J is the cost function and $I_{cA}$, $I_{cB}$ and $I_{cC}$ are the MC input currents, $I_{oa}$, $I_{ob}$ and $I_{oc}$ is the MC output currents. The weight factors $\lambda_1$, $\lambda_2$ are adjusted to priorities the different parts of the cost function.

Figure 5:
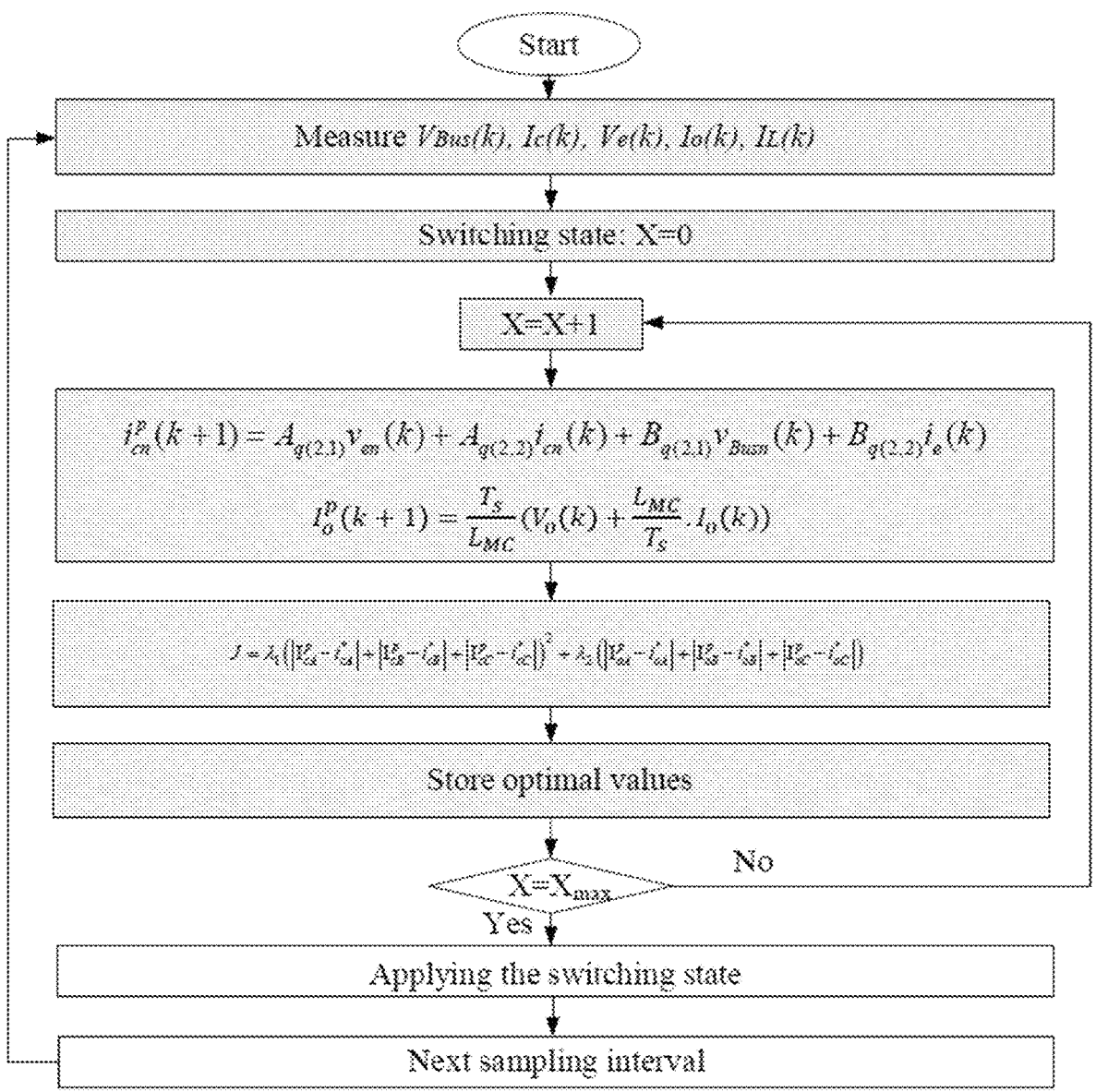
FIG. 5 is a flow chart of a model predictive controller for power quality compensation according to an embodiment of the present disclosure.

The MPC flowchart for the PQC is shown in FIG. 5. In this flow chart, the first step is the measurement step where the measurements of the three-phase bus voltage, load current, matrix converter output choke current, matrix converter input voltages and currents are performed. The second step is a prediction. In this step, the controller will perform the prediction and cost function calculation for all the possible states. Weight factors $\lambda_1$, and $\lambda_2$ are the parameters that are tunned to control the PQC performance. These factors are automatically tunned to provide the required compensation.

The present technology has a various applications. Table 1 is a summary of Distribution Static Compensator (D-STATCOM) in the various applications. It should be understood that the use cases in Table 1 should not be construed as limiting the potential uses.

TABLE 1

Use Cases of D-STATCOM

1- Reactive Power Compensation at perimeter bus:

1.1 D-STATCOM at a perimeter bus, with one or more device(s) using other compensation technologies.
1.2 D-STATCOM at a perimeter bus without any other compensation device(s) of different technology.

2- Reactive Power Compensation at arbitrary bus:

2.1 D-STATCOM at an arbitrary bus, coordinated with one or more device(s) using other compensation technologies.
2.2 D-STATCOM at an arbitrary bus without any other compensation device(s) of different technology.

3- PV integration:

3.1 One or more D-STATCOM(s) coordinated with one or more device(s) using other compensation technologies.
3.2 One or more D-STATCOM(s) without any other compensation device(s) of different technology.

4- Remote compensation:

4.1 One or more D-STATCOM(s) added to one ore more arbitrary bus(es), coordinated with one or more devices using other compensation technology.
4.2 One or more D-STATCOM(s) added to one ore more arbitrary bus(es), without any other compensation device(s) of different technology, 5- Harmonic power compensation:

5.1 One or more D-STATCOM(s) coordinated with one or more device(s) using other compensation technologies.
5.2 One or more D-STATCOM(s) without any other compensation device(s) of different technology.

A Capacitor-less-PQC is configured to provide dynamic reactive power support without using capacitors as energy storage. Thus the technology solves the known reliability problems and eliminates the wear-out mechanisms and failure modes of the conventional technology. Reactive power compensation is needed to improve the operation and efficiency of the electrical distribution system. The Capacitor-less-PQC is connected to a bus (electrical node in the system) that contains a load to be compensated. The Capacitor-less-PQC can be operated such that it ensures unity power factor, by perfectly compensating the load (unity power factor) based on locally sensing the load characteristics, or it can receive a setpoint command from a central system operator. The latter allows centralized control of one or more Capacitor-less-PQC in a coordinated way.

Example Applications

Without loss of generality or overly narrowing the present technology, the following provides a possible application example to illustrate the operation of the present technology.

In this example, 7.5 KVA Capacitor-less-PQC based matrix converter as shown in FIG. 1 and FIG. 2 is used to provide dynamic reactive power support to utility grid. The experimental setup includes the upstream side (12 KVA three-phase grid simulator NHR-9410) that emulate utility grid, the downstream side is an electronic load (Cinergia 15

Figure 6:
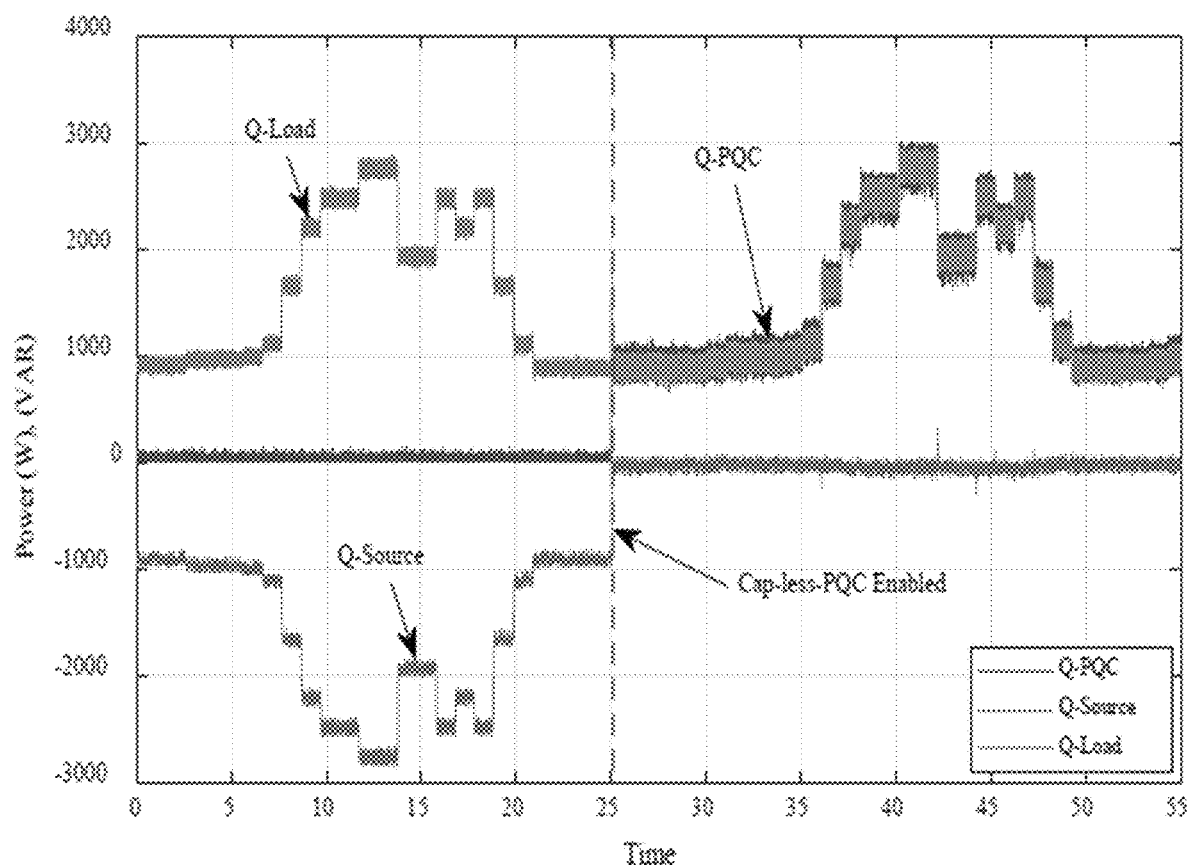
FIG. 6 is a diagram illustrating load reactive power (Q-Load), source reactive power (Q-source) and PQC reactive power (Q-PQC) before and after Capacitor-less-PQC is connected to a system according to an embodiment of the present disclosure.
Figure 7:
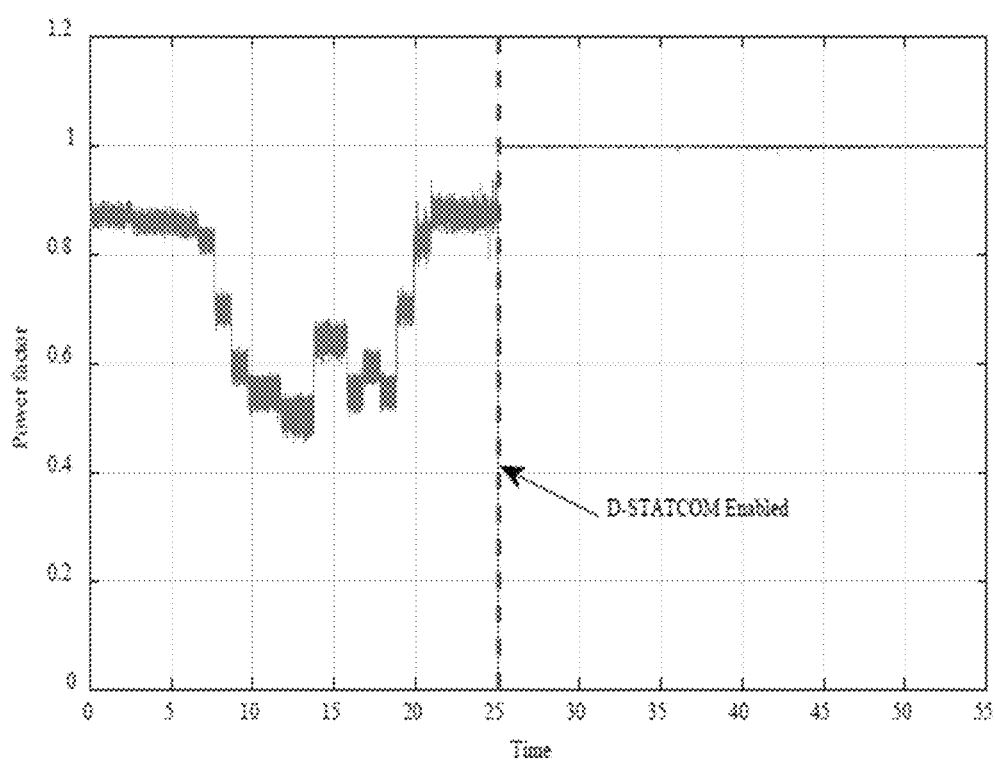
FIG. 7 is a diagram illustrating the power factor before and after Capacitor-less-PQC is connected to a system according to an embodiment of the present disclosure.
Figure 8:
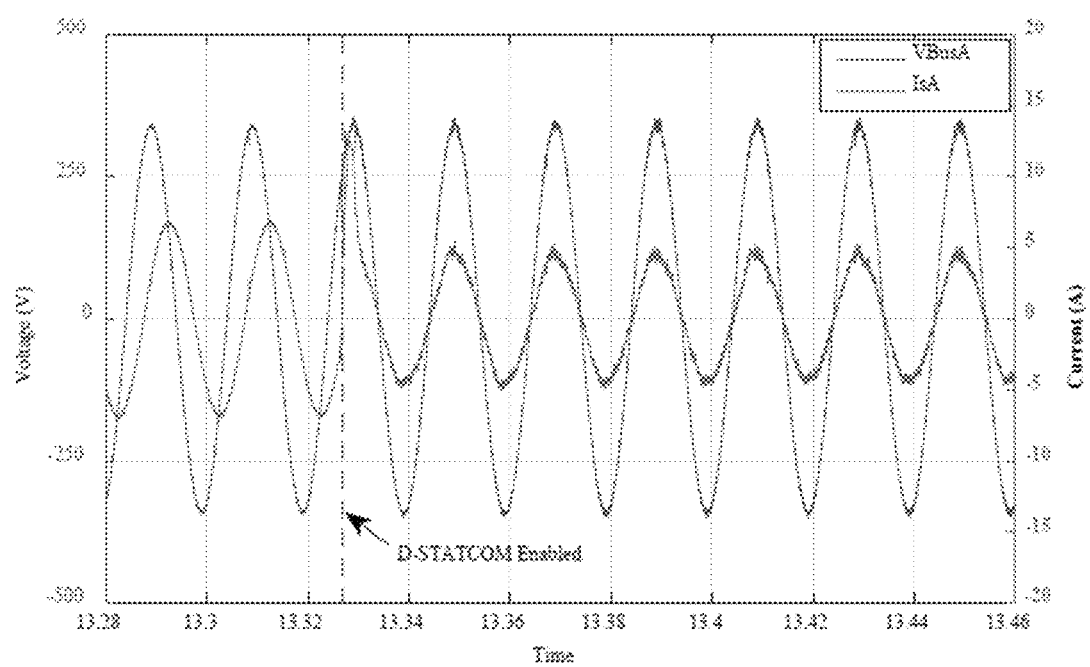
FIG. 8 is a diagram illustrating experimental results of upstream phase voltage ($V_{BusA}$) and current ($I_{sA}$) according to an embodiment of the present disclosure. After the Capacitor-less-PQC is enabled the source current is in-phase with the source voltage.
Figure 9:
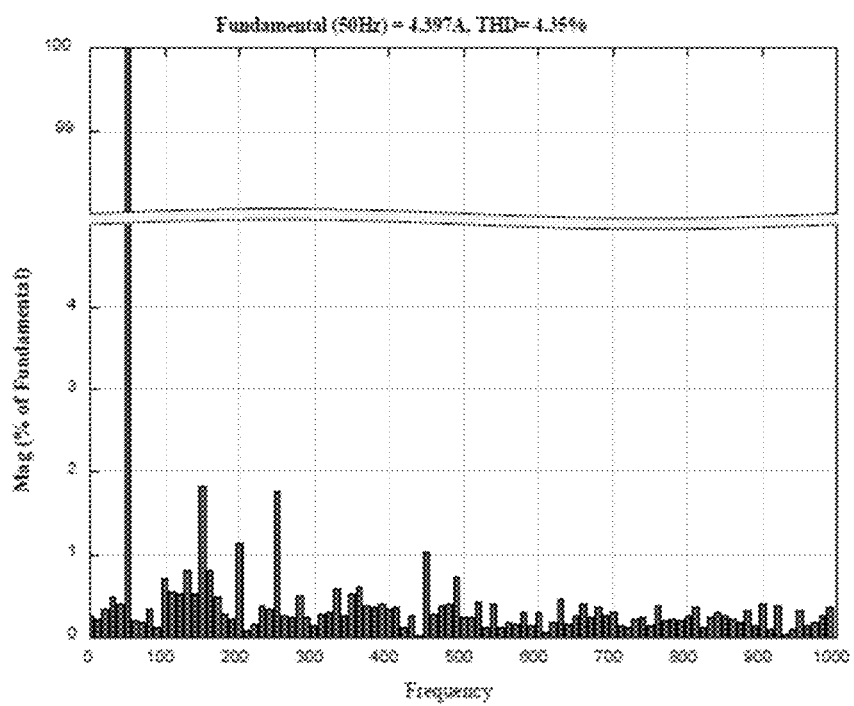
FIG. 9 is a diagram illustrating experimental results of source current spectral analysis ($I_{sA}$) after Capacitor-less-PQC is connected to a system according to an embodiment of the present disclosure.
Figure 10:
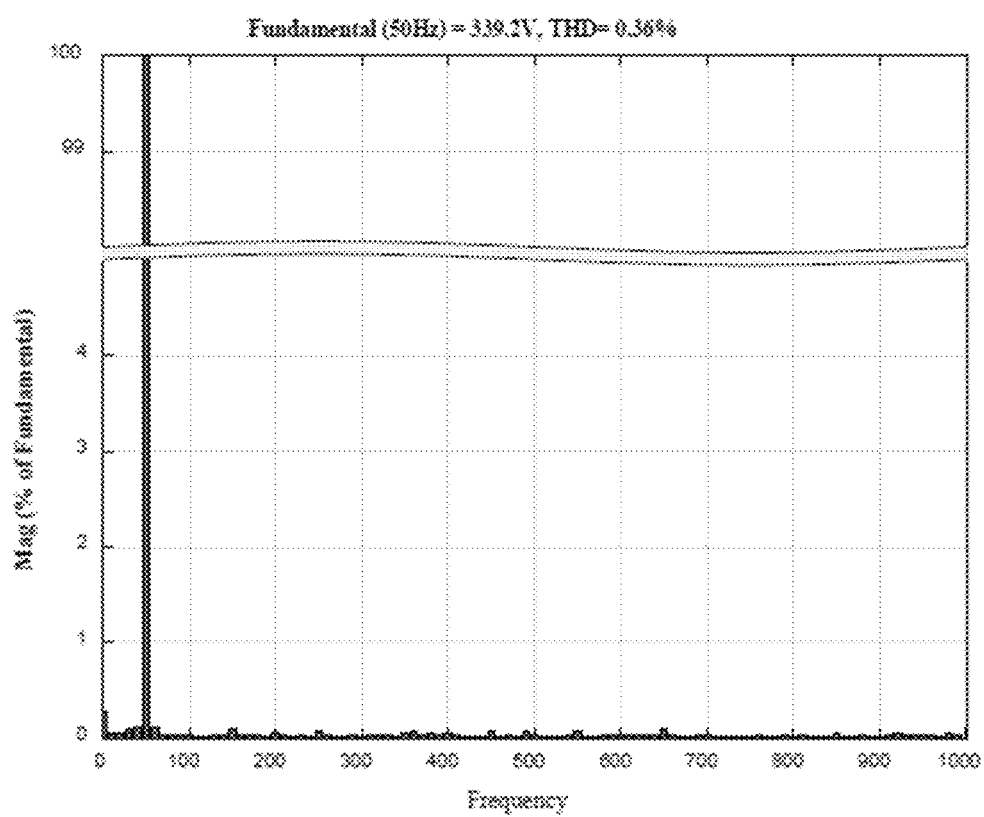
FIG. 10 is a diagram illustrating experimental results of upstream voltage spectral analysis ($V_{sA}$) after Capacitor-less-PQC is connected to a system according to an embodiment of the present disclosure.

KVA) to emulates dynamic load, Capacitor-less-PQC based 7.5 KVA matrix converter unit, with three-phase inductors connected at its output side, and control platform (dSPACE Scalexio) to control the entire system. Experimental results for reactive power compensation for time-varying local loads are shown in FIG. 6 and FIG. 7. As shown in FIG. 6 and FIG. 7, before connecting the Capacitor-less-PQC, the source supplies all the reactive power required by the load, and the power factor was changing as the load vary in FIG. 7. After the Capacitor-less-PQC is connected, it is obvious that source reactive power dropped to zero while the Capacitor-less-PQC reactive power and the load are almost equal, and as a result, the source power factor becomes unity regardless to the change in load power as in FIG. 7. FIG. 8 shows the experimental results of the supply voltage and current of phase (A) measured in volt and ampere respectively. Initially, the supply current is lagging the voltage with a power factor of 0.45, three-phase load reactive power is 3000 VAR. When the Capacitor-less-PQC is enabled at 13.328 s, it starts to provide reactive power to the network to keep the source current and voltage in phase and keep the power factor near unity. Finally, FIG. 9 and FIG. 10 show the spectrum analysis of the upstream voltage and current after the connection of Capacitor-less-PQC to the PCC. It can be seen, that both the voltage and current THD are within the accepted range according to the recommendation of IEEE 519 standard. Table 2 lists the system parameters using in this example.

TABLE 2

System Parameters

| PARAMETER | VALUE |
| --- | --- |
| Voltage, VLN, rms | 240 V |
| Frequency | 50 Hz |
| Reactive Power Q (3-ph) | 900-3000 VAR |
| Active power P (3-ph) | 1200 W |
| Power Factor p.f | 0.45-1 |
| Output chokes inductance LMC | 36 mH |
| Input filter resistance Rf | 2 Ω |
| Input filter inductance L | 1 mH |
| Input filter capacitor Cf/phase | 12 uF |
| Sampling time Ts | 30 us |
| Weight factor λ1 | 1 |
| Weight factor λ2 | 0.2 |

According to an embodiment of the present disclosure, the Capacitor-less-PQC is configured to provide harmonic power compensation without using capacitors as energy storage. Thus the technology solves the known reliability problems and eliminates the wear-out mechanisms and failure modes of existing technology. Harmonic power compensation is needed to improve the operation and efficiency of the electrical distribution system. One of the issues in the distribution system is harmonic distortion, which can have deleterious effects on utility grid including increased system losses, malfunction to other equipment and interference with other loads, or outright damage to electrical devices. Harmonic power in the distribution system is restricted by various U.S. and/or international standards to ensure safe and reliable operation of the entire system. Thus harmonic power compensation is needed. As energy-efficient appliances and devices become more widespread, the unintended consequence is an increase in harmonic power from these non-linear loads. The Capacitor-less-PQC is connected to a bus (electrical node in the system) that contains a load to be compensated. The Capacitor-less-PQC can be operated such that it adjusts to the local characteristics, and it can receive a set point command from a central system operator. The latter allows centralized control of one or more Capacitor-less-PQC in a coordinated way.

Without loss of generality or overly narrowing the present technology, the following provides a possible application example to illustrate the operation of the present technology.

In this example, 7.5 KVA Capacitor-less-PQC based matrix converter as shown in FIG. 1 and FIG. 2 will be used to provide harmonics compensation at a local bus. The experimental setup includes the upstream side (12 KVA three-phase grid simulator NHR-9410) that emulates utility grid, the downstream side is a linear and non-linear loads that is emulated using three-phase rectifier, Capacitor-less-PQC based 7.5 KVA matrix converter unit, with three-phase inductors connected at its output side, and control platform (dSPACE Scalexio) to control the entire system. Experimental results of the performance of the Capacitor-less-PQC for harmonics compensation for heavy and light non-linear loads is presented below.

Experimental Results of Heavy Non-Linear Load (Three-Phase Rectifier Only)

Figure 11:
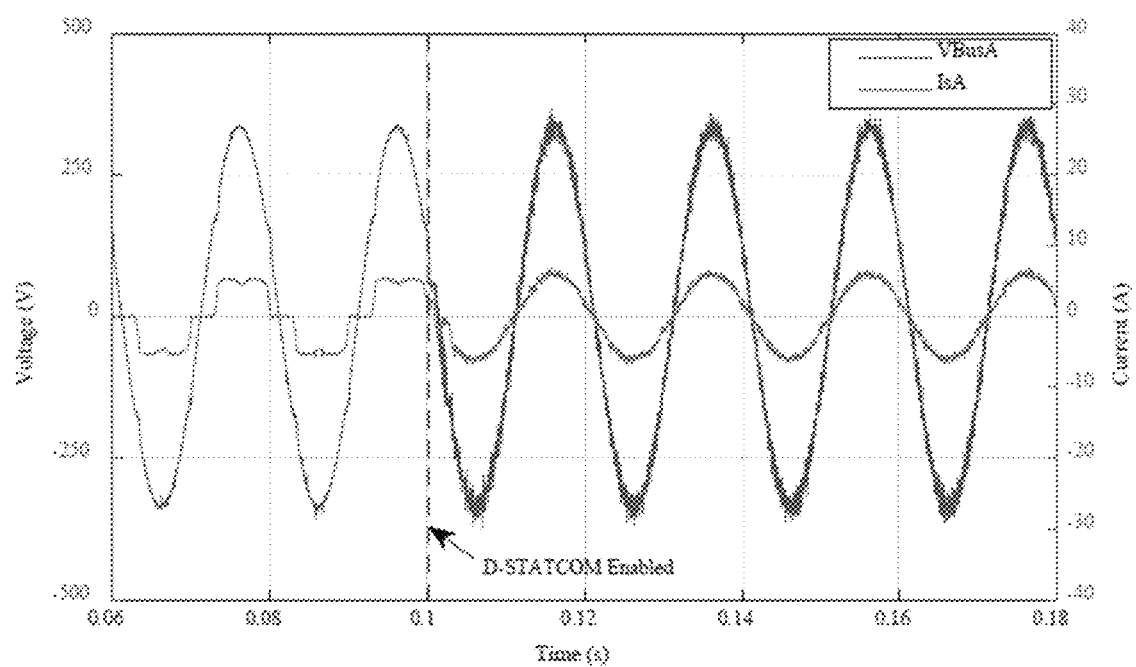
FIG. 11 is a diagram illustrating experimental results of upstream phase voltage ($V_{BusA}$) and current ($I_{sA}$) according to an embodiment of the present disclosure. After the Capacitor-less-PQC is enabled the source current is in-phase with the source voltage and distortion free.
Figure 12:
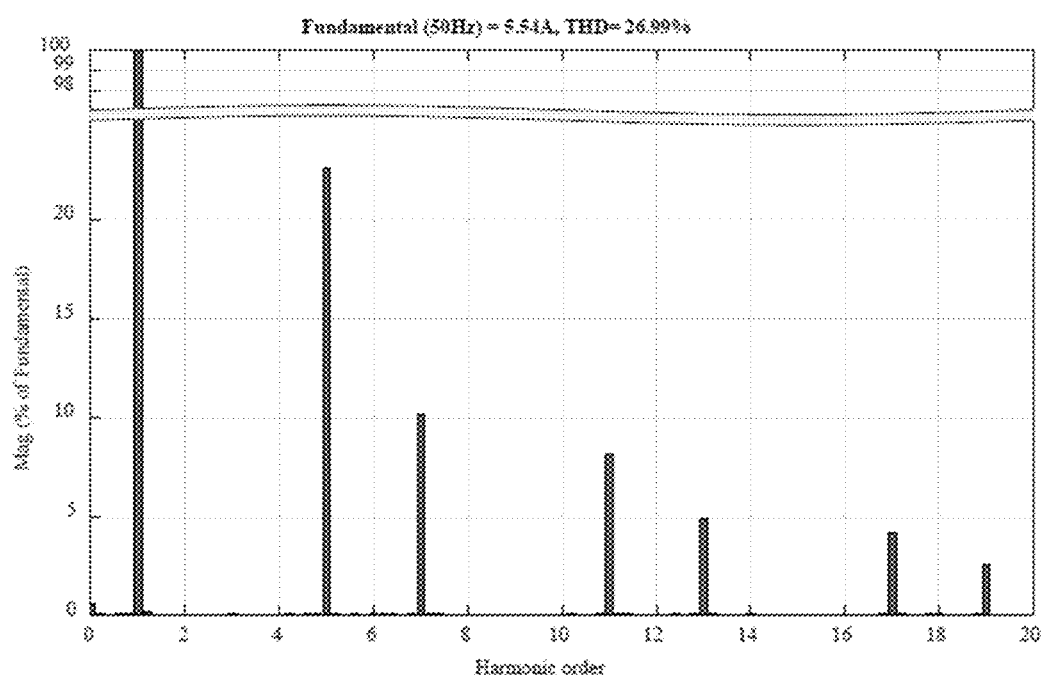
FIG. 12 is a diagram illustrating experimental results of source current spectral analysis ($I_{sA}$) before Capacitor-less-PQC is connected to a system according to an embodiment of the present disclosure.
Figure 13:
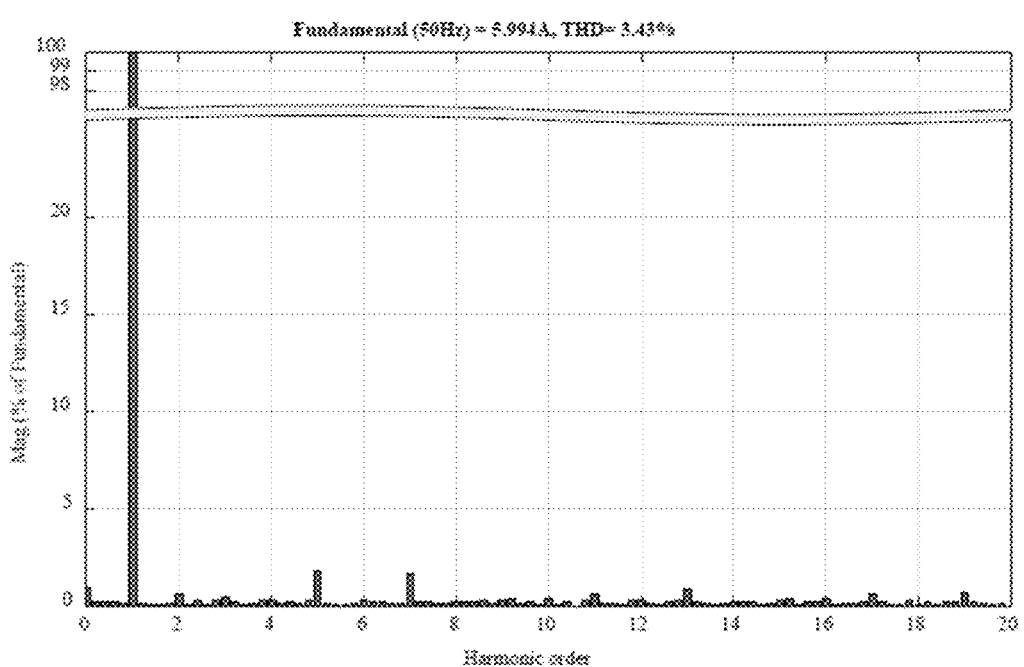
FIG. 13 is a diagram illustrating experimental results of source current spectral analysis ($I_{sA}$) after Capacitor-less-PQC is connected to a system according to an embodiment of the present disclosure.
Figure 14:
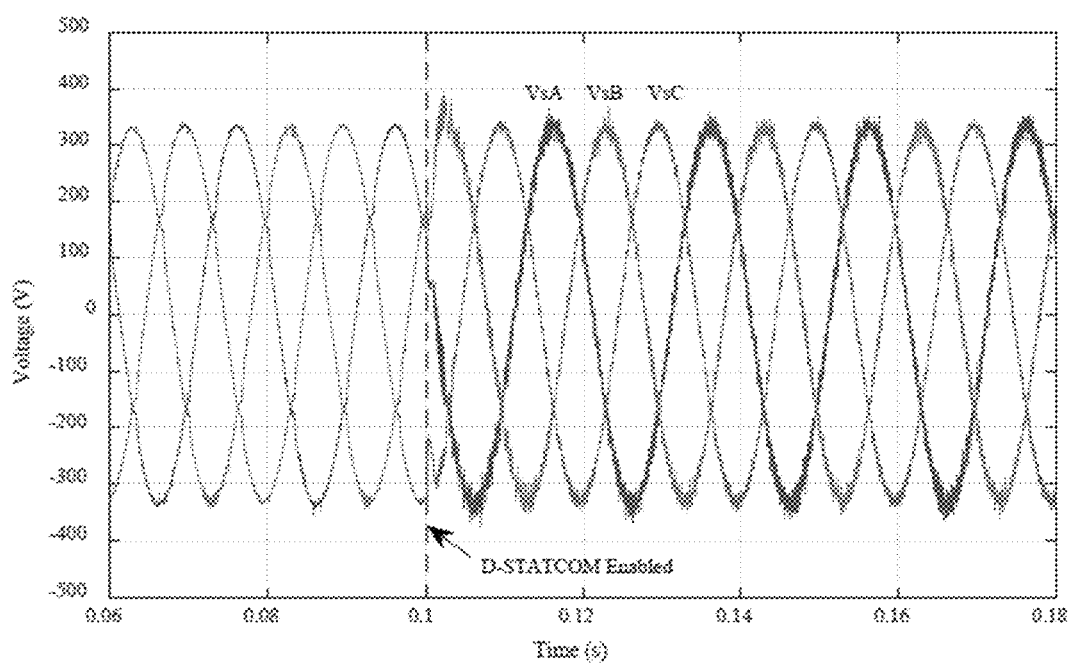
FIG. 14 is a diagram illustrating experimental results of upstream voltage before and after Capacitor-less-PQC is connected to a system according to an embodiment of the present disclosure.
Figure 15:
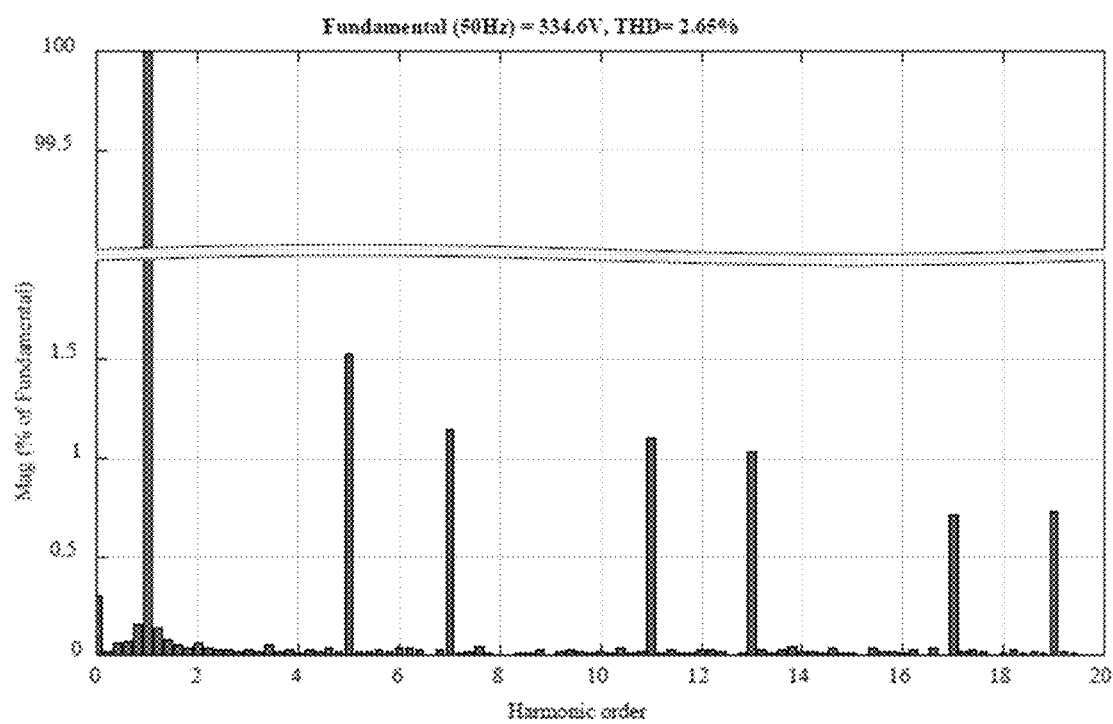
FIG. 15 is a diagram illustrating experimental results of source voltage spectral analysis ($V_{BusA}$) before Capacitor-less-PQC is connected to a system according to an embodiment of the present disclosure.
Figure 16:
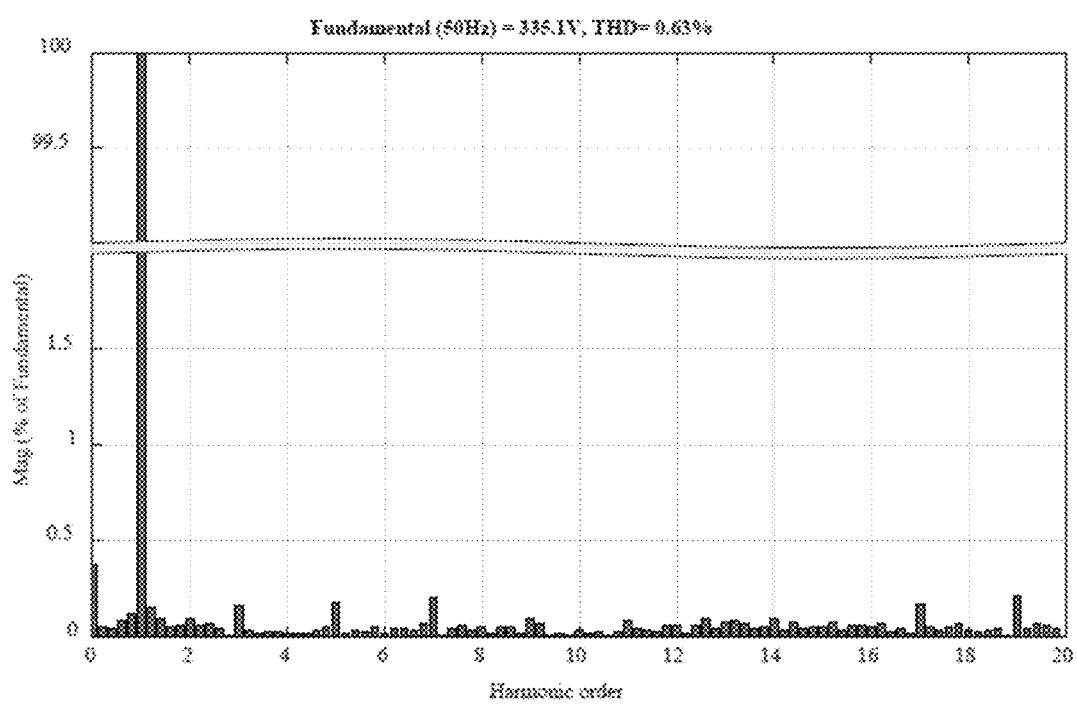
FIG. 16 is a diagram illustrating experimental results of source voltage spectral analysis (VBusA) after Capacitor-less-PQC is connected to a system according to an embodiment of the present disclosure.

As in FIG. 11, Capacitor-less-PQC is connected at t=0.1, and it can be seen that the source current is distorted before the connection the Capacitor-less-PQC and the THD is 26.99% as presented in FIG. 12. When the Capacitor-less-PQC is connected at t=0.1, it is clear that the Capacitor-less-PQC was able to compensate for the load current harmonics and inject the required current to keep the source current sinusoidal. FIG. 13 shows the spectral analysis of the source current and it can be seen that the THD was drastically reduced from 26.99% before compensation to 3.43% after compensation. FIG. 14 presents the three-phase source voltage. And it is clear that the source voltage THD was reduced after the connection of the Capacitor-less-PQC from 2.65% to 0.63% as illustrated in FIG. 15 and FIG. 16.

Experimental Results of Light Non-Linear Load (Three Phase Rectifier and RL Load)

Figure 17:
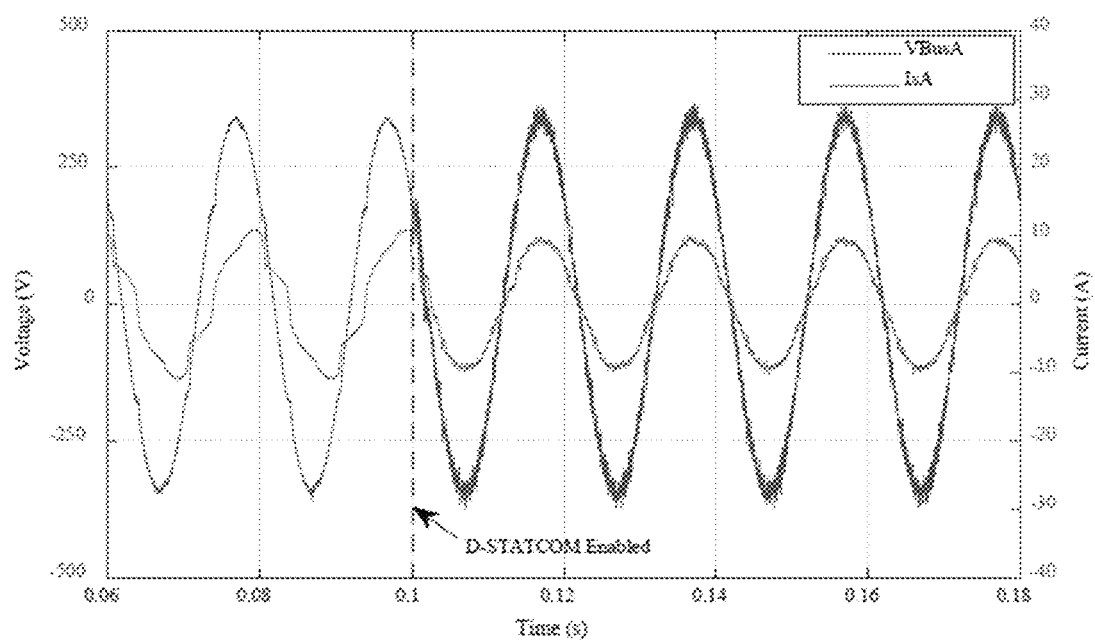
FIG. 17 is a diagram illustrating experimental results of upstream phase voltage ($V_{BusA}$) and current ($I_{sA}$) according to an embodiment of the present disclosure. After the Capacitor-less-PQC is enabled, the source current is in-phase with the source voltage and distortion free.
Figure 18:
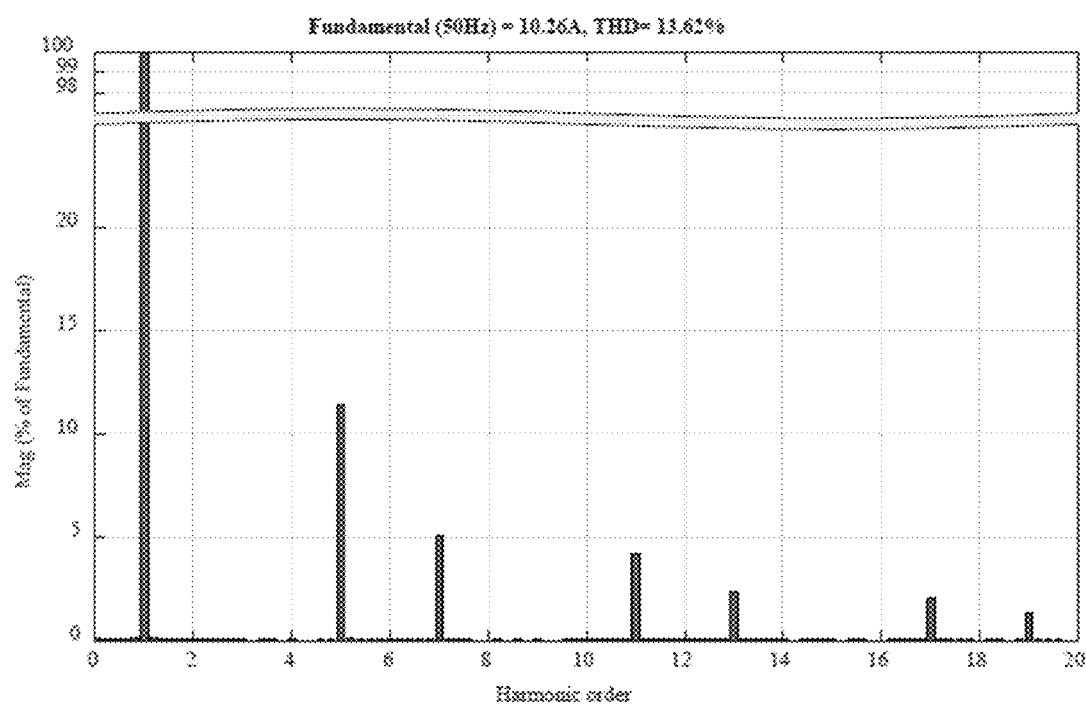
FIG. 18 is a diagram illustrating experimental results of source current spectral analysis ($I_{sA}$) before Capacitor-less-PQC is connected to a system according to an embodiment of the present disclosure.
Figure 19:
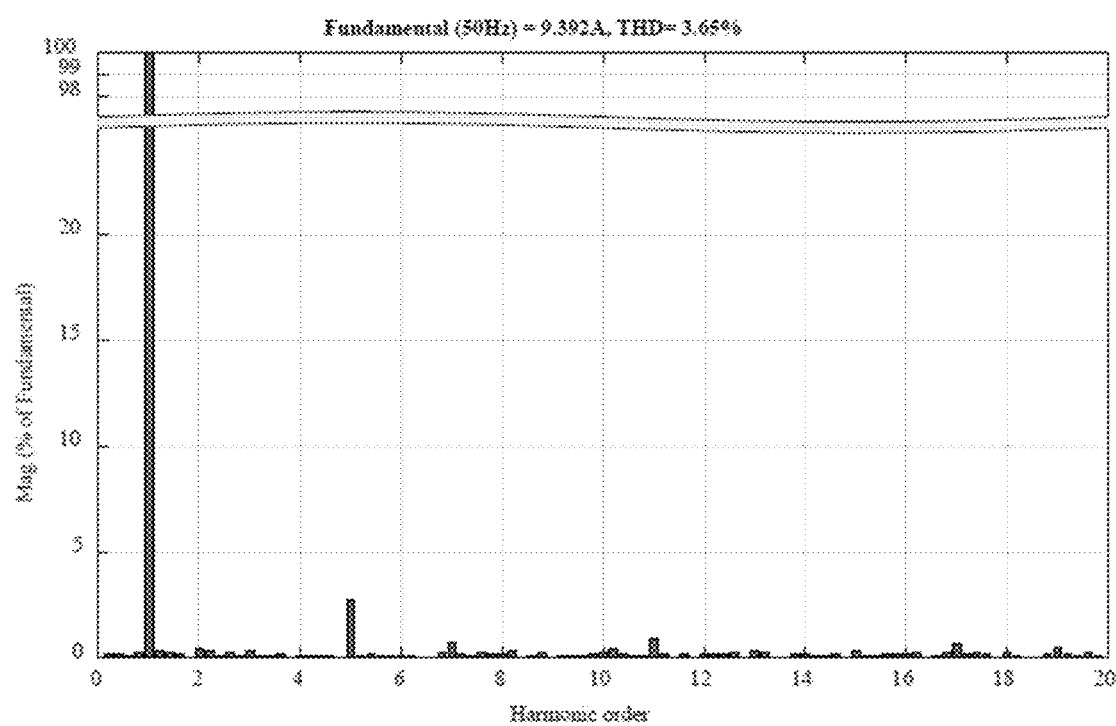
FIG. 19 is a diagram illustrating experimental results of source current spectral analysis ($I_{sA}$) after Capacitor-less-PQC is connected to a system according to an embodiment of the present disclosure.
Figure 20:
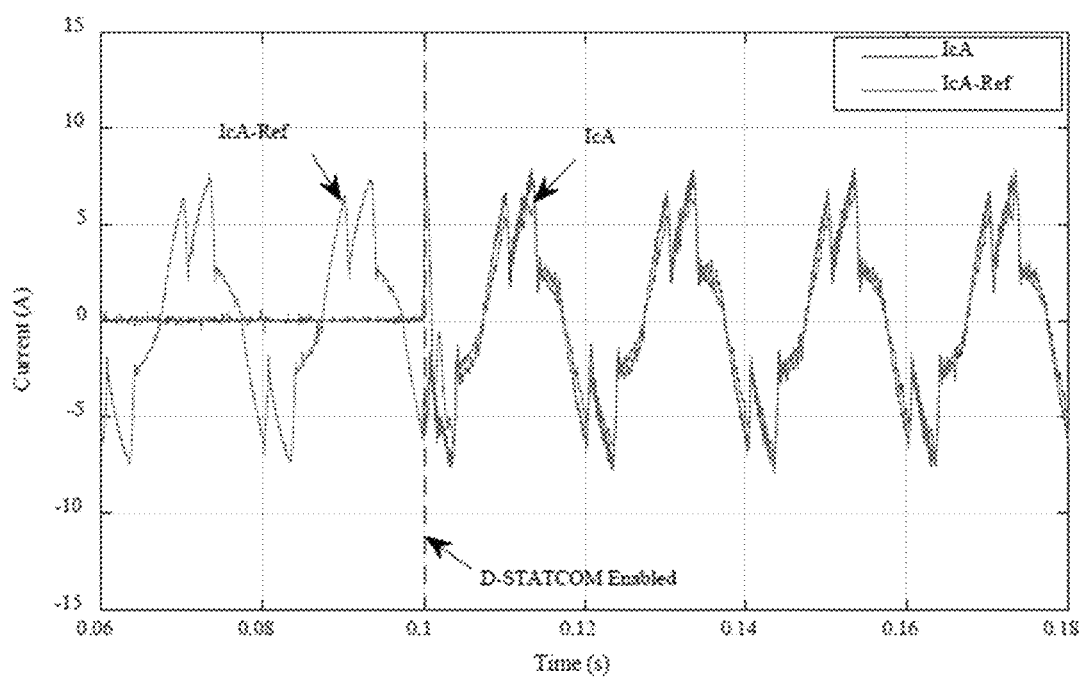
FIG. 20 is a diagram illustrating experimental results of Capacitor-less-PQC input current (IcA) tracking the reference current ($I_{cA-Ref}$) use case II according to an embodiment of the present disclosure. After the Capacitor-less-PQC is enabled at t=0.1, good tracking between Capacitor-less-PQC measured and reference current is shown.
Figure 21:
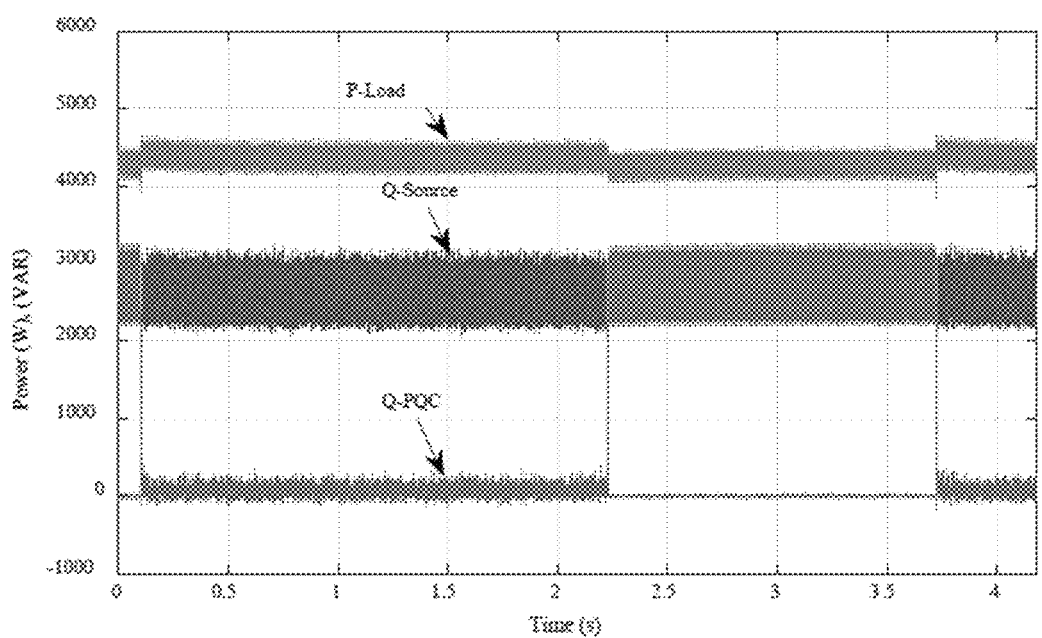
FIG. 21 is a diagram illustrating Experimental results of load active power (P-Load), source reactive power (Q-Source) and Cap-less PQC reactive power (Q-PQC) according to an embodiment of the present disclosure.

In this example, the performance of the Capacitor-less-PQC is tested to provide harmonics compensation of light loads consists of three phase rectifier and inductive Rl, load. FIG. 17 shows the experimental results of source voltage and current before and after Capacitor-less-PQC is connected. It can be noticed that the Capacitor-less-PQC is connected at t=0.1, and the Capacitor-less-PQC was able to provide the required compensation to make the source current sinusoidal. The THD of the source current before and after Capacitor-less-PQC is connected is shown in FIG. 18 and FIG. 19, and it can be observed that the THD was dropped significantly from 13.62% to 3.65%. FIG. 20 shows that there is good tracking between the reference and measured current of the Capacitor-less-PQC phase (A). FIG. 21 shows the experimental results of the active and reactive power flow in the system. It can be seen that before the Capacitor-less-PQC is connected all the reactive power required by the load is supplied by the source, and after Capacitor-less-PQC is enabled the source reactive power dropped to zero and the Capacitor-less-PQC starts to provide the required VAR and harmonic compensation.

According to an embodiment of the present disclosure, the Capacitor-less-PQC is configured to provide bus voltage regulation without using capacitors as energy storage. Thus the present technology solves the known reliability problems and eliminates the wear-out mechanisms and failure modes of existing technology. Voltage instability such as voltage sag, swell, and unbalance, are among the critical issues that contribute to power quality problems in low voltage distribution network. The voltage stability can be due to many reasons and among the direct reasons is the penetration level of renewable energy sources (RES) such as photovoltaic.

Without loss of generality or overly narrowing the present technology, the following provides a possible application example to illustrate the operation of the present technology.

In this example, a Capacitor-less-PQC based 7.5 KVA matrix converter as shown in FIG. 1 and FIG. 2A is used to provide voltage support to distribution network by dynamic reactive power injection at a local bus. The experimental setup includes the upstream side (12 KVA three-phase grid simulator NHR-9410) that emulate utility grid, the downstream side is an electronic load (Cinergia 15 KVA) to emulate an inductive load with high PV penetration, Capacitor-less-PQC based 7.5 KVA matrix converter unit, with three-phase inductors connected at its output side, and control platform (dSPACE Scalexio) to control the entire system.

A capacitor-less Capacitor-less-PQC based matrix converter as shown in FIG. 2B is used to provide the required reactive power compensation in low voltage network to improve the voltage profile in the distribution feeder. Table 3 lists the test setup parameters using in this example. The Matrix converter unit consists of nine IGBT modules SK60GM123, isolated gate drive circuits, current direction detection circuit, clamp circuit for overvoltage protection, voltage transducers LEM LV 25-p and current transducers LEM LP 55. The dSPACE control platform consists of a processing unit and LabBox™ with four FPGA modules each module has 5 ADC 14 bit resolution, 10 digital I/O pins and 5 analogue output pins. The MPC strategy is implemented in dSPACE Scalexio processing unit, while the measurements and four-step commutation and protection are implemented in dSPACE LabBox™ unit. dSPACE ControlDesk™ software is used to supervise and control the experiment in real-time and view and store the experimental results and modify the desired control parameters during the experiment.

The instantaneous three-phase load currents are measured and decomposed into its real and reactive components using synchronous reference frame (SRF) method or dq0 transformation method. The voltage regulator part compares the measured PCC voltage value with the required reference and the error signal is passed to PI controller to generate the required reactive current for voltage regulation which is added to the reactive load current component as in FIG. 4. The real component of the load current consists of DC part that represents the fundamental component of the current and the AC part that represent the harmonics. Using a high pass filter (HPF), the harmonic component can be extracted and then transformed back to the ABC reference frame to be used as a reference current for the MPC controller.

TABLE 3

System Parameters for Voltage Regulation Experiment

| PARAMETER | VALUE |
| --- | --- |
| Voltage, $V_{LN, rms}$ | 240 V |
| Frequency | 50 Hz |
| Reactive Power Q (3-ph) | 3000 VAR |
| Active power P (3-ph) | 2000 to 4000 W |
| Power Factor p.f | 0.6-1 |
| Output chokes inductance LMC | 36 mH |
| Input filter resistance Rf | 2 Ω |
| Input filter inductance Lf | 10 mH |
| Input filter capacitor Cf/phase | 12 uF |
| Sampling time Ts | 40 µs |

TABLE 3-continued

System Parameters for Voltage Regulation Experiment

| PARAMETER | VALUE |
| --- | --- |
| Weight factor $\lambda 1$ | 1 |
| Weight factor $\lambda 2$ | 0.2 |

Figure 22:
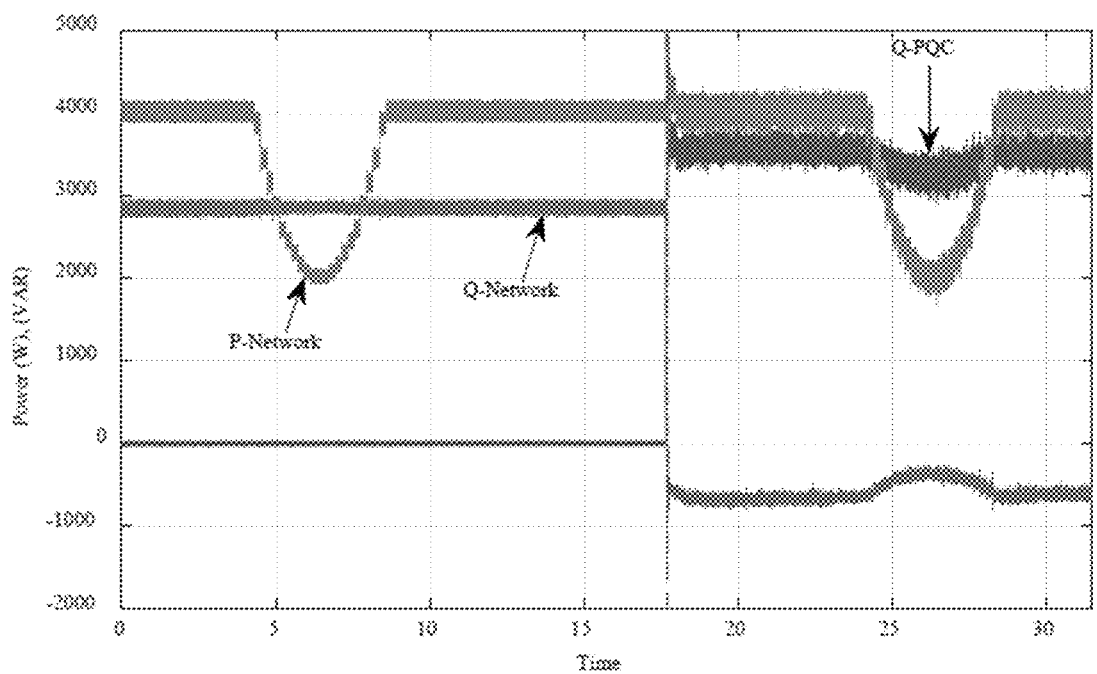
FIG. 22 is a diagram illustrating experimental results of load active power (P-Load), upstream reactive power Q-Source, and Capacitor-less-PQC reactive power Q-PQC according to an embodiment of the present disclosure.
Figure 23:
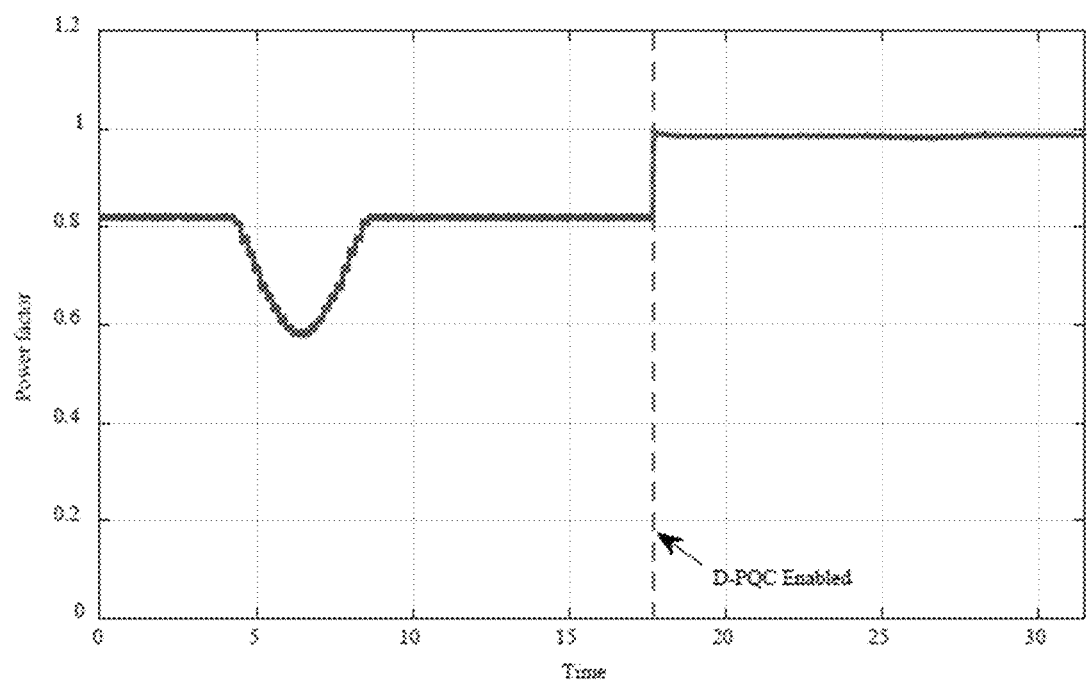
FIG. 23 is a diagram illustrating experimental results of upstream power factor according to an embodiment of the present disclosure.
Figure 24:
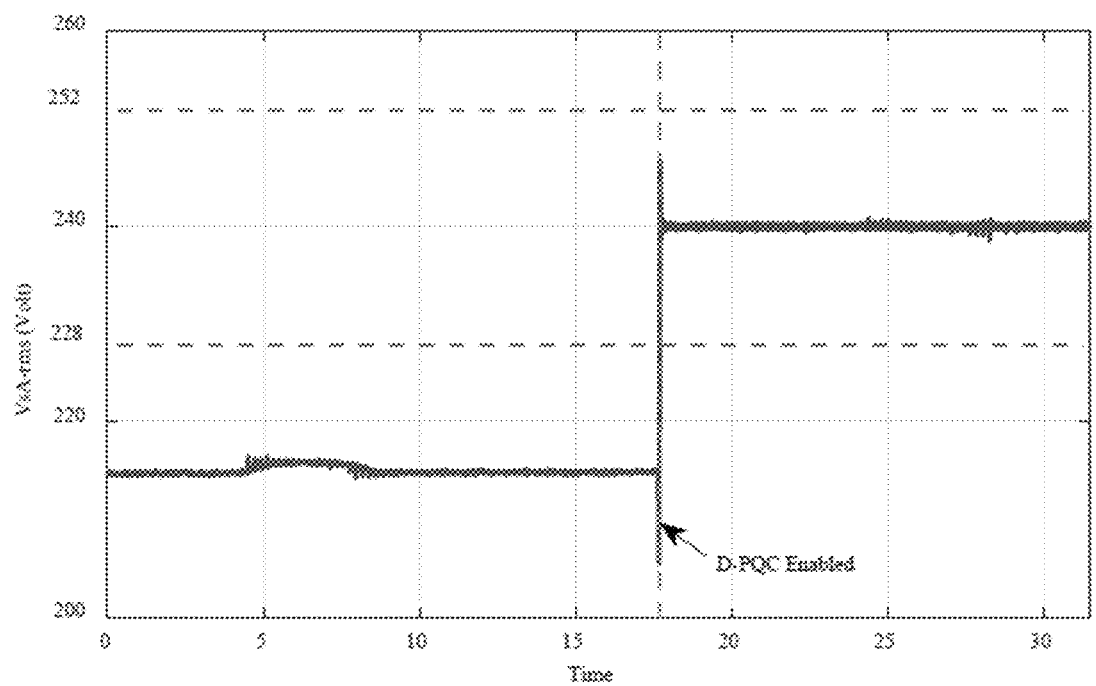
FIG. 24 is a diagram illustrating experimental results of upstream rms voltage ($V_{sA-rms}$) before and after Capacitor-less-PQC is connected to a system according to an embodiment of the present disclosure.
Figure 25:
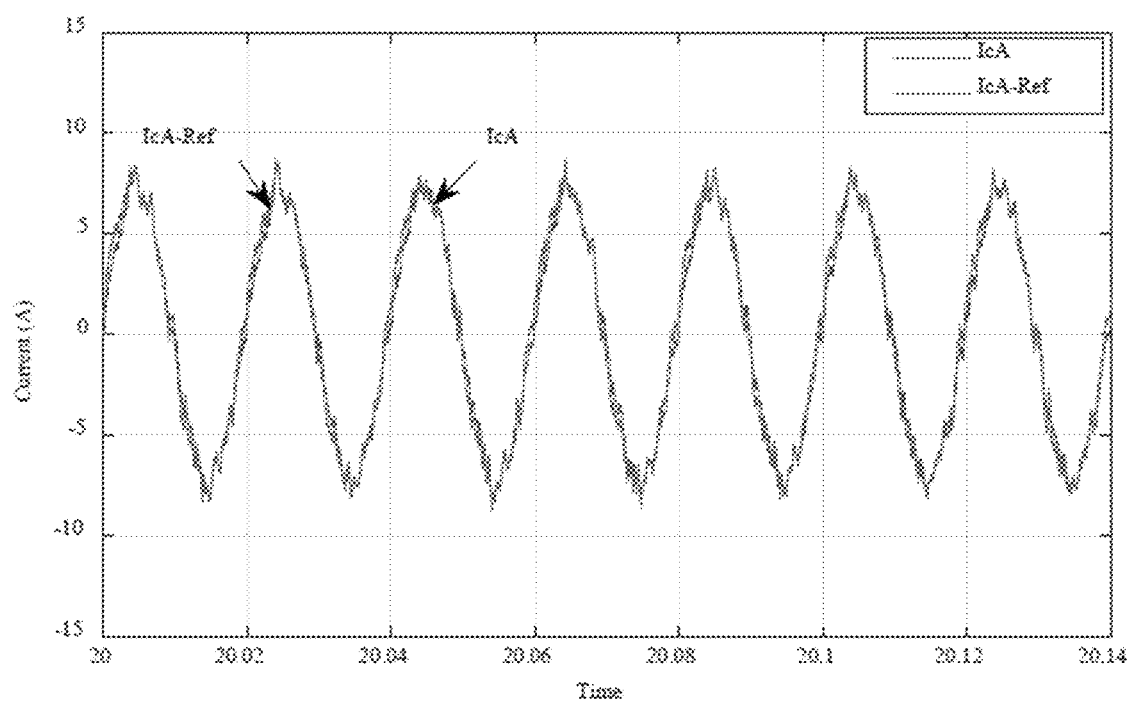
FIG. 25 is a diagram illustrating experimental results of Capacitor-less-PQC reference input current ($I_{cA-Ref}$) and measured input current ($I_{cA}$) according to an embodiment of the present disclosure.
Figure 26:
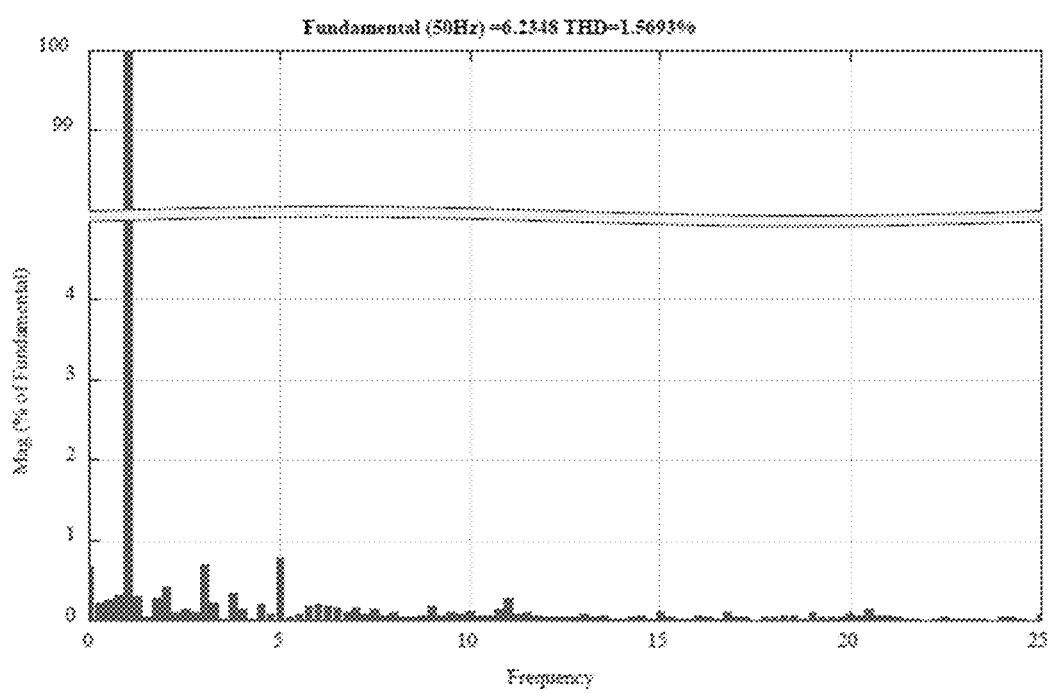
FIG. 26 is a diagram illustrating experiential results of upstream current spectra ($I_{sA}$) while Capacitor-less-PQC is connected to a system according to an embodiment of the present disclosure.

It can be seen from FIG. 22, before the Capacitor-less-PQC is connected to the upstream providing the load with the active power of 4000 W and reactive power of 2750 VAR, while the Capacitor-less-PQC reactive power is zero. Also, the active power change in the figure is due to the injected active power of 2000 W by photovoltaic system connected at the downstream side. The same experiment was repeated again with Capacitor-less-PQC is connected. It can be seen that the source reactive power is dropped from 2750 VAR to around −750 VAR and this negative reactive power is necessary to make sure that the PCC voltage is tracking its reference, and all the reactive power required by the load is provided by the shunt connected Capacitor-less-PQC. FIG. 23 shows the power factor results, it can be depicted from the figure that the power factor vary from 0.6 to 0.8 as the load change when there is no and compensation, and after the compensator is connected the power factor becomes unity regardless of the load change. FIG. 24 shows the PCC rms voltage, it can be noted that before the Capacitor-less-PQC is connected the PCC voltage is below the recommended standard, and after the Capacitor-less-PQC is connected it start to provide the required reactive power to keep the PCC voltage track its reference set value. FIG. 25 illustrates the Capacitor-less-PQC reference and measured current, and it can be seen that controller managed to track the reference and provide the required compensation. In FIG. 26 the spectrum analysis of the upstream current after the connection of Capacitor-less-PQC is shown. It can be seen, that the current THD are within the range according to the recommendation of IEEE 519 standards.

According to an embodiment of the present disclosure, the Capacitor-less-PQC is configured to provide bus voltage regulation at a remote bus without using capacitors as energy storage. Thus the present technology solves the known reliability problems and eliminates the wear-out mechanisms and failure modes of existing technology. Voltage disturbances such as voltage sag, swell, and unbalance, are among the critical issues that contribute to power quality problems in low voltage distribution network. The voltage disturbance can be due to many reasons and among the direct reasons is the penetration level of renewable energy sources (RES) such as photovoltaic. The bus (electrical node of the system) that is experiencing the disturbance may not have a locally-connect PQC. Therefore, the Cap-less-PCQ can be operated by receiving a dispatch command to take local action to compensate and correct for bus voltage at another location in the system. This allows centralized control of one or more Capacitor-less-PQC in a coordinated way.

According to an embodiment of the present disclosure, a Capacitor-less-PQC is configured to provide reliable and robust power quality compensation without using capacitors as energy storage. Thus present the technology solves the known reliability problems and eliminates the wear-out mechanisms and failure modes of conventional technology. With the increased use of power electronic converters in different applications, there has been a great demand on reliable power converters. However, the typical service life of voltage source converters has been reported to be around five years. It is almost inevitable that during the system operation, a fault will occur in the power electronics, in those cases, it is required in many mission-critical systems that the converter continues to operate even under faults. The present technology allows the converter topology to detect internal faults and reconfigure the topology so it will continue to perform the desired power quality compensation functions.

Figure 27:
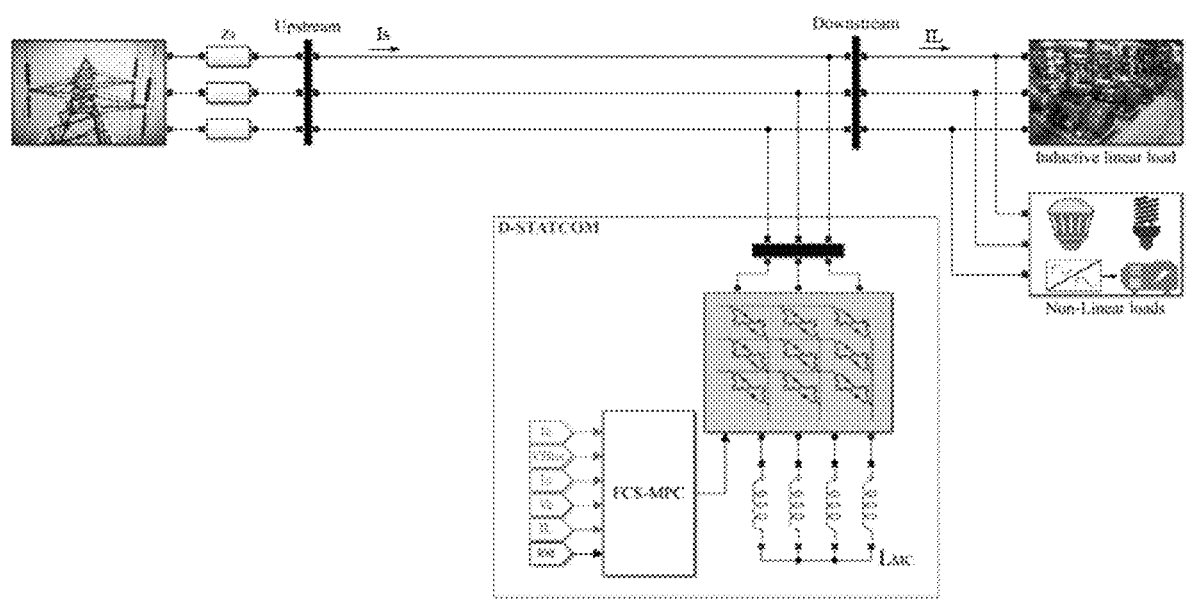
FIG. 27 is a schematic illustration of a fault-tolerant Capacitor-less-power quality compensation PQC system according to an embodiment of the present disclosure. The figure illustrates the PQC device interconnected with an electrical power system denoted as the "upstream" and a plurality of loads denoted as the "downstream." Without loss of generality, there may be loads and sources located at either of the upstream or downstream locations.
Figure 28A:
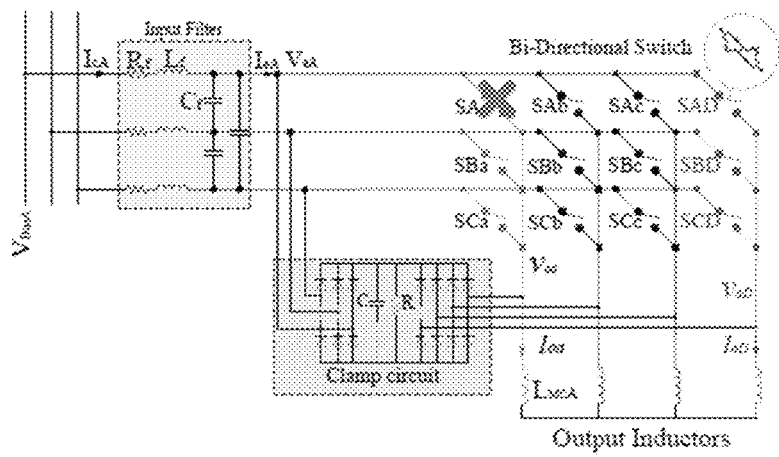
FIG. 28A is a schematic illustration of a circuit of a capacitor-less power quality compensation system having a four phase-leg matrix converter according to an embodiment of the present disclosure. The four phase-leg matrix converter includes four phase-legs, and a fourth phase-leg is for redundancy. The fourth phase-leg is connected to the system when one of the three switches gets faulty according to an embodiment of the present disclosure. Without loss of generality, additional phase-legs may be added to increase redundancy and fault-tolerance. A clamp circuit is also shown, which detects and provides protection against commutation failure either in normal operation or during faulted-operation.
Figure 28B:
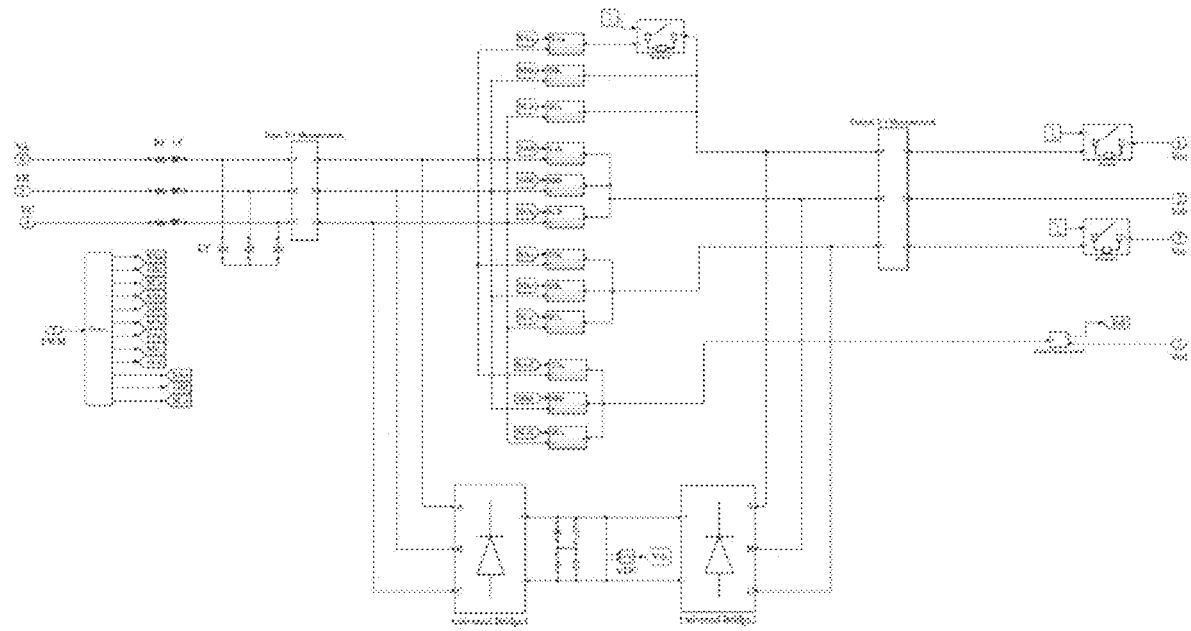
FIG. 28B is a schematic illustration of a simulation of the circuit as illustrated in FIG. 28A according to an embodiment of the present disclosure.
Figure 29:
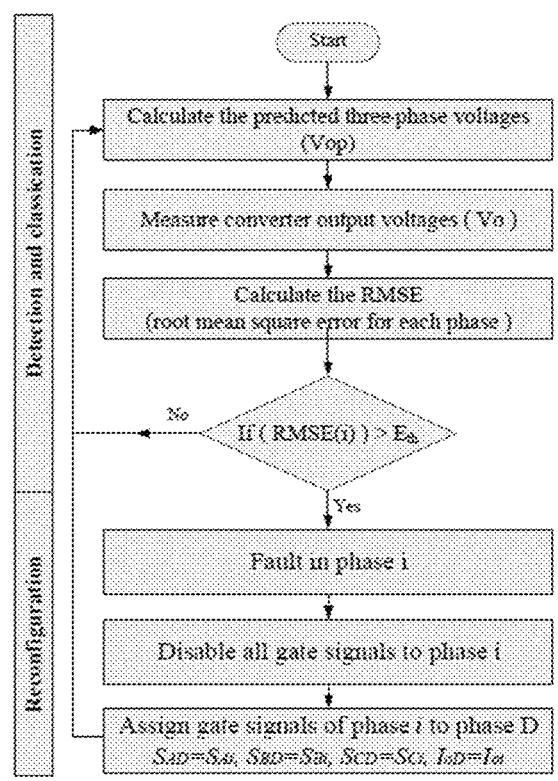
FIG. 29 is a flow chart illustrating open switch fault detection and identification algorithm according to an embodiment of the present disclosure.
Figure 30:
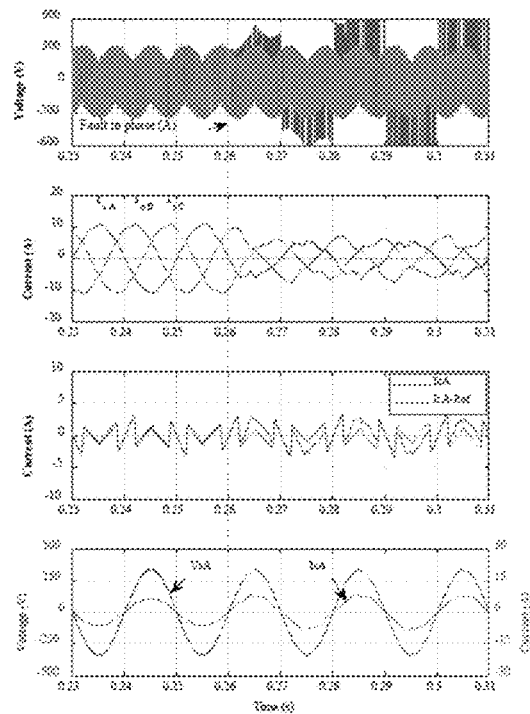
FIG. 30 is a diagram illustrating Simulation results of the fault-tolerant performance of Capacitor-less-PQC during fault in phase (a) at t=0.26 according to an embodiment of the present disclosure.
Figure 30:
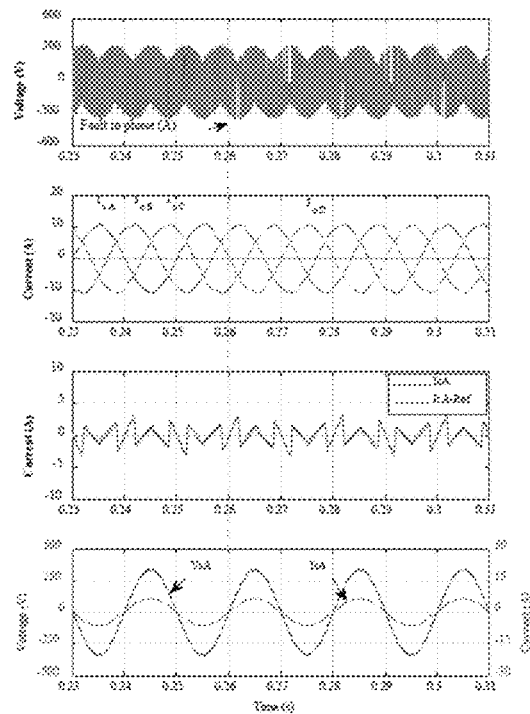

FIG. 27 and FIG. 28 illustrate the structure of a fault-tolerant 4-legs direct matrix converter topology based on an additional redundant output phase according to an embodiment of the present disclosure. In this example, the output currents rms values are measured and any if an open-circuit fault occurred, the output current will be dropped to zero, and the controller will detect this fault and disable the faulty leg and reconfigure the converter to enable the redundant one as in the flowchart in FIG. 29. Simulation results of the fault-tolerant Capacitor-less-PQC are shown in FIG. 30. In this simulation, an open circuit fault has occurred at t=0.26, and the controller detected the fault and reconfigure the converter to continue to operate within one cycle of the supply voltage.

According to an embodiment of the present disclosure, advanced control methods for power electronics converters based on model predictive control are provided.

According to an embodiment of the present disclosure, a power electronic controller is provided. The power electronic controller is based on a model predictive control (MPC) framework. A finite-set MPC formulation is used to model the circuit configurations that result from actuation of the power switch devices in a power converter. Actuation of a switch, either on or off, results in different connections between the input, output, and internal elements of the power converter. A cost-function includes terms for various control objectives, such as tracking a reference. The converter is operated by the power electronic controller selecting the best next-state from the finite-set of states that optimizes (minimizes) the cost function. The switch states that correspond to this next-state are then actuated accordingly. The power electronic controller allows multiple objectives to be included in the controller at the same time.

For example, the present technology uses the MPC framework as described herein and adds that functionalities by creating specific terms in the cost function.

The present disclosure includes one or more separate or combined software algorithms for the control of power electronics. The algorithm and the implementation of the algorithm as an embedded controller of a power electronic converter are described later in details.

According to an embodiment of the present disclosure, a controller builds upon the model predictive control framework to include aspects of the control of the power converter. Whereas is it known to a person with skill in model predictive control that a single cost function may include one or more cost terms and associated weighting factors, these cost terms usually include one or more performance metrics such as tracking a current or voltage reference. The present disclosure discloses the inclusion of other terms into the model predictive control cost function including switching frequency, efficiency, and distortion. There is a direct correlation between these three such that high switching frequency improves reference tracking and decreases distortion but increases power loss due to the switching of the power semiconductor device. As such, the cost function is created as a real-time multi-objective optimization problem so that the converter switches fast enough to achieve the desired reference tracking and distortion specifications but slow enough as to reduce the switching-related power losses.

Model predictive control (MPC) is a controller framework in which mathematical models are used to optimize the behavior of a physical system. Without loss of generality, the present disclosure considers finite control set MPC as a suitable variant of MPC in which each possible configuration of the switchmode power supply is evaluated and the one that minimizes a cost function is chosen as the optimal next configuration. Within the field of power electronics, the output of this process controls the power electronic switch states. A power electronic switch is typically realized by a semiconductor device optimized for the application. A switch state, therefore, is one of either "on" or "off" where "on" refers to conducting current through the device from a first portion of the circuit to a second and "off" refer to the inhibition of current from flowing from a first portion of the circuit to a second portion of the circuit. Since each switch can have two states, the number of possible configurations in a power converter is 2s where s is the number of switches. In practice, the application of Kirchoff's voltage and current laws can reduce the number of possible switch configurations to the number of valid switch configurations by eliminating those that would not be realizable in practice.

The MPC framework requires a cost function, typically denoted with the mathematical symbol g, which is assigned to one or more mathematical relationships. Each relationship defines a particular objective, such as tracking a reference signal. A general formulation with 'n' objectives has the following format:

$$\min g_{\sigma \in \{1:m\}} = \lambda_1 |\tilde{X}_1^\sigma(k+1) - X^*_1(k+1)| + \ldots + \lambda_n |\tilde{X}_n^\sigma(k-1) - X^*_n(k+1)|$$

subject to $\tilde{x}(k+1) = Ax(k) + Bu(k)$ $y(k) + Cx(k)$ $|y(k)| \leq y_{boundary}$ \hfill (17)

Whereas, $\lambda_{1 \ldots n}$ are the weighting factors that assign significance to some objectives over others $\sigma$ denotes the state number m is the number of possible states for the system $\tilde{x}_{1 \ldots n}$ are the state variables being controlled $X^*_{1 \ldots n}$ are the state references being tracked x: State Variable u: Control Signals y: Output A: State Transition Matrix B: Input Matrix C: Output Matrix k: Discretized Time The controller evaluates the cost function g for each valid m switch configuration. The switch configuration is chosen that minimizes the numerical value of the cost function g. In general, there can be multiple objectives and the MPC seeks to minimize the net contribution of each cost term. The MPC framework allows for the weighting of the different objectives to give priority or preference.

Model predictive control (MPC) is an attractive candidate for controlling different types of power electronics interfaces (PEIs) because of its fast dynamic response, straightforward implementation, easy inclusion of nonlinearities besides constraints of the system, and single-loop multi-objective optimization. One of the advantages of MPC over the conventional multi-loop controllers is its ability to include several control variables with different characteristics such as voltage, current, torque, and switching frequency into a single cost function.

Auto-Tuning Weight Factors for Multi-Objective Control

The optimal choice of the weighting factors is not a solved problem. There may not be an optimal set of weighting factors for every operating condition. A fixed weight factor is not robust to parameter variation and other uncertainties of the system. Weight factors in the cost function can accommodate different units and scales as well as allow the prioritization of specific control variables over others by appropriately choosing the ratio of the weight factors of the variables. A significant challenge in designing MPC for multi-objective control is to appropriately tune the respective weight factors to achieve the control objectives within the desired performance constraint.

The present technology is configured to automatically tune the MPC cost function weighting factors to achieve maximized system stability. As such, for each sampling period, the controller outputs a set of weighting factors that minimize system tracking errors. As the weighting factors are automatically adjusted at every stage, taking into account the system behavior, the present technology is configured to eliminate the need for manual tuning based on trial-and-error. The present technology is robust to parameter variations in the system.

The auto-tuning method depends on a particular mission profile. Consider an uninterruptible power supply (UPS) system example, model fidelity may not be as critical, as prolonging battery life. Therefore, the present technology provides the system the flexibility to adjust its mission profile during operation by auto-tuning the MPC cost function weighting factors.

Without loss of generality or overly narrowing the present technology, the following provides a possible application example to illustrate the operation of the present technology.

Figure 31:
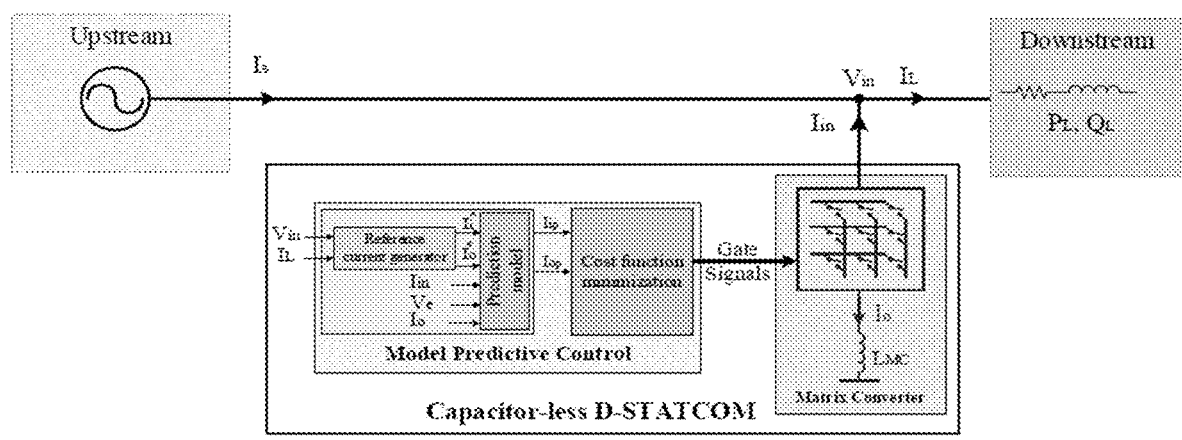
FIG. 31 illustrates a capacitor-less power quality compensation system one-line diagram according to an embodiment of the present disclosure. The D-STATCOM is shunt-connected at a specific bus in the distribution network.

In this example, a capacitor-less D-STATCOM is illustrated presented in FIG. 31. After minimization of the cost function g, the switching that corresponds to the minimum g will be applied to the converter. Then the algorithm moves into auto-tuning of weight factor. The tuned weight factor will be used for the minimization of (18) at the next sampling period for sufficiently small sampling time. In practice, much of the evaluations for tuning of weight factors are based on the computations that have been already done. Thus, using the already computed cost function, the cost function (18) can be split into two parts where each corresponds to individual control objectives:

$$g_1(|\tilde{i}_{o\alpha} - i^*_{o\alpha}| + |\tilde{i}_{o\beta} - i^*_{o\beta}|) \leq \Psi_1 \quad (18)$$

$$g_2 = |\tilde{Q} - Q^*| \leq \Psi_1 \quad (19)$$

$\Psi_1$ and $\Psi_2$ are the acceptable error of tracking commanded values. From the computed $g_1$ and $g_2$ for all 27 switching states, the minimum value of $g_2$ will be selected.

$$\xi = \min g_2 \quad (20)$$

The next step is to evaluate the magnitude of minimum $g_2$ with a sufficiently small number $\varepsilon_1$ as following:

$$\xi \leq \varepsilon_1 \Rightarrow \lambda = \varepsilon_2 \quad (21)$$

The statement (21) is presenting that, if $g_2$ is small enough (less than a defined small number $\varepsilon_1$), then the weight factor $\lambda$ is determined to be equal to a sufficiently small number $\varepsilon_2$, considering the fact that the $g_2$ is within an acceptable error range $\Psi_2$.

If the condition in (21) is not satisfied, a larger value for weight factor $\lambda$ should be selected in order to give higher value to $g_2$ for minimization at the next sampling time k+1. This evaluation of $\xi$ when its value is more than $\varepsilon_1$ is as following $$\xi \leq 2\varepsilon_1 \Rightarrow \lambda = 2\varepsilon_2 \quad (22)$$

$$\xi \leq 3\varepsilon_1 \Rightarrow \lambda = 3\varepsilon_2$$

$$\vdots$$

$$\xi \leq K\varepsilon_1 \Rightarrow \lambda = K\varepsilon_2$$

where: $K\epsilon\{1, 2, 3, \ldots, N\}$

Figure 32:
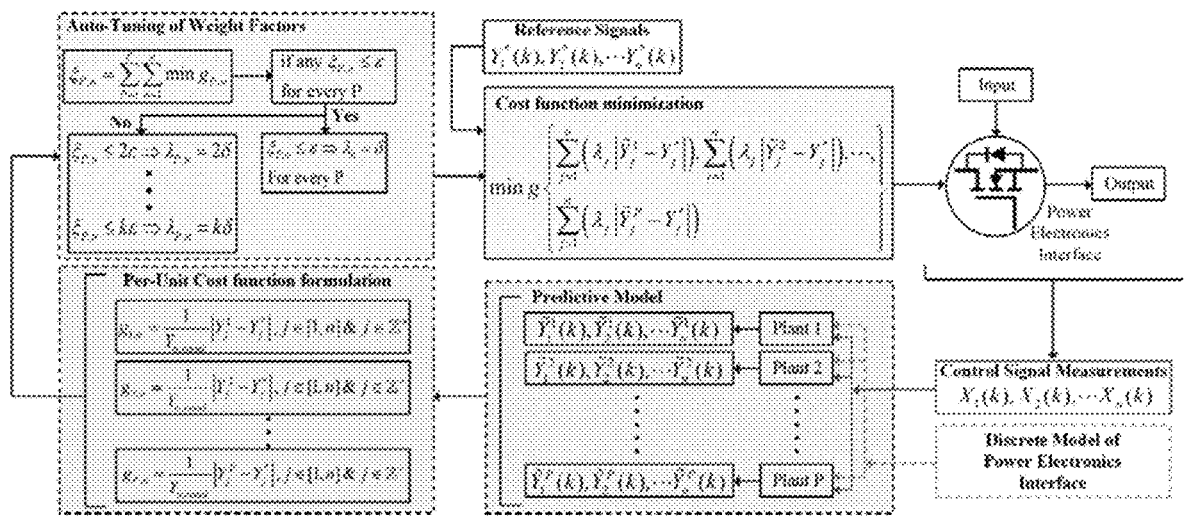
FIG. 32 is a schematic illustration of an auto-tuned MPC for a power electronic converter according to an embodiment of the present disclosure.

The statements in (22) quantized the $\xi$, which corresponds to the magnitude of $g_2$, the weight factor $\lambda$ is determined based $\xi$ on magnitude when comparing to n multiples of $\varepsilon_1$ till the statement in (22) is satisfied. The corresponding value of $\lambda$ is multiplication of n by $\varepsilon_2$. This strategy for selecting the weight factor $\lambda$, based on the absolute error of $g_2$ is illustrated in the right hand side of (19). This procedure will be repeated every sampling time, thus during every sampling period the weight factor will be tuned online and applied in the minimization procedure of the cost function (18) at next sampling time. The generalized technology is presented in FIG. 32.

In the capacitor-less D-STATCOM of FIG. 31, there may be multiple objectives which are desired to be controlled. For example, to ensure that the input current faithfully tracks the desired reference current while also controlling the output current to be well-behaved. The primary objective in such case is that the overall system stability is achieved by controlling the input current. The secondary objective is to maintain the output current well-behaved so as not to increase inductive losses for example. Auto-tuning the objective function automatically allows the controller to re-assign control priorities during operation to adapt to different loading conditions.

Figure 33:
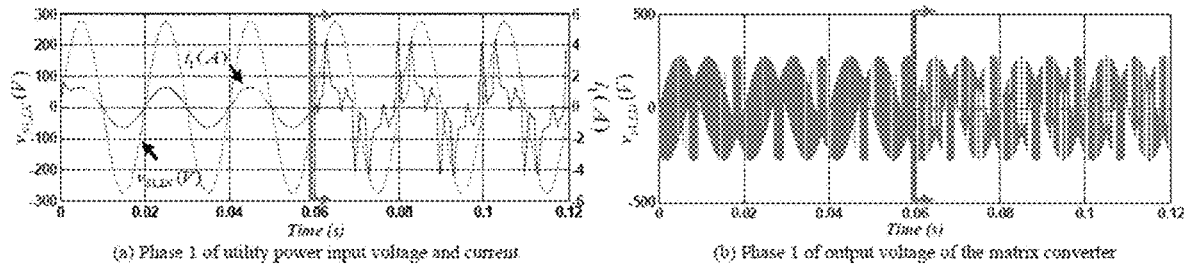
FIG. 33 includes diagrams illustrating simulation results of the conventional fixed weight factor for MPC cost function for VAR compensation by matrix converter according to an embodiment of the present disclosure.

An auto-tuning MPC cost function for the capacitor-less D-STATCOM is in (23)

$$\min_{\sigma\in\{1,2,\ldots,27\}} = \quad (23)$$

$$\lambda_1\left(|I^\sigma_{in\alpha} - i^*_{in\alpha}| + |I^\sigma_{in\beta} - i^*_{in\beta}|\right) + \lambda_2\left(|I^\sigma_{o\alpha} - i^*_{o\alpha}| + |I^\sigma_{o\alpha} - i^*_{o\beta}|\right)$$

subject to $\tilde{I}^\sigma_o(k+1) = \left(1 - \frac{R_{LMC}T_s}{L_{MC}}\right)i_o(k) + \frac{T_s}{L_{MC}}v_{oLN}(k)$ $\tilde{Q}\sigma(k+1) = v_{iLN\beta}(k+1)i_{i\alpha}(k+1) - v_{iLN\alpha}(k+1)i_{i\beta}(k+1)$ $Q^p(k+1) =$ $\text{Im}\{v_{in}(k+1)\cdot \overline{I}_{in}(k+1)\} = v_{in\beta}(k+1)i_{in\alpha}(k+1) - v_{in\alpha}(k+1)i_{in\beta}(k+1)$ whereas, $\left|\tilde{I}^\sigma_{o\alpha} - i^*_{o\alpha}\right| + \left|\tilde{I}^\sigma_{o\beta} - i^*_{o\beta}\right| \leq \Psi_1$ and $\left|\tilde{Q}^\sigma - \tilde{Q}^*\right| \leq \Psi_2$ $\xi \leq \varepsilon_1 \rightarrow \lambda = \varepsilon_2$ $\xi \leq 2\varepsilon_1 \rightarrow \lambda = 2\varepsilon_2$ $\xi \leq K\varepsilon_1 \rightarrow \lambda = K\varepsilon_2$ where: $K\epsilon\{1, 2, 3, \ldots, N\}$ This technology has been verified in simulation with results in FIG. 33, which demonstrates the MPC performance of reactive power compensation of matrix converter with conventional fixed weight factor selection based on try and error tuning method.

Figure 34:
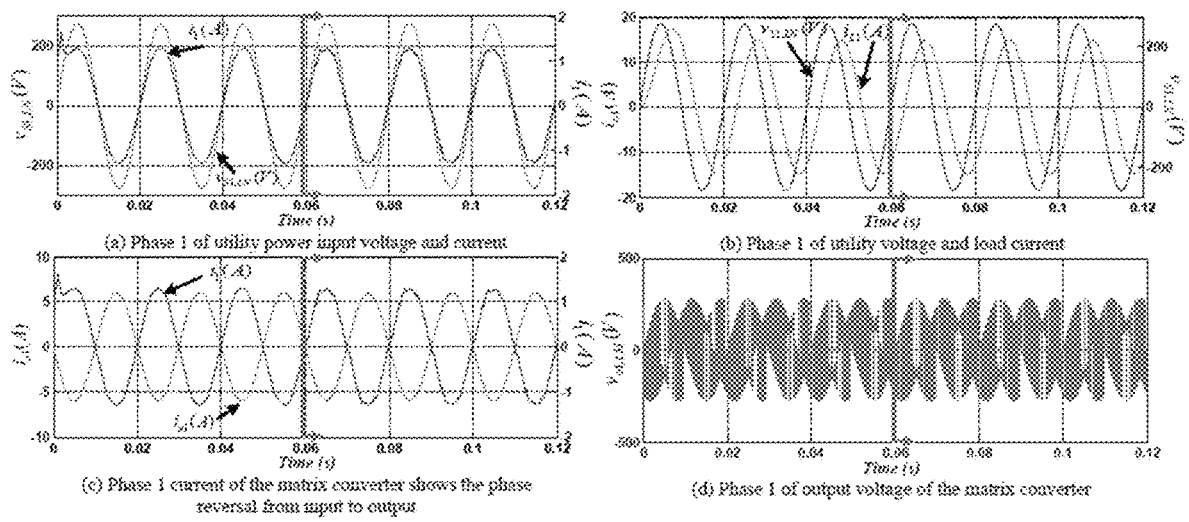
FIG. 34 includes diagrams illustrating simulation results of the proposed auto-tuning approach of weight factor for MPC cost function for VAR compensation by matrix according to an embodiment of the present disclosure.

The simulation results in FIG. 34 demonstrate that using the auto-tuning approach of the weight factor of MPC results in significantly lower distortion. This lower distortion indicates better control tracking behavior and an overall improved system stability.

Auto-Tuning MPC for Maximum Power Point Tracking (MPPT)

Solar photovoltaic technology requires a robust controller to dynamic weather patterns. Many of the well-known MPPT technologies attempt to track the maximum power point (MPP) by incrementing a reference signal (voltage or current) until the system reaches the MPP. These technologies may exhibit large output power oscillations around the MPP and slow settling time in response to step changes.

Improving the maximum power point tracker is twofold. First, improving dynamic response allows the system to quickly adapt to fast weather changes. Second, improving steady-state performance allows the system to operate optimally with less ripple. The result is an overall increase in captured solar energy.

The present disclosure provides a technology that improves dynamic performance and reduces steady-state error by utilizing the online auto-tuning of the MPC cost function weighting factors. First, the sign of the expression $\Delta i_{P_V}/\Delta v_{P_V}$ is used to determine the reference value $v^*_{PV,ref}(k)$ as shown in (24).

$$v^*_{PV,ref}(k) = \begin{cases} v_{PV}(k) - |\Delta \tilde{v}|, \mu < 0 \\ v_{PV}(k) + |\Delta \tilde{v}|, \mu < 0 \end{cases} \quad (24)$$

$$\text{for } \mu = \frac{i_{PV}(k) - i_{PV}(k-1)}{v_{PV}(k) - v_{PV}(k-1)}$$

where $i_{PV}$ is the measured PV current, $v_{PV}$ is the measured PV voltage and $|\Delta \tilde{v}|$ is the step size of the MPPT algorithm. Ideally, the step size should be large when the system is in transient state to achieve faster settling time (better dynamic performance), and the step size should be small during system steady-state to minimize ripple.

Without loss of generality or overly narrowing the present technology, the following provides a possible application example to illustrate the operation of the present technology. Consider a Flyback converter with the cost function, as is shown in (25).

$$\min g_{\sigma \in \{0,1\}} = |\tilde{v}^\sigma_{PV}(k+1) - v^*_{PV,ref}(k)| \quad (25)$$

$$\text{subject to } \tilde{v}^{\sigma=1}_{PV}(k+1) = \left(\frac{1-D}{nD}\right)\left[1 - \frac{T_s}{RC}\right]v_o(k)$$

$$\tilde{v}^{\sigma=0}_{PV}(k+1) = \left(\frac{1-D}{nD}\right)\left[1 - \frac{T_s}{RC} + \frac{T_s}{RC(1-D)}\right]v_o(k)$$

By combining (24) and (25), the MPPT can be expressed within the MPC cost function as illustrated in (26)

$$\min g_{\sigma \in \{0,1\}} = |\tilde{v}^\sigma_{PV}(k+1) - v^*_{PV,ref}(k)| \quad (26)$$

$$\text{subject to } \tilde{v}^{\sigma=1}_{PV}(k+1) = \left(\frac{1-D}{nD}\right)\left[1 - \frac{T_s}{RC}\right]v_o(k)$$

$$\tilde{v}^{\sigma=0}_{PV}(k+1) = \left(\frac{1-D}{nD}\right)\left[1 - \frac{T_s}{RC} + \frac{T_s}{RC(1-D)}\right]v_o(k)$$

$$v^*_{PV,ref}(k) = \begin{cases} v_{PV}(k) - |\Delta \tilde{v}|, \mu < 0 \\ V_{PV(k)} + |\Delta \tilde{v}|, \mu < 0 \end{cases}$$

$$\text{for } \mu = \frac{i_{PV}(k) - i_{PV}(k-1)}{v_{PV}(k) - v_{PV}(k-1)}$$

where $v^*_{PV,ref}(k)$ is the MPPT reference. For this case, since there is only one penalty function in the MPC cost function, the weight factor $\lambda=1$ To appropriately obtain an estimate of the MPPT step size, the average PV voltage value $\tilde{v}_{PV,ave}(k+1)$, which is the average predicted voltage over the whole period of the switching action when the switch is on and when in its off, is compared with the present time PV voltage $v_{PV}(k)$:

$$|\Delta \tilde{v}| = |\tilde{v}_{PV,ave}(k+1) - v_{PV}(k)| \quad (27)$$

$$\text{where, } \tilde{v}_{PV,ave}(k+1) = \frac{1}{2}\left(\tilde{v}^{\sigma=0}_{PV}(k+1) + \tilde{v}^{\sigma=1}_{PV}(k+1)\right)$$

Combining equations (27) and (24) along with the knowledge of cost function weighting factors in MPC, as mentioned in (17), an adaptive MPC cost function is formulated in (28).

$$g_{\sigma \in \{0,1\}} = \lambda_1 |\tilde{v}^\sigma_{PV}(k+1) - v_{PV}(k) + |\tilde{v}_{PV,ave}(k+1) - v_{PV}(k)|| + \quad (28)$$

$$\lambda_2 |\tilde{v}^\sigma_{PV}(k+1) - v_{PV}(k) + |\tilde{v}_{PV,ave}(k+1) - v_{PV}(k)||$$

$$\text{whereas, } \{\lambda_1, \lambda_2\} = \begin{cases} \{1, 0\}, \mu < 0 \\ \{0, 1\}, \mu > 0 \end{cases} \text{ for } \mu = \frac{i_{PV}(k) - i_{PV}(k-1)}{v_{PV}(k) - v_{PV}(k-1)}$$

An auto-tuning MPC for maximum power point tracking has a cost function as in (29)

$$\min g_{\sigma \in \{0,1\}} = \lambda_1 |\tilde{v}^\sigma_{PV}(k+1) - v_{PV}(k) + |\tilde{v}_{PV,ave}(k+1) - v_{PV}(k)|| + \quad (29)$$

$$\lambda_2 |\tilde{v}^\sigma_{PV}(k+1) - v_{PV}(k) + |\tilde{v}_{PV,ave}(k+1) - v_{PV}(k)||$$

$$\text{subject to } \tilde{v}^{\sigma=1}_{PV}(k+1) = \left(\frac{1-D}{nD}\right)\left[1 - \frac{T_s}{RC}\right]v_o(k)$$

$$\tilde{v}^{\sigma=0}_{PV}(k+1) = \left(\frac{1-D}{nD}\right)\left[1 - \frac{T_s}{RC} + \frac{T_s}{RC(1-D)}\right]v_o(k)$$

$$\text{whereas, } \{\lambda_1, \lambda_2\} = \begin{cases} \{1, 0\}, \mu < 0 \\ \{0, 1\}, \mu > 0 \end{cases}$$

$$\text{for } \mu = \frac{i_{PV}(k) - i_{PV}(k-1)}{v_{PV}(k) - v_{PV}(k-1)}$$

The formulation of the Auto-tuning MPC for MPPT is thoroughly explained and demonstrated experimentally on a PV system based on a flyback converter. However, the technology can also be applied to other converter topologies by merely modifying the MPC formulation as in (29).

Figure 35A:
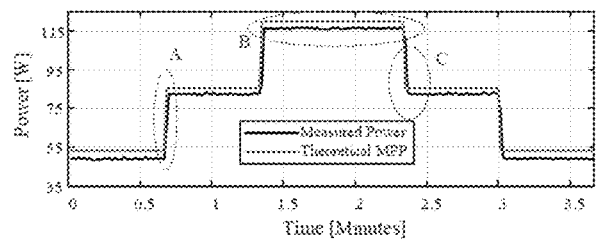
FIG. 35A and FIG. 35B includes diagrams illustrating an experimental comparison based on hardware tests for the present technology in comparison to the conventional Incremental Conductance MPPT based on a step change test from irradiance 500 W/m² to 750 W/m² to 1000 W/m² and back to 750 W/m² then 500 W/m².
Figure 35B:
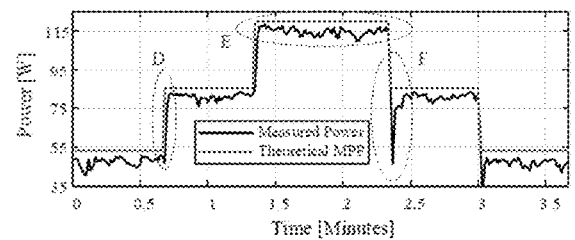
Figure 36:
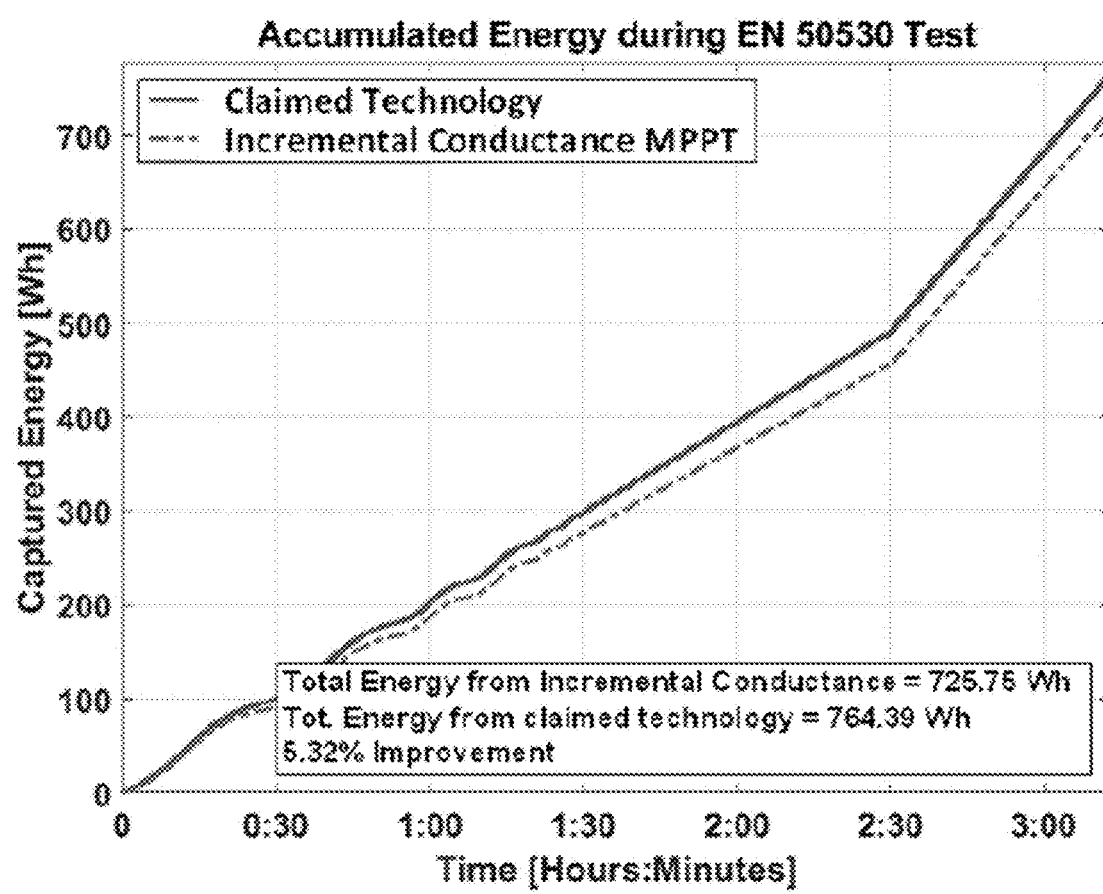
FIG. 36 a diagram illustrating accumulated energy versus time for a MPC-based auto-tuning technology according to an embodiment of the present disclosure and the conventional incremental conductance MPPT for two parallel modules over the range of the 3 hours and 20 minutes of the EN 50530 test. The present technology shows a 5.32% higher total energy captured over the range of the test period.

The step response in FIG. 35A shows the present technology has a faster settling time and better dynamic response than the well-known incremental conductance as is evidenced in detail A and C versus detail D and F. The present technology has much smaller ripple at steady-state operation than the well-known incremental conductance technique as is evidenced by detail B versus detail E in FIG. 35B. FIG. 36 shows the accumulated energy versus time for the claimed technology and the well-known incremental conductance MPPT for two parallel modules over the range of the 3 hours and 20 minutes of the EN 50530 test. The present technology shows a 5.32% higher total energy captured over the range of the test period. FIG. 36 shows that energy capturing improvement is scalable the longer the period for a whole PV farm.

A Controller to Reduce Sensors

Shunt-resistor current sensors and current transducer measurements are prone to temperature drift and aging-related drift. Accuracy of the current measurement using a hall-effect sensor is influenced by the position of the conductor within the sensor. Hall effect-based sensor measurements may be compromised due to magnetic core offset and magnetic interference from the surrounding environment.

Reducing sensors offers benefits on noise performance and load range. Eliminating the current sensor, a fundamental component of the circuit, can reduce hardware cost and improves the reliability of the power converter. Additionally, eliminating the current sensor improves the load range and betters noise performance in photovoltaic applications.

The present disclosure provides a technology that eliminates the current sensor in maximum power point tracking applications using MPC. The ptechnology is based on the fundamental resemblance of the model-based framework of MPC to the observer-based sensorless current mode. The generic MPC formulation in (17) is modified accordingly to add the term of the state observer into the MPC objective function as in (30).

$$\min g_{\sigma \in \{1:m\}} = \lambda_1 |\tilde{X}_1^\sigma(k+1) - X^*_1(k+1)| + \ldots + \lambda_n |\tilde{X}_n^\sigma(k+1) - X^*_n(k+1)|$$

subject to $\tilde{x}(k+1) = A\tilde{x}(k) + Bu(k) + L(y(k) - \tilde{y}(k))$ $\tilde{y}(k) = C\tilde{x}(k)$ $|y(k)| \leq y_{boundary}$ (30)

For example, a challenge with some well-known maximum power point tracking (MPPT) technology in photovoltaic (PV) applications is their dependency on accurate PV current measurement which may be a hindrance to performance and accurate tracking as pointed out earlier.

Figure 37:
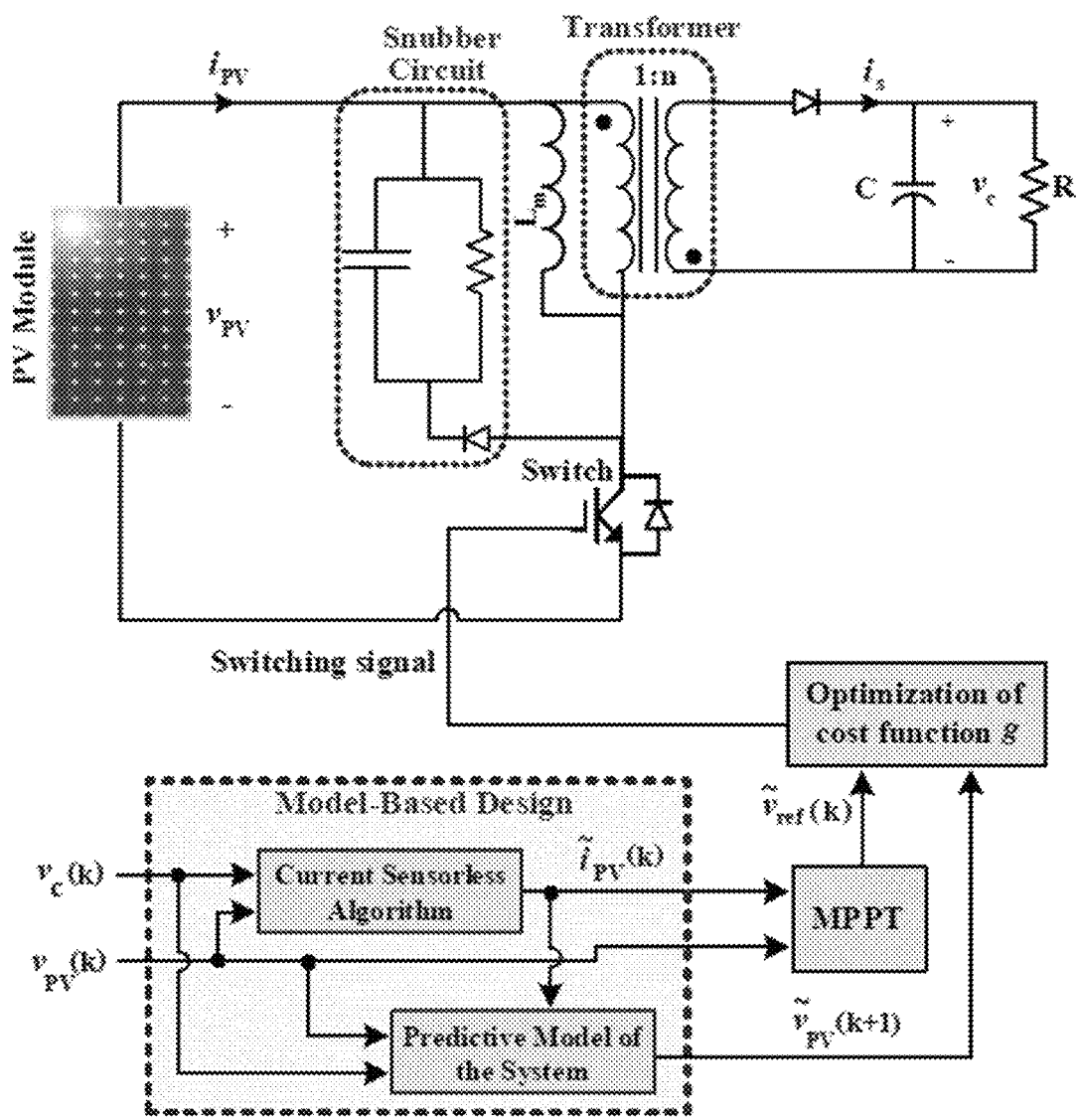
FIG. 37 is a schematic illustration of a MPC state estimation approach to reduce sensors applied on flyback converter for PV application according to an embodiment of the present disclosure.
Figure 38:
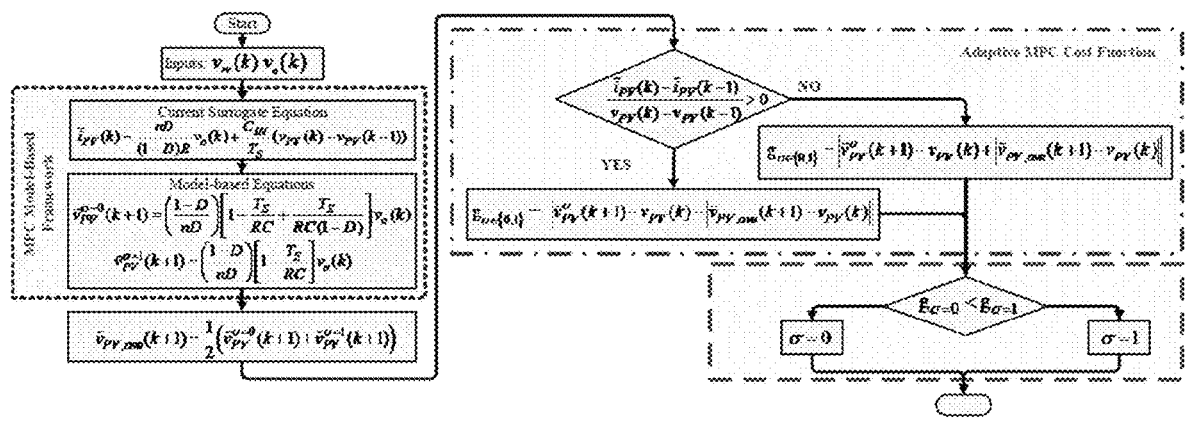
FIG. 38 is a flowchart of an ASC-MPPT algorithm showing the control sequence of an integrated MPC cost function according to an embodiment of the present disclosure.

Without loss of generality or overly narrowing the present technology, the following provides a possible application example to illustrate the operation of the present technology. Consider a Flyback converter with the cost function as is shown in (31).

$$\min g_{\sigma \in \{0,1\}} = |\tilde{v}^\sigma_{PV}(k+1) - v^*_{PV,ref}(k)| \quad (31)$$

subject to $\tilde{v}^{\sigma=1}_{PV}(k+1) = \left(\frac{1-D}{nD}\right)\left[1 - \frac{T_s}{RC}\right]v_o(k)$ $\tilde{v}^{\sigma=0}_{PV}(k+1) = \left(\frac{1-D}{nD}\right)\left[1 - \frac{T_s}{RC} + \frac{T_s}{RC(1-D)}\right]v_o(k)$ An observer model for the PV current can be obtained by analyzing the converter (FIG. 37) in continuous conduction mode to obtain a discrete-time estimation in steady-state as in (32).

$$\tilde{I}_{PV}(k) = \frac{nD}{(1-D)R}v_o(k) + \frac{C_{IN}}{T_S}(v_{PV}(k) - v_{PV}(k-1)) \quad (32)$$

where $T_s$ is the sampling period of the MPC; hence, (32) is an observer model for PV current to eliminate the current sensor. SCM is shown to be based on the model-based design principle, which integrates within the MPC framework for MPPT as in (33), and the process is illustrated in the flowchart FIG. 38.

$$\min g_{\sigma \in \{0,1\}} = |\tilde{v}^\sigma_{PV}(k+1) - v^*_{PV,ref}(k)| \quad (33)$$

subject to $\tilde{v}^{\sigma=1}_{PV}(k+1) = \left(\frac{1-D}{nD}\right)\left[1 - \frac{T_s}{RC}\right]v_o(k)$ -continued $$\tilde{v}^{\sigma=0}_{PV}(k+1) = \left(\frac{1-D}{nD}\right)\left[1 - \frac{T_s}{RC} + \frac{T_s}{RC(1-D)}\right]v_o(k)$$

$$\tilde{I}_{PV}(k) = \frac{nD}{(1-D)R}v_o(k) + \frac{C_{IN}}{T_s}(v_{PV}(k) - v_{PV}(k-1))$$

whereas, $v^*_{PV,ref}(k) = \begin{cases} v_{PV}(k) - |\Delta \tilde{v}|, \mu < 0 \\ v_{PV}(k) + |\Delta \tilde{v}|, \mu > 0 \end{cases}$ for $\mu$ The model-based framework of MPC is utilized to develop an MPPT algorithm that eliminates the input side current sensor in a PV energy harvesting system. The implementation of MPC realizes the observer based SCM being fundamentally model-based design, expressed within the cost function. The formulation of the state estimation MPC for MPPT is thoroughly explained and demonstrated experimentally on a PV system based on a flyback converter as in FIG. 37. However, the present technology can also be applied to other converter topologies by merely modifying the MPC formulation.

Figure 39:
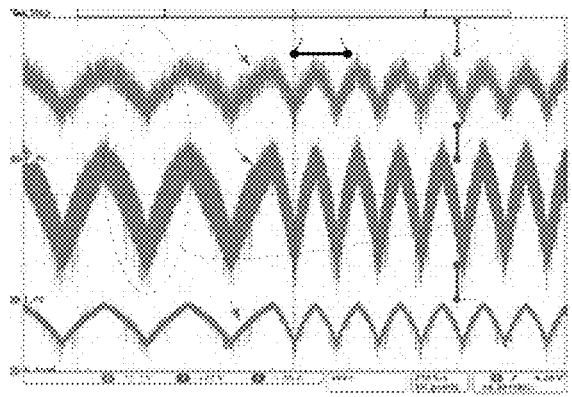
FIG. 39 includes diagrams illustrating portion of the EN 50530 standardized test applied to the experimental setup according to an embodiment of the present disclosure. (a) Oscilloscope waveforms of the experimental setup running an ASC-MPPT algorithm for an hour and ten minutes long portion of the EN50530 standardized test. PV voltage, PV current and Load voltage do show acceptable tracking throughout the timeframe of the test; (b) Actual circuit operation power waveform calculated for the experimental setup running the ASC-MPPT algorithm and compared to the theoretical MPP; and (c) Control efficacy of the algorithm throughout the portion of the test. Upper and lower boundaries are calculated by accounting for instrumentation precision.
Figure 39:
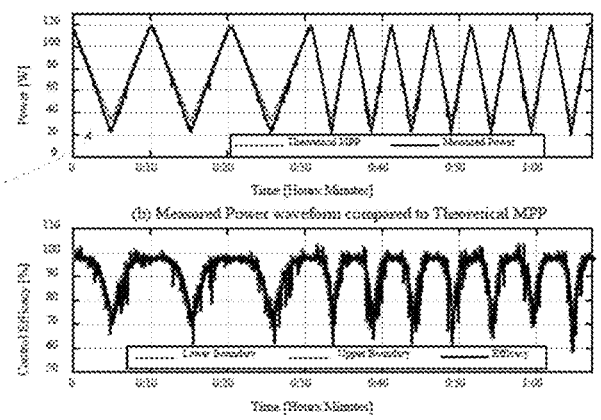

Experimental results in FIG. 39 show the performance of an MPPT controller with MPC state estimation approach to reduce sensors. These results indicate similar performance of the current sensor-less algorithm compared to other well-known algorithm based on the current sensor.

A Controller that Adjusts Switching Frequency and Reduces Switching Losses by Controlling Fidelity via Selecting a Suboptimal Switching State Achieving a high fidelity model using MPC in power electronics requires switching at high frequencies. Losses in the power semiconductor devices increase as switching frequency increases (the number of times the switches turn on or off). On the other hand, the fidelity performance increases with the increase of switching frequency. There is a trade-off between high fidelity performance and low switching losses. The MPC cost function selects the switching state that results in maximized system fidelity as a default, without any consideration for switching losses.

Low switching losses is important because the lower switching losses increase the overall efficiency and reduce the operating temperature of the converter. This temperature reduction results in reduced thermal stress on the semiconductor devices and other onboard sensors, and the result will be an increase in converter service life and reduction in maintenance cost.

Figure 40:
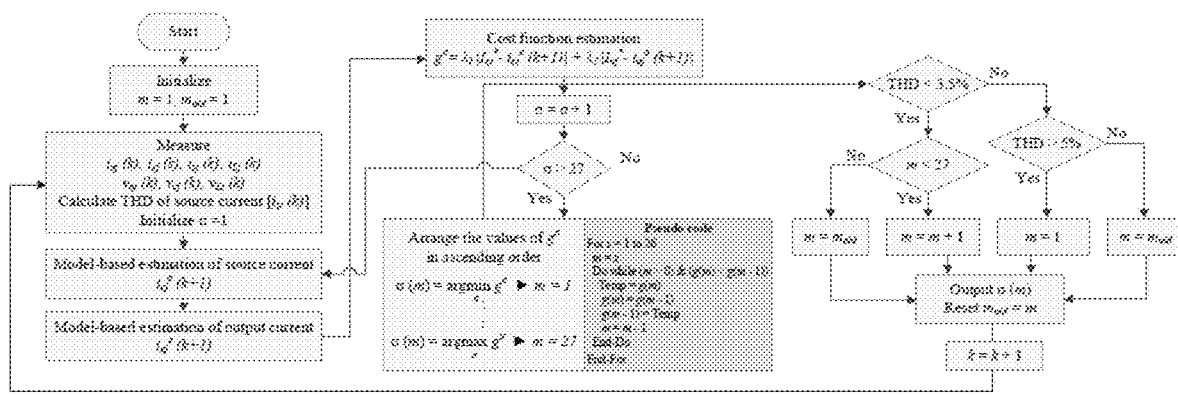
FIG. 40 is a flowchart of a controller that achieves desirable fidelity by operating at a suboptimal switching state according to an embodiment of the present disclosure.

The present disclosure provides a technology that minimizes switching losses in a power converter. The present technology ensures that the system operates within an acceptable fidelity range at a lower switching frequency. This is achieved by controlling high fidelity by operating at a suboptimal switching configuration as is illustrated in FIG. 40.

Figure 41:
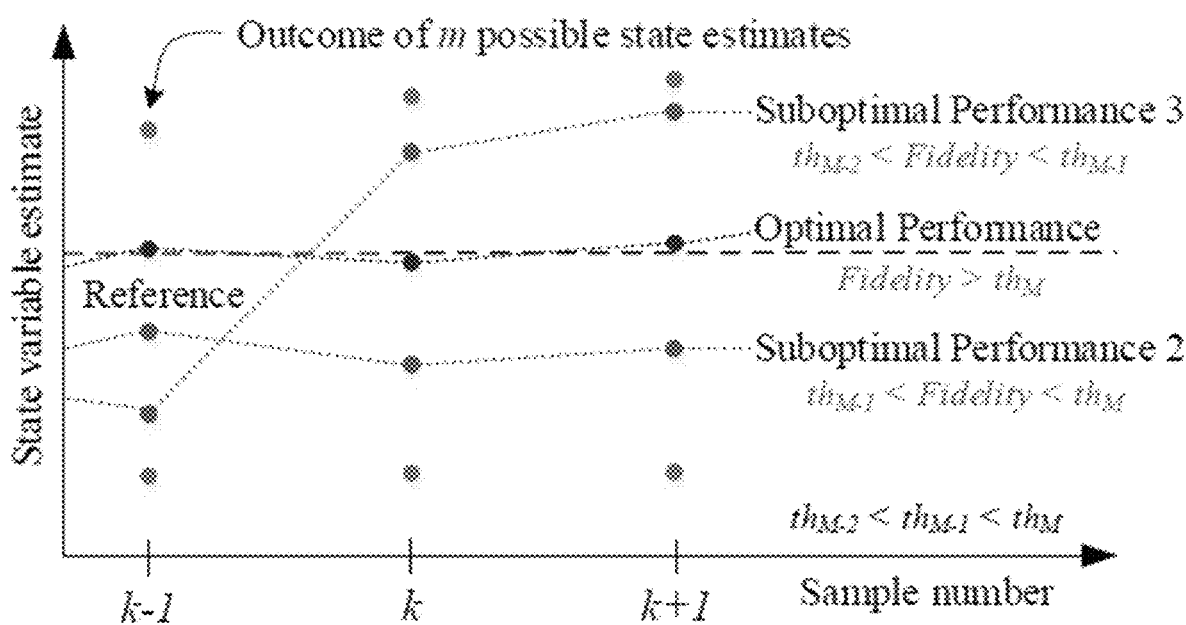
FIG. 41 is a diagram illustrating model predictive controller selecting the switching configuration that achieves the most optimal fidelity according to an embodiment of the present disclosure. The present technology controls the system fidelity based on user specified thresholds (th). When the performance fidelity is beyond the specified $th_M$, the most optimal switching configuration is selected. As the fidelity rises, the present technology selects the second best switching configuration to reduce switching frequency.

As illustrated in FIG. 41, the present technology controls the system fidelity based on user specified thresholds (th). When the performance fidelity is beyond the specified $th_M$, the most optimal switching configuration is selected. As the fidelity rises, the present technology selects the second best switching configuration to reduce switching frequency.

Without loss of generality or overly narrowing the present technology, the following provides a possible application example to illustrate the operation of the present technology. In a capacitor-less D-STATCOM, illustrated in FIG. 31, system fidelity can be quantified by the total harmonic distortion (THD) of the source current. The IEEE 519-2014 recommended practice and requirements for harmonic control in electric power systems specify 5% as the THD requirement for power systems. In this application example, meeting THD requirement is sufficient and is expected. Minimizing THD much lower than the standard is not rewarded within the power system.

In FIG. 42A the controller seeks the most optimal fidelity and operates at a THD of 2% which is much lower than the recommended standard. The output for optimal fidelity is a consistently high switching frequency of 20 kHz. Switching losses in a power converter increase with the increase in switching frequency.

The present technology operates the controller suboptimally as long as the THD is below 5%. FIG. 42B demonstrates the performance of the present technology. At a THD of 2% the claimed controller operated the system suboptimally by switching to the second and third most optimal switching configurations. As is illustrated in FIG. 42B, operating at the third most optimal switching configuration results in a reduction in switching frequency from 20 kHz to 18 kHz.

During transients, illustrated in FIG. 42B as a load change, the present technology switches back to optimal fidelity performance to offset the increase in THD that resulted from the load change. Once the system is stabilized, the present technology operates on the second and third most optimal switching configurations to reduce the switching frequency.

A Controller that Adjusts Switching Frequency to Reduces Switching Losses by Controlling Fidelity by Permitting Larger Tracking Error Unlike fixed-frequency pulse width modulation techniques, finite control set MPC in power electronics operates using a variable switching frequency. Controller unit clock speed and code complexity factor into determining the maximum allowable sampling frequency. Operating at high frequencies for a long time increases switching losses. One solution is to consider slowing down the sampling time of the MPC regulator or to add a term in the cost function that controls switching frequency. Slowing down the MPC algorithm worsens dynamic performance measures (i.e. longer settling time during transients) which accordingly diminishes system fidelity.

Figure 43:
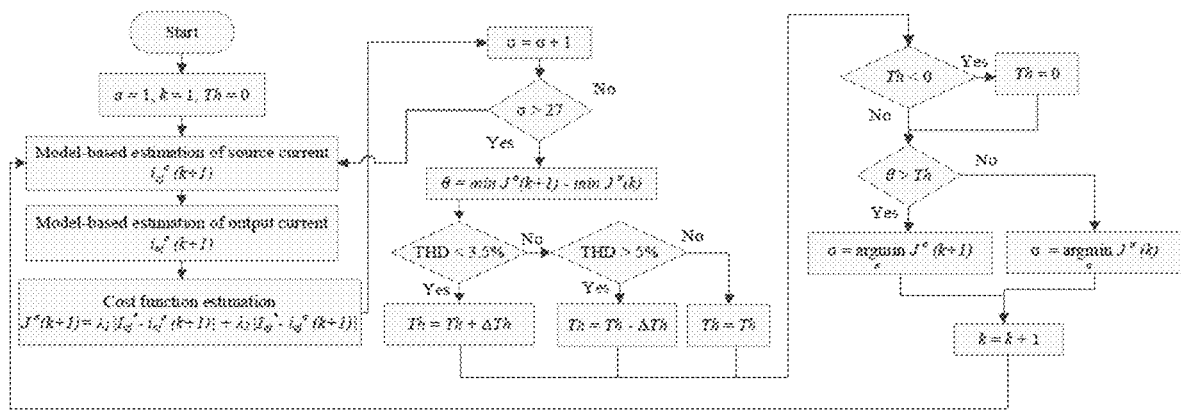
FIG. 43 is a flowchart of an algorithm that controls high fidelity to operate within the IEEE 519-2014 regulations while reducing switching frequency according to an embodiment of the present disclosure.

The present disclosure provides a controller that controls fidelity to reduce switching frequency and switching losses within a permissible range of harmonic distortion. The present technology is based on a variable controller that can use high switching frequency during transients to improve the model fidelity and can operate at a lower frequency during steady-state while meeting THD requirements. The flowchart in FIG. 43 illustrates an approach to optimize between fidelity and switching frequency. The overall objective is to control high fidelity performance with THD lower than 3.5%.

Without loss of generality, a capacitorless D-STATCOM has estimated output and input currents of D-STATCOM unit at interval (k+1) is written as:

$$i_{oj}^{\sigma}(k+1) = \left(1 - \frac{R_{L_{MCj}}T_s}{L_{MCj}}\right)i_{oj}(k) + \frac{T_s}{L_{MCj}}v_{oj}(k) \quad (34)$$

$$i_{cn}^{\sigma}(k+1) = A_{q(2,1)}V_{en}(k) + A_{q(2,2)}i_{cn}(k) + B_{q(2,1)}V_{Busn}(k) + B_{q(2,2)}i_e(k) \quad (35)$$

where, $A_q = e^{A_C T_s}$ and $B_q = \int_0^{T_s} e^{A_C(T_s-T)}B_C dT$

The cost function at interval (k+1) for each of the 27 states of matrix converter is calculated as:

$$J = \lambda_1(|I_{cA}^{\sigma}-i^*_{cA}|+|I_{cB}^{\sigma}-i^*_{cB}|+|I_{cC}^{\sigma}-i^*_{cC}|)+\lambda_2(|I_{oa}^{\sigma}-i^*_{oa}|+|I_{ob}^{\sigma}-i^*_{ob}|+|I_{oc}^{\sigma}-i^*_{oc}|) \quad (36)$$

The minimum error value min $J^{\sigma}(k+1)$ is determined and compared to the minimum error value of the previous cycle as is shown in $$\theta = \min J^{\sigma}(k+1) - \min J^{\sigma}(k) \quad (37)$$

An error threshold (Th) is introduced to eliminate the need for switching if $\theta$ is below Th. The value for Th is adjusted according to the source current THD as is shown in $$Th = \begin{cases} Th + \Delta Th, & THD < 3.5\% \\ Th - \Delta Th, & THD > 5\% \\ Th, & 3.5\% < THD < 5\% \end{cases} \quad (38)$$

where, $\Delta Th$ is a designer-defined increment/decrement value based on desired system performance. If the value of $\theta$ is below Th, this indicates the capacitor-less D-STATCOM operating conditions have not remarkably changed since the previous sampling time, hence, the controller maintains the previous switching configuration. Otherwise, the algorithm commands changing the switching state to the configuration that minimizes $J^{\sigma}(k+1)$ as is shown in $$\sigma = \begin{cases} \min J^{\sigma}(k+1), & \theta > Th \\ \min J^{\sigma}(k), & \theta < Th \end{cases} \quad (39)$$

where $\sigma$ indicates the switching configuration number from 1 to 27 that is commanded to the capacitor-less D-STATCOM gate drivers.

MATLAB/Simulink environment was used to perform all the simulation studies. The first aim to study the impact of different threshold values on source current distortion (THD) and switching frequency. The simulation model shown in FIG. 31 was used with parameters as in Table 4. The goals of this simulation is to find the value of threshold that reduce the switching frequency and provide the required compensation to keep the source current less than 5% THD.

TABLE 4

Simulation Parameters of Capacitorless D-STATCOM.

| PARAMETER | VALUE |
|---|---|
| Voltage, $V_{LL, rms}$ | 415 V |
| Frequency | 50 Hz |
| Source impedance ($L_s$) | 3.5 mH |
| Linear load power | 4.1 kVA, pf = 0.812 |
| Non-Linear load power | 1000 W |
| Non-linear load output capacitor | 400 uF |
| Output chokes inductance $L_{MC}$ | 36 mH |
| Input filter parisitic resistance $R_f$ | 1 Ω |
| Input filter inductance $L_f$ | 2 mH |
| Input filter capacitor $C_{fph}$ | 18 uF |
| Sampling time $T_s$ | 40 μs |
| Weight factor $\lambda_1$ | 2 |
| Weight factor $\lambda_2$ | 1 |
| Threshold value | 0-5 |

Figure 46:
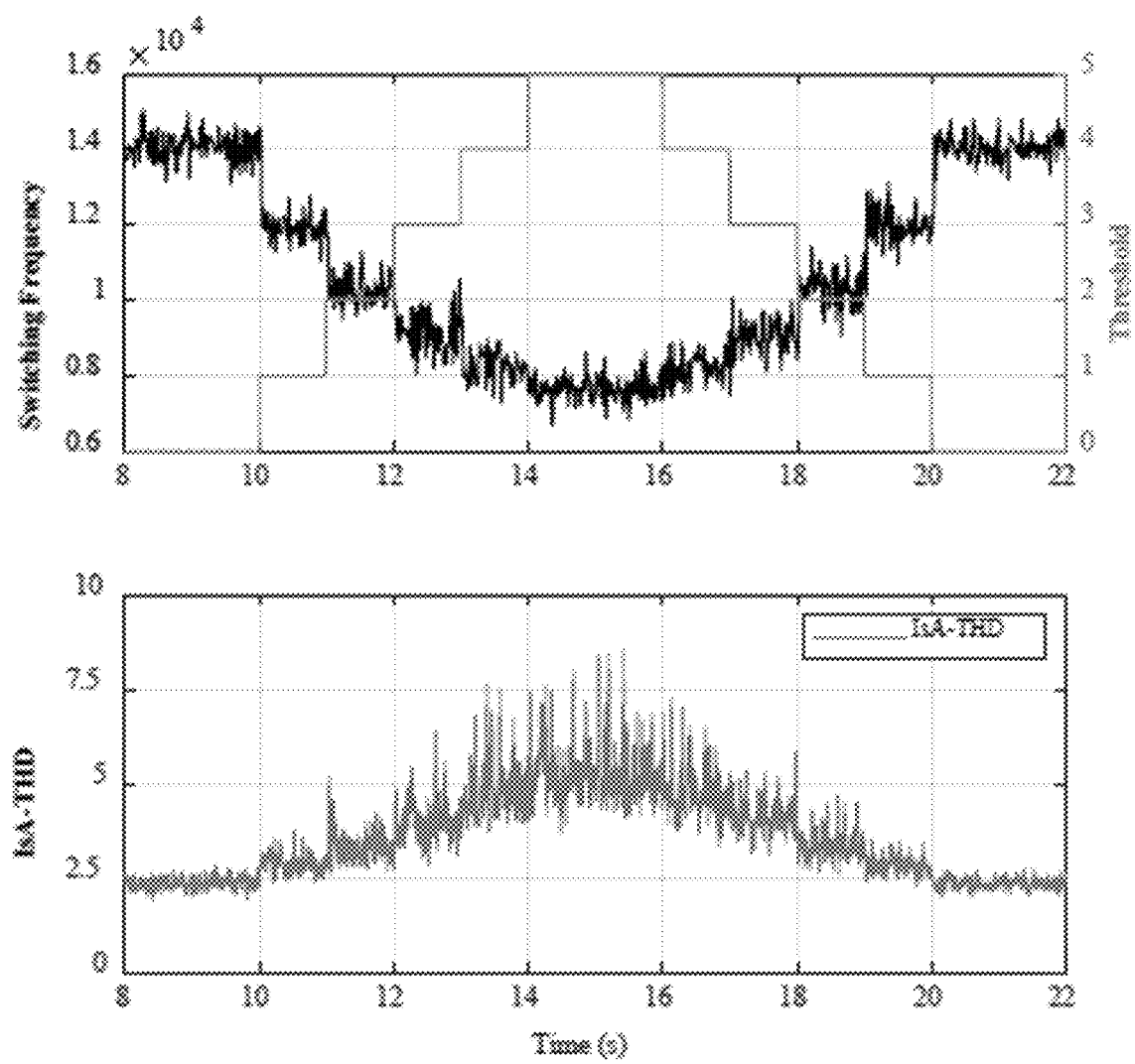
FIG. 46 includes diagrams illustrating simulation results of the impact of threshold value variation on switching frequency and source current THD according to an embodiment of the present disclosure.

FIG. 46 shows how the variation of threshold value from zero to 5 and its impact on the source current THD and switching frequency. It can be seen that, selecting a threshold value around 3 guarantees that the source THD is less than 5% and the switching frequency is reduced from 14 to 8 kHz. Achieving lower THD (higher system fidelity) results in higher switching frequency. One could also observe that meeting IEEE 519-2014 5% THD specifications requires operating at 8 kHz, while the highest possible switching frequency is closer to 14 kHz.

Figure 44:
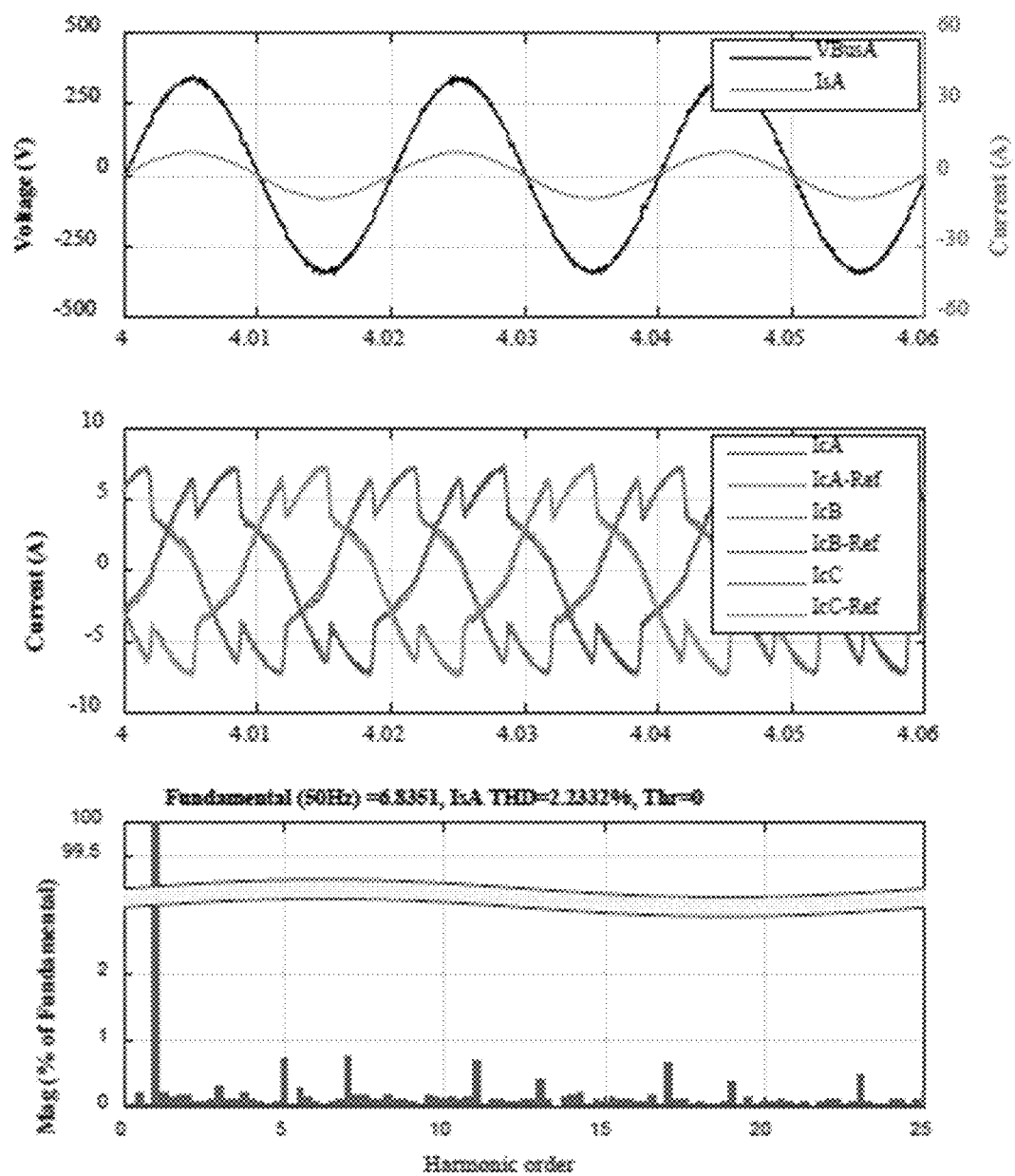
FIG. 44 includes diagrams illustrating simulation results showing source voltage and current, D STATCOM compensation currents tracking, and source current THD according to an embodiment of the present disclosure. (Threshold=0).

To see the impact on the waveforms, FIG. 44 shows simulation results of system waveforms after connecting D-STATCOM and with the threshold value of zero. This means that the MPC will look for the best switching state that results in a minimum error between the reference and measured compensation current. It can be seen that, the D-STATCOM provides the required compensation to keep the source voltage and currents in-phase and guarantee good reference tracking of compensation current (Ic) and source current THD is less than 3% as recommended by the standards.

Figure 47:
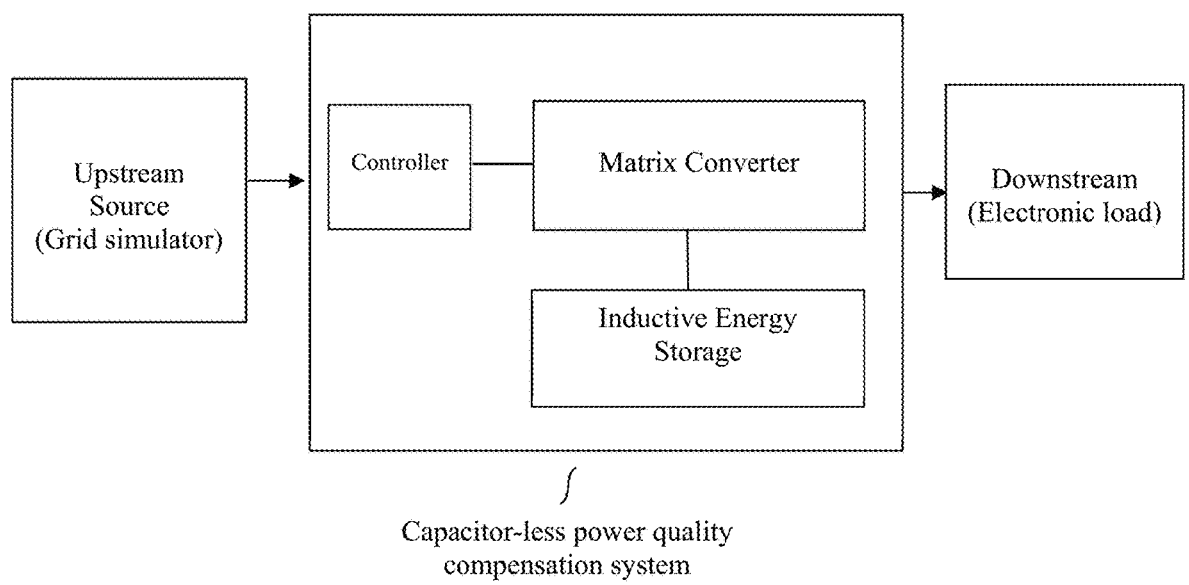
FIG. 47 is a block diagram of test bed including a capacitor-less power quality compensation system according to an embodiment of the present disclosure.

The performance of the D-STATCOM with a threshold value of 5 is shown in FIG. 47. It can be observed that the performance of the D-STATCOM is still within the acceptable range, provided that the switching frequency is reduced by 33% from 14 kHz to 8 kHz.

FIG. 44 shows D-STATCOM performance with step change in load currents without enabling the proposed adaptive MPC. It can be observed that the switching frequency is around 14 khz and THD of source current is below 2.5%.

The controller of the present technology will keep the source current bellow the defined limits by the IEEE519 recommended standards while reducing the switching frequency values to more than 30% to allow a reduction in switching losses.

Figure 45:
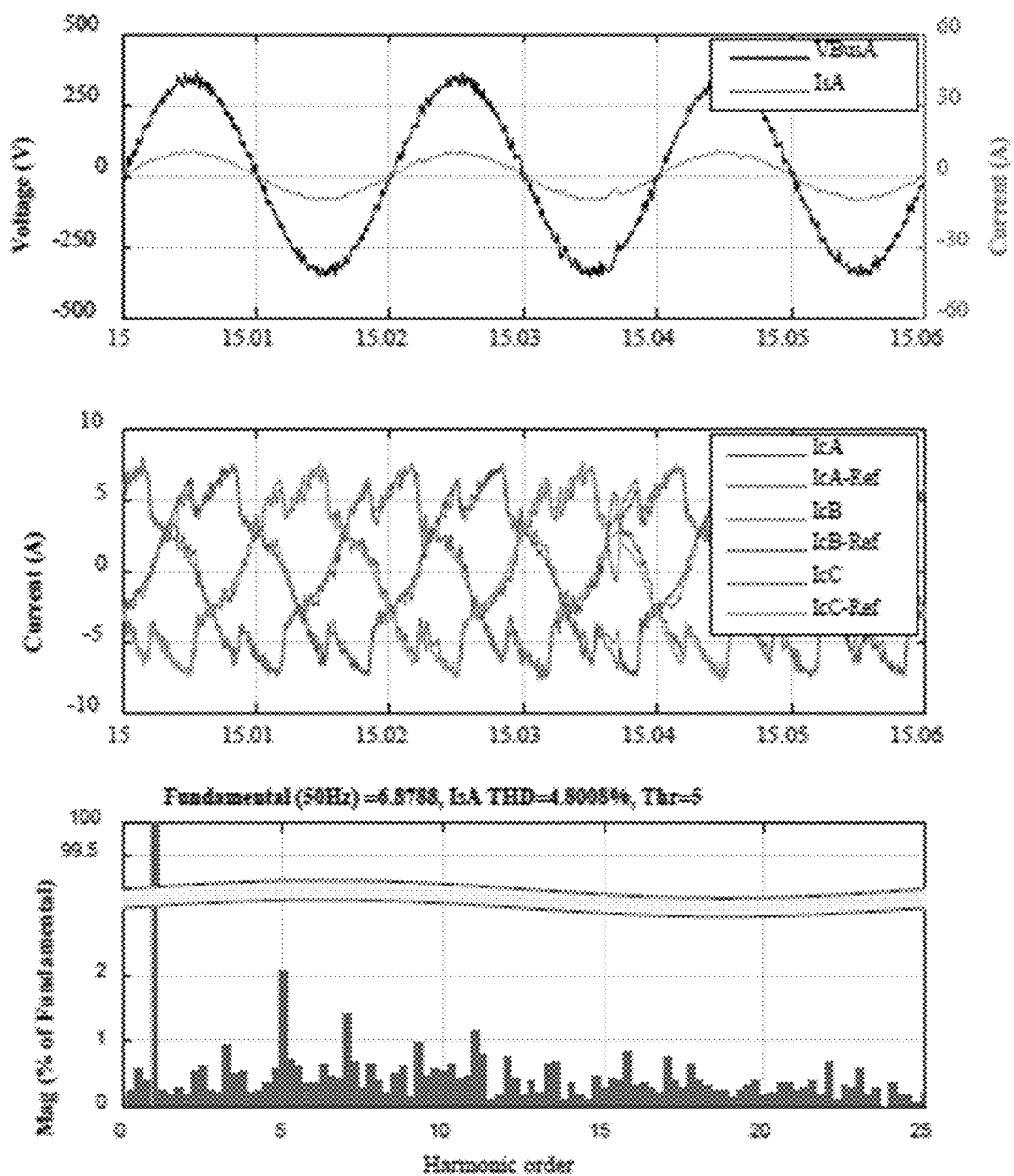
FIG. 45 includes diagrams illustrating simulation results showing source voltage and current, D STATCOM compensation currents tracking, and source current THD according to an embodiment of the present disclosure. (Threshold=5).

FIG. 44 shows D-STATCOM performance connection and disconnection of the non-linear load. From top to bottom, as the load current change at t=4.5 and 6 s. As the load current increase at time 4.5 s, the THD of source current is reduced and according to that the threshold value is increased to from 3 to 5.5 to bring down the switching frequency value. FIG. 45 shows source current THD, and it can be seen that the THD value lays within 5% according to the recommended standards.

Figure 48:
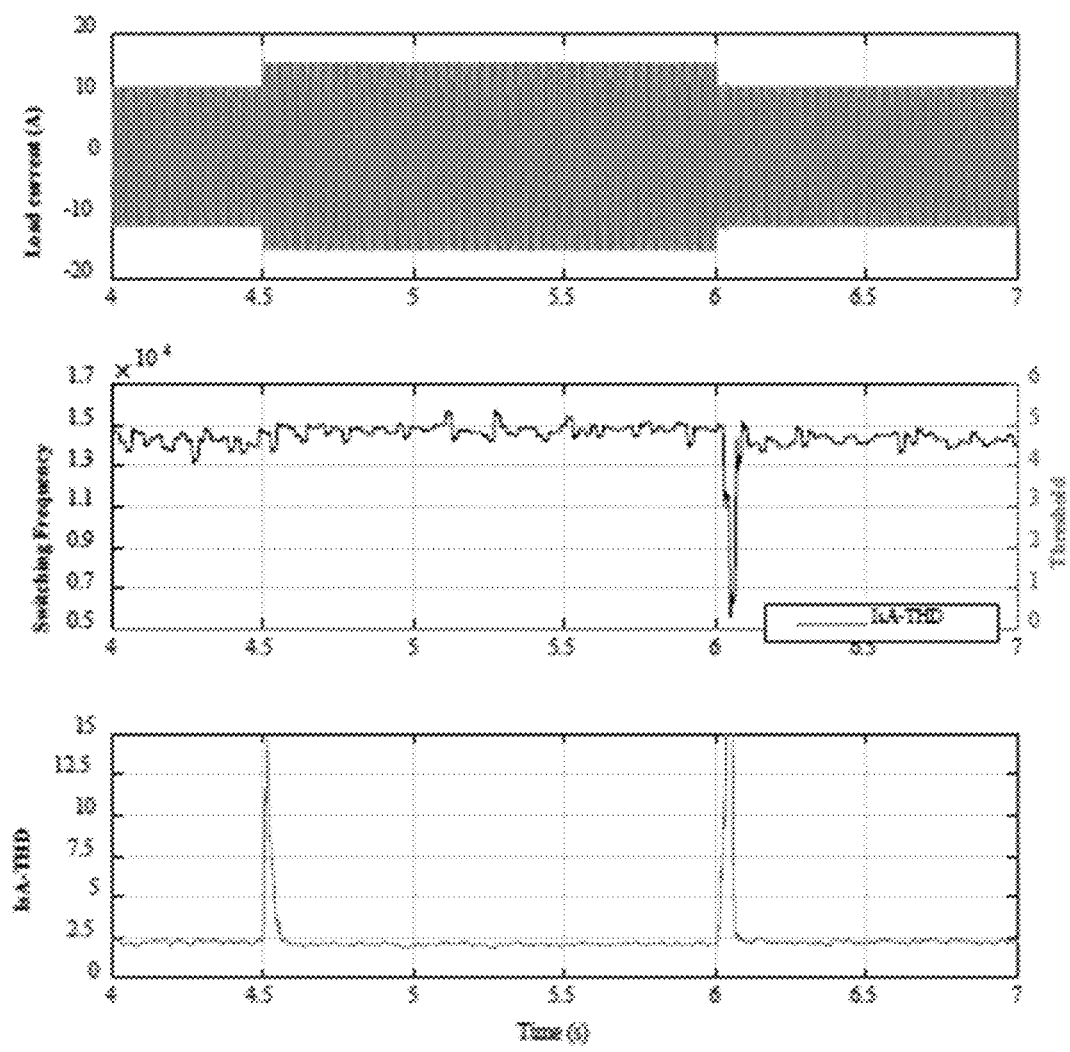
FIG. 48 includes diagrams illustrating simulation results of D-STATCOM performance during step change of load currents according to an embodiment of the present disclosure. The adaptive MPC controller is not enabled. It can be seen that the average switching frequency is around 14 kHz and the THD of source current below 2.5%.
Figure 49:
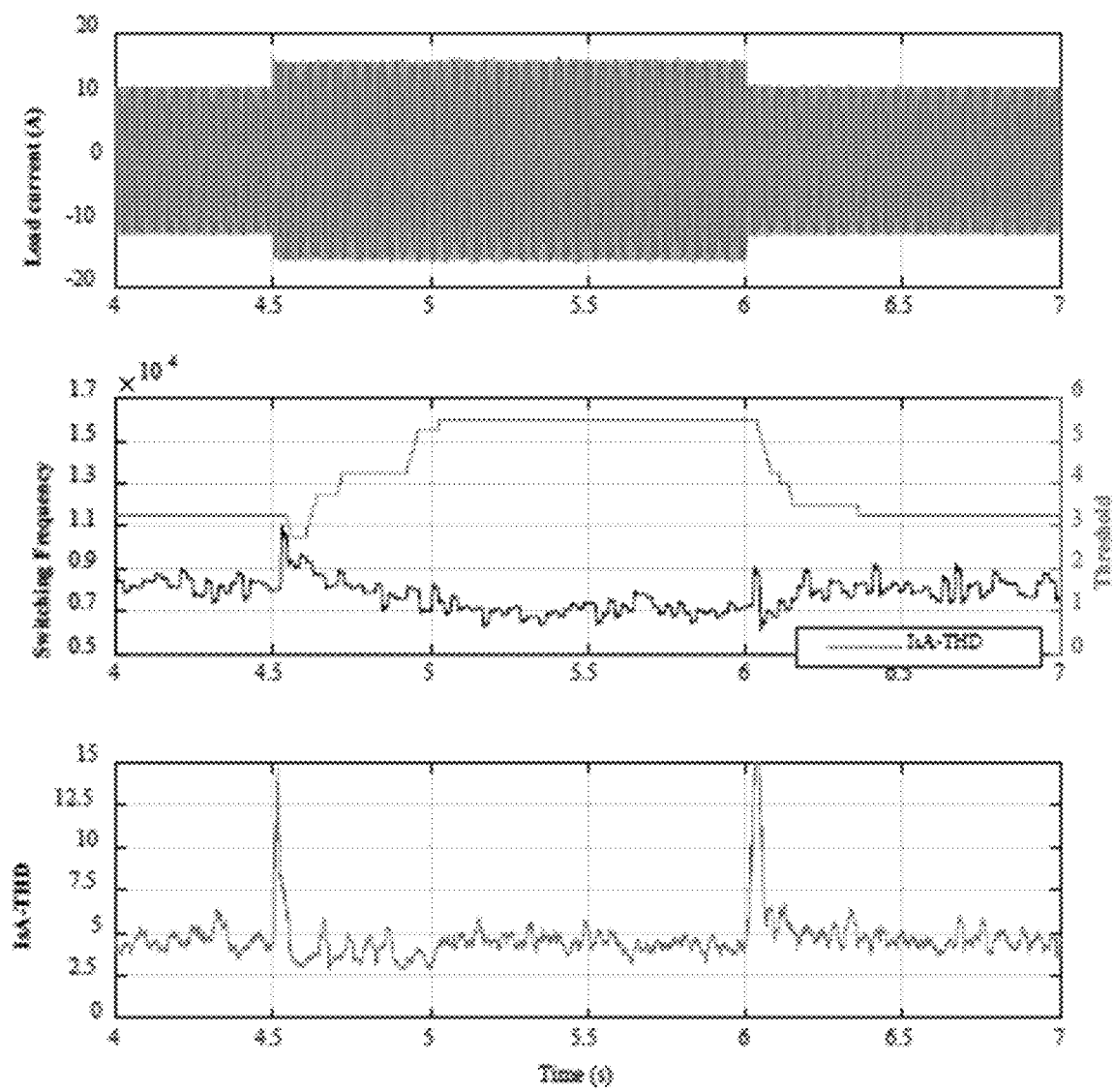
FIG. 49 includes diagrams illustrating simulation results showing D-STATCOM performance during step change of load currents according to an embodiment of the present disclosure. The adaptive MPC controller is able to maintain good system performance with more than 30% reduction of switching frequency.

Experimental results are obtained using a 7.5 kVA capacitor-less D-STATCOM based matrix converter topology as shown in FIG. 47. The dSPACE Scalexio is used to control the matrix converter system, the controller consists of processing unit to run MPC algorithm and other software protection codes, and dSPACE LAbBox that have four FPGA modules to perform measurments of system currents and voltages using 16 bit ADC, fourstep commutation, and hardware protection. A 12 kVA three-phase grid simulator (NHR-9410) with series impedance is used to emulate upstream side of distribution network. Downstream (load side) is emulated using Cinergia 15 kVA electronic load. The dSPACE ControlDesk software is used to supervise and control the experiment in real-time and view. FIGS. 48 and 49 show experimental results of the D-STATCOM performance with threshold value change. As the threshold value change from 0 to six as in the simulation study, the source current THD increase as the threshold value increase, while the switching frequency is reduced with the threshold increase. It can be seen that the threshold value of four will reduce switching frequency by 33% from 4500 Hz to 3000 Hz while keeping source current THD below 5%.

Figure 50:
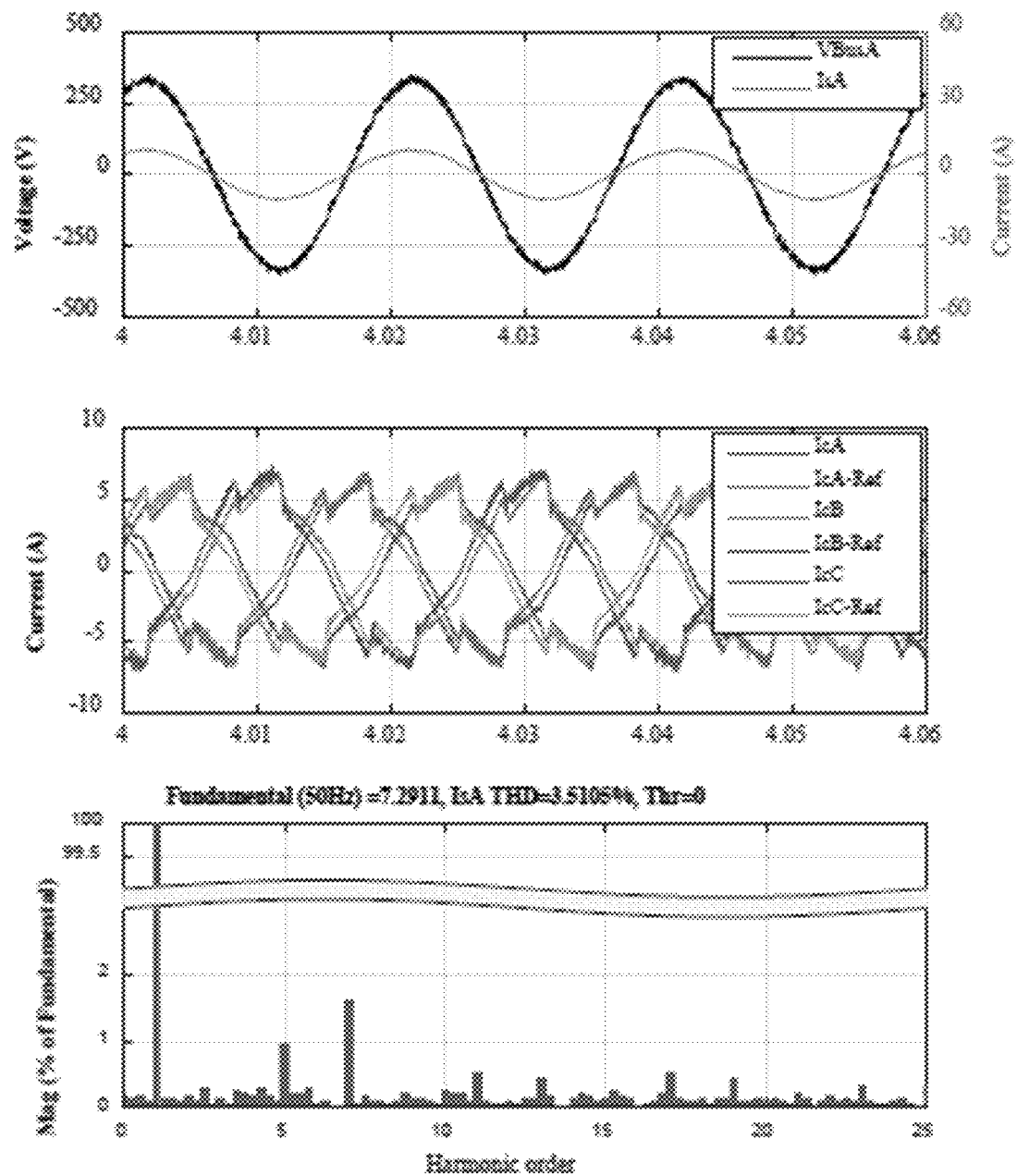
FIG. 50 includes diagrams illustrating experimental results showing source voltage and current, DSTATCOM compensation currents tracking, and source current THD according to an embodiment of the present disclosure. (Threshold=0).
Figure 51:
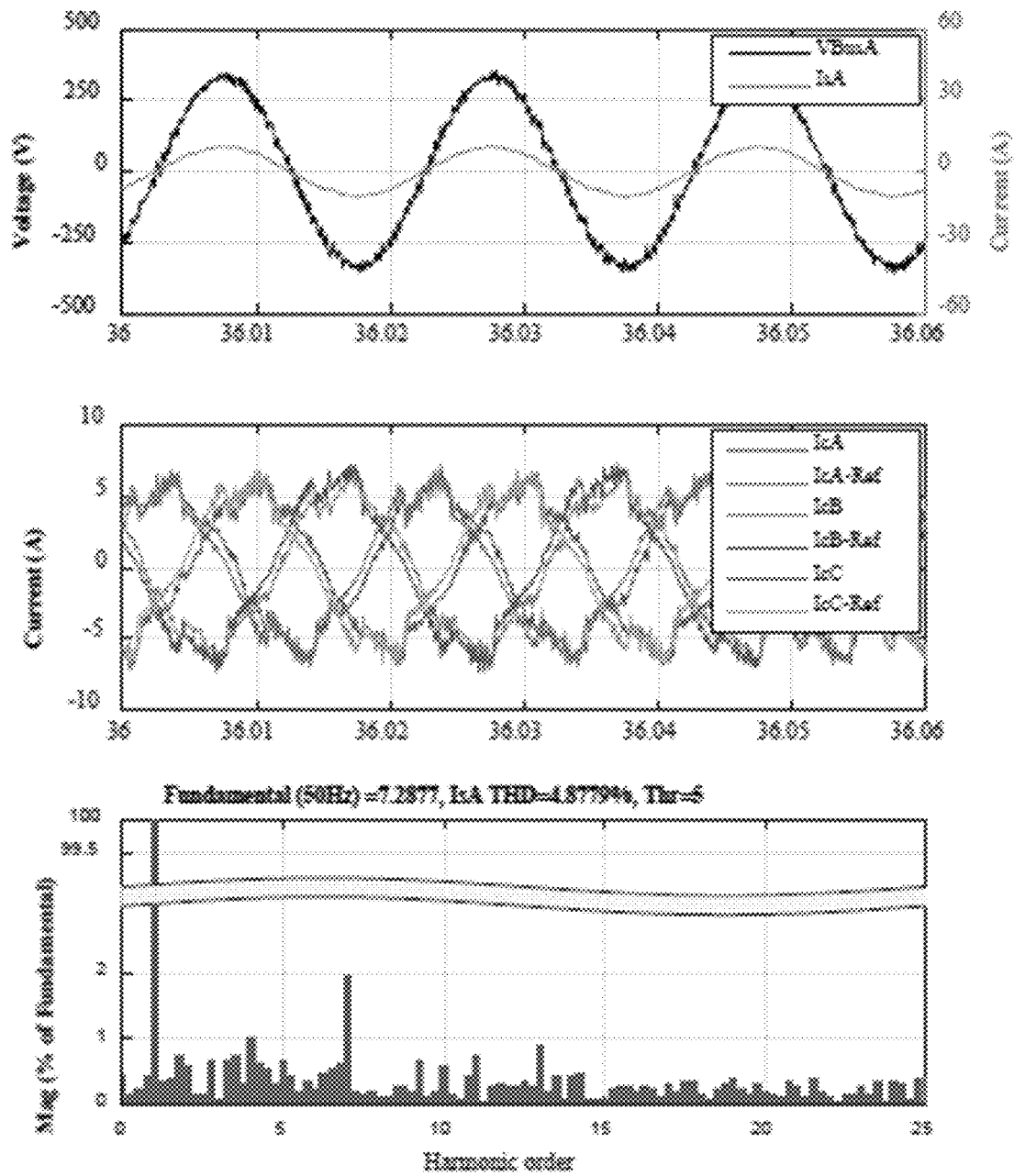
FIG. 51 includes diagrams illustrating experimental results showing source voltage and current, D-STATCOM compensation currents tracking, and source current THD according to an embodiment of the present disclosure. (Threshold=5).

FIG. 50 and FIG. 51 show experimental results of system performance with a threshold value of 0 and 5. As in the previous simulation results. It can be seen that the performance of the system during the simulation and experimental studies are similar.

A Controller that Adjusts Switching Frequency and Reduces Switching Losses by Controlling Fidelity by Adjusting Weighting Factors In a capacitor-less D-STATCOM, illustrated in FIG. 31, system fidelity can be quantified by the total harmonic distortion (THD) of the source current. The IEEE 519-2014 recommended practice and requirements for harmonic control, in electric power systems specify 5% as the THD requirement for power systems. Meeting THD requirement is sufficient and is expected. Minimizing THD much lower than 5% is not rewarded within the power system.

Figure 52:
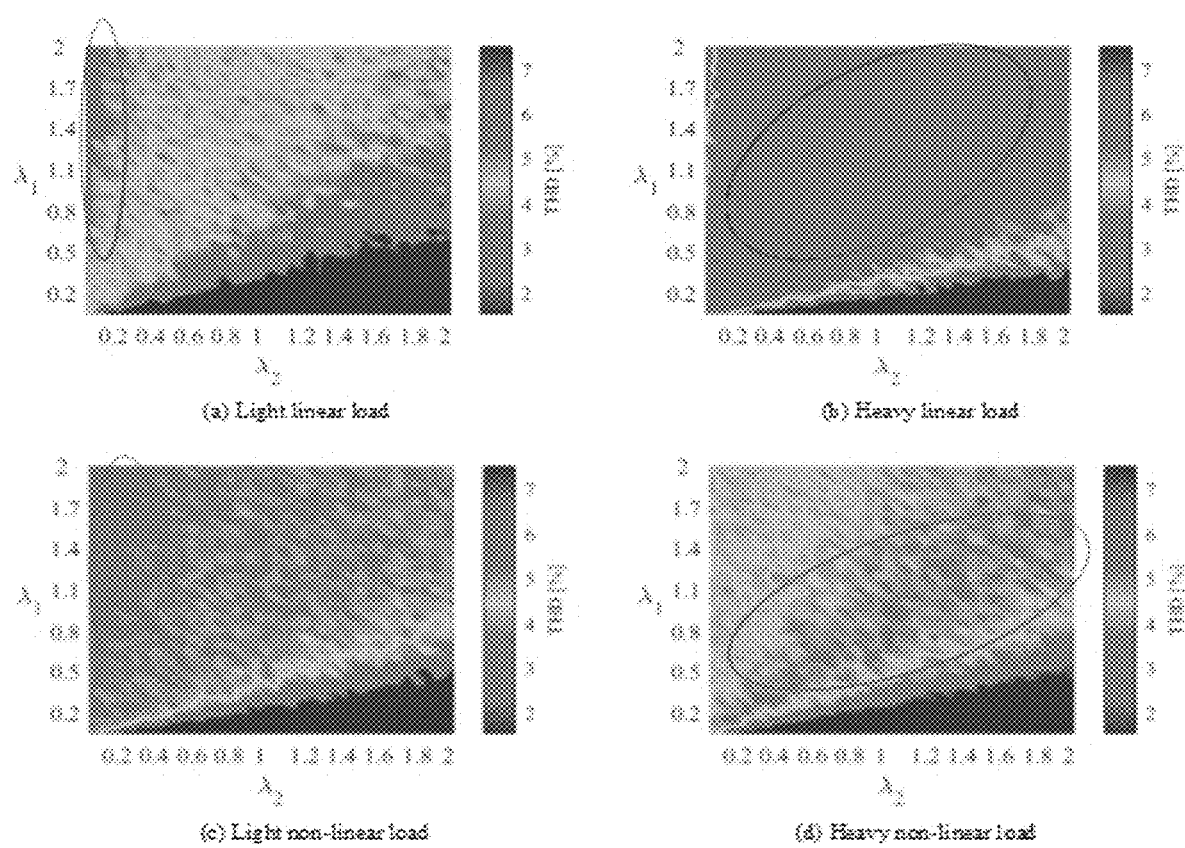
FIG. 52 includes diagrams illustrating simulation results of the impact of changing $\lambda 1$ and $\lambda 2$ on source current (Is) total harmonic distortion according to an embodiment of the present disclosure.

The present disclosure provides a technology that controls fidelity by adjusting weighting factors to reduce switching frequency and switching losses. A significant challenge in designing MPC for multi-objective control is to appropriately tune the respective weight factors to achieve the control objectives within the desired performance constraint. Weighting factors can be auto-tuned to satisfy different operation conditions. FIG. 52, based on 1600 simulation runs for each loading condition, illustrates the effect of changing the weighting factors $\lambda_1$ and $\lambda_2$ on fidelity—total harmonic distortion (THD). As can be noted, high fidelity can be observed at different weight factor values for each loading condition. This section further extends this contribution to reducing switching frequency.

Figure 53:
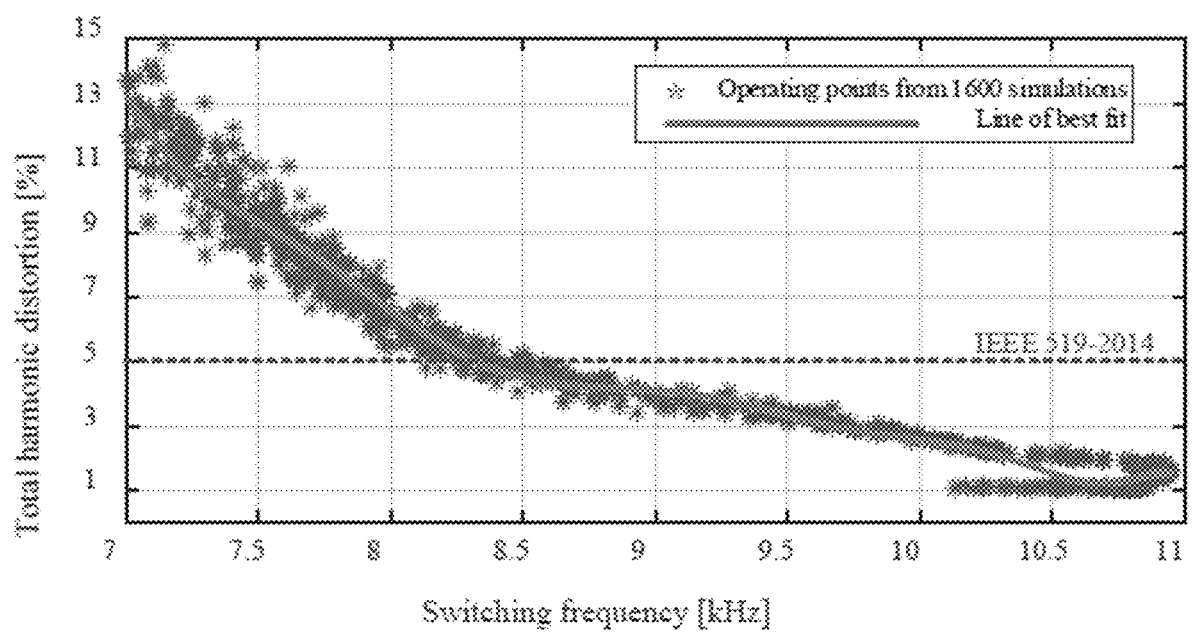
FIG. 53 is a scatter plot showing a trendline for switching frequency and total harmonic distortion (THD) from 1600 simulation runs according to an embodiment of the present disclosure. Overall THD is lower at higher switching frequency. Operating at a THD around 5% could potentially result in 2.8 kHz reduction in switching frequency.

Consider the scatter plot in FIG. 53 for 1600 simulations of the capacitorless VAR compensator with light non-linear load. Each point represents one simulation run with a different combination of weighting factors $[\lambda_1, \lambda_2]$ for the MPC cost function in (21). Using a simulation sampling time of 10 μs, the switching frequency and THD were observed for each run. The overall trendline in FIG. 53 indicates that achieving lower THD (higher system fidelity) results in higher switching frequency. One could also observe that meeting IEEE 519-2014 5% THD specifications requires operating at 8-8.5 kHz, while the highest possible switching frequency is closer to 11 kHz.

The adaptive cost function MPC of the present technology has been verified using MATLAB/Simulink simulation environment. Extensive simulations have been carried out for D-STATCOM based MC to validate this approach.

The first simulation results in FIG. 52 shows the impact of weight factors on the performance of the D-STATCOM. This is to sweep the value of weight factors λ1 and λ2 and try to visualize their impact on source current THD. Weight factors sweep were done for light and heavy linear and non-linear loads. FIG. 52 (a and c) shows the impact of changing the values of λ1 and λ2 on the source THD for light linear and non linear loads. It can be seen that for lower THD, λ1 should be always around 2 while λ2 should be less than 0.2. On the other hand, for heavy linear and non-linear loads the optimal value of λ2 that ensure low source current THD is in the range of 1.

A Controller that Controls Fidelity to Improve Reliability

Power electronic converter reliability depends in part on the employed modes of operation and commutation techniques of its switching devices. The MPC cost function selects the switching state that results in a maximized system fidelity, without any consideration to the impact on system reliability. In MPC, not all switching states are inherently equal in terms of the switching strain they put on the power devices. An unfavorable scenario is for the MPC controller to operate on a selection of switching states that maximize fidelity but overwork particular switches and result in reducing the overall converter reliability.

The present disclosure provides a technology that maximizes reliability in a power converter. The present technology ensures equitable stress distribution on the switches of a power converter. This is achieved by controlling the successive repetition of identical switching states within a pre-defined time window. As such, the converter may be operating sub-optimally in terms of fidelity, while operating within acceptable fidelity standards and maximizing reliability.

"Control effort—$\Phi$" is defined as the number of switches that change from being on to off and vice versa. Consider a phase leg with three switches with the second switch being on "1" and the first and third being off "0"; can also be written as 010. Changing the switching configuration from 010 to 001, involves changing the second and third switches; hence, the control effort is two.

Without loss of generality, the capacitorless D-STATCOM, controlled by MPC as shown in FIG. 31 has three legs, each with three switches, resulting in 27 possible switching configuration (also known as switching states). The 27 switching states are arranged in order so that the transition between each state and the next results in a control effort of two as shown in Table 5.

TABLE 5

D-STATCOM Switching States Arranged by Control Effort

| State no. | Sa | | | Sb | | | Sc | | |
|---|---|---|---|---|---|---|---|---|---|
| 1 | 0 | 0 | 1 | 0 | 0 | 1 | 0 | 0 | 1 |
| 2 | 0 | 0 | 1 | 0 | 0 | 1 | 0 | 1 | 0 |
| 3 | 0 | 0 | 1 | 0 | 0 | 1 | 1 | 0 | 0 |
| 4 | 0 | 0 | 1 | 1 | 0 | 0 | 1 | 0 | 0 |
| 5 | 0 | 0 | 1 | 1 | 0 | 0 | 0 | 1 | 0 |
| 6 | 0 | 0 | 1 | 1 | 0 | 0 | 0 | 0 | 1 |
| 7 | 0 | 0 | 1 | 0 | 1 | 0 | 0 | 0 | 1 |
| 8 | 1 | 0 | 0 | 1 | 0 | 0 | 0 | 0 | 1 |
| 9 | 1 | 0 | 0 | 0 | 1 | 0 | 0 | 0 | 1 |
| 10 | 1 | 0 | 0 | 0 | 0 | 1 | 0 | 0 | 1 |
| 11 | 0 | 1 | 0 | 0 | 0 | 1 | 0 | 0 | 1 |
| 12 | 0 | 1 | 0 | 0 | 0 | 1 | 0 | 1 | 0 |
| 13 | 0 | 1 | 0 | 0 | 0 | 1 | 1 | 0 | 0 |
| 14 | 0 | 1 | 0 | 0 | 1 | 0 | 1 | 0 | 0 |
| 15 | 0 | 1 | 0 | 0 | 1 | 0 | 0 | 0 | 1 |
| 16 | 0 | 1 | 0 | 0 | 1 | 0 | 0 | 1 | 0 |
| 17 | 0 | 0 | 1 | 0 | 1 | 0 | 0 | 1 | 0 |
| 18 | 1 | 0 | 0 | 0 | 1 | 0 | 0 | 1 | 0 |
| 19 | 1 | 0 | 0 | 0 | 0 | 1 | 0 | 1 | 0 |
| 20 | 1 | 0 | 0 | 1 | 0 | 0 | 0 | 1 | 0 |
| 21 | 0 | 1 | 0 | 1 | 0 | 0 | 0 | 0 | 1 |
| 22 | 0 | 1 | 0 | 1 | 0 | 0 | 0 | 0 | 1 |
| 23 | 0 | 1 | 0 | 1 | 0 | 0 | 1 | 0 | 0 |
| 24 | 1 | 0 | 0 | 1 | 0 | 0 | 1 | 0 | 0 |
| 25 | 1 | 0 | 0 | 0 | 0 | 1 | 1 | 0 | 0 |
| 26 | 1 | 0 | 0 | 0 | 1 | 0 | 1 | 0 | 0 |
| 27 | 0 | 0 | 1 | 0 | 1 | 0 | 1 | 0 | 0 |

Using the information from Table 5, a lookup table is developed for the control effort of each switching transition between the different 27 states as shown in Table 6. For example, switching from state "15" to "25' has a control effort ($\Phi$) of six, while switching from state "15" to "14" has a control effort ($\Phi$) of two.

TABLE 6

Control Effort for Changing between Different States

| | State no. | Next switching state | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| Present | 1 | 0 | 2 | 2 | 4 | 4 | 2 | 2 | 4 | 4 | 2 | 2 | 4 | 4 | 6 | 4 | 6 | 4 | 6 | 4 | 6 | 6 | 4 | 6 | 6 | 4 | 6 | 4 |
| switch- | 2 | 2 | 0 | 2 | 4 | 2 | 4 | 4 | 6 | 6 | 4 | 4 | 2 | 4 | 6 | 6 | 4 | 2 | 4 | 2 | 4 | 4 | 6 | 6 | 6 | 4 | 6 | 4 |
| ing | 3 | 2 | 2 | 0 | 2 | 4 | 4 | 4 | 6 | 6 | 4 | 4 | 4 | 2 | 4 | 6 | 6 | 4 | 6 | 4 | 6 | 6 | 6 | 4 | 4 | 2 | 4 | 2 |
| state | 4 | 4 | 4 | 2 | 0 | 2 | 2 | 4 | 4 | 6 | 6 | 6 | 6 | 4 | 4 | 6 | 4 | 6 | 6 | 4 | 4 | 4 | 2 | 2 | 4 | 4 | 4 | 2 |
| | 5 | 4 | 2 | 4 | 2 | 0 | 2 | 4 | 6 | 6 | 6 | 4 | 6 | 6 | 6 | 4 | 2 | 4 | 4 | 2 | 2 | 4 | 4 | 4 | 6 | 6 | 6 | 4 |
| | 6 | 2 | 4 | 4 | 2 | 2 | 0 | 2 | 4 | 4 | 4 | 6 | 6 | 6 | 4 | 6 | 4 | 6 | 6 | 4 | 4 | 2 | 4 | 4 | 6 | 6 | 6 | 4 |
| | 7 | 2 | 4 | 4 | 4 | 4 | 2 | 0 | 4 | 2 | 4 | 4 | 6 | 4 | 2 | 4 | 2 | 4 | 6 | 6 | 4 | 6 | 6 | 6 | 4 | 2 | | |
| | 8 | 4 | 6 | 6 | 4 | 6 | 4 | 4 | 0 | 2 | 2 | 4 | 6 | 6 | 4 | 6 | 4 | 6 | 4 | 2 | 4 | 2 | 4 | 2 | 4 | 4 | 6 | |
| | 9 | 4 | 6 | 6 | 6 | 6 | 4 | 2 | 2 | 0 | 2 | 4 | 6 | 4 | 2 | 4 | 4 | 2 | 4 | 4 | 6 | 4 | 6 | 4 | 4 | 2 | 4 | |
| | 10 | 2 | 4 | 4 | 6 | 6 | 4 | 4 | 2 | 2 | 0 | 2 | 4 | 4 | 6 | 4 | 6 | 4 | 2 | 4 | 6 | 4 | 6 | 4 | 2 | 4 | 6 | |
| | 11 | 2 | 4 | 4 | 6 | 6 | 4 | 4 | 4 | 4 | 2 | 0 | 2 | 2 | 4 | 2 | 4 | 6 | 6 | 4 | 6 | 4 | 2 | 4 | 6 | 4 | 6 | 6 |
| | 12 | 4 | 2 | 4 | 6 | 4 | 6 | 6 | 6 | 6 | 4 | 2 | 0 | 2 | 4 | 4 | 2 | 4 | 4 | 2 | 4 | 2 | 4 | 4 | 6 | 4 | 6 | 6 |
| | 13 | 4 | 4 | 2 | 4 | 6 | 6 | 6 | 6 | 4 | 4 | 2 | 2 | 0 | 2 | 4 | 4 | 6 | 6 | 4 | 6 | 4 | 4 | 2 | 4 | 2 | 4 | 4 |
| | 14 | 6 | 6 | 4 | 4 | 6 | 6 | 4 | 4 | 2 | 6 | 4 | 4 | 2 | 0 | 2 | 2 | 4 | 4 | 6 | 6 | 4 | 4 | 2 | 4 | 4 | 2 | 2 |
| | 15 | 4 | 6 | 6 | 6 | 6 | 4 | 2 | 4 | 2 | 4 | 2 | 4 | 4 | 2 | 0 | 2 | 4 | 4 | 6 | 6 | 4 | 2 | 4 | 6 | 6 | 4 | 4 |
| | 16 | 6 | 4 | 6 | 6 | 4 | 6 | 4 | 4 | 6 | 4 | 6 | 4 | 2 | 4 | 2 | 2 | 0 | 2 | 2 | 4 | 4 | 2 | 4 | 4 | 6 | 6 | 4 |
| | 17 | 4 | 6 | 2 | 4 | 2 | 4 | 2 | 6 | 4 | 6 | 6 | 4 | 6 | 4 | 4 | 2 | 0 | 2 | 4 | 4 | 4 | 6 | 6 | 6 | 4 | 2 | |
| | 18 | 6 | 4 | 6 | 6 | 4 | 6 | 4 | 4 | 2 | 4 | 6 | 4 | 4 | 2 | 2 | 0 | 2 | 2 | 6 | 6 | 4 | 2 | 4 | 6 | 4 | 2 | | |
| | 19 | 4 | 2 | 4 | 6 | 4 | 6 | 6 | 4 | 2 | 4 | 2 | 4 | 6 | 6 | 4 | 2 | 0 | 2 | 4 | 6 | 6 | 2 | 4 | 6 | | | |
| | 20 | 6 | 4 | 6 | 4 | 2 | 4 | 6 | 2 | 4 | 6 | 4 | 6 | 6 | 4 | 2 | 2 | 0 | 2 | 4 | 4 | 2 | 4 | 4 | 6 | | | |
| | 21 | 6 | 4 | 6 | 4 | 2 | 4 | 6 | 4 | 6 | 6 | 4 | 4 | 2 | 4 | 4 | 2 | 0 | 2 | 2 | 4 | 6 | 6 | 6 | | | | |
| | 22 | 4 | 6 | 6 | 4 | 4 | 2 | 4 | 2 | 4 | 2 | 4 | 4 | 2 | 4 | 6 | 6 | 4 | 2 | 0 | 2 | 4 | 6 | 6 | 6 | | | | |
| | 23 | 6 | 6 | 4 | 2 | 4 | 4 | 6 | 4 | 6 | 4 | 4 | 2 | 2 | 4 | 6 | 6 | 6 | 4 | 2 | 2 | 0 | 2 | 4 | 4 | 4 | | | |
| | 24 | 6 | 6 | 4 | 2 | 4 | 4 | 6 | 2 | 4 | 4 | 6 | 4 | 6 | 6 | 4 | 4 | 2 | 4 | 4 | 2 | 0 | 2 | 2 | 4 | | | | |
| | 25 | 4 | 4 | 2 | 4 | 6 | 6 | 6 | 4 | 4 | 2 | 4 | 2 | 4 | 6 | 6 | 4 | 2 | 4 | 6 | 6 | 4 | 2 | 0 | 2 | 4 | | | |
| | 26 | 6 | 6 | 4 | 4 | 6 | 6 | 4 | 4 | 2 | 6 | 4 | 4 | 2 | 4 | 4 | 2 | 4 | 6 | 6 | 6 | 2 | 2 | 0 | 2 | | | | |
| | 27 | 4 | 4 | 2 | 2 | 4 | 4 | 2 | 6 | 4 | 6 | 6 | 6 | 4 | 2 | 4 | 4 | 2 | 4 | 6 | 6 | 6 | 4 | 4 | 4 | 2 | 0 | | |

Choosing the most optimal switching achieves the highest fidelity but compromises on switching losses (as the system has a higher switching frequency). Another compromise of switching optimally is reduced system reliability. Consider Table 7 illustrating the most optimal six states from a test run arranged in ascending order according to error ($\varepsilon$) within an error threshold value of two. Ideally, the MPC objective is to achieve an error of zero; hence, switching from state "15" to "2" results in the minimum error and is considered the most optimal state. Switching from state "15" to "2", however, results in a control effort of six. On the other hand, switching from state "15" to "14" results in an error of "0.22" which results in an acceptable performance according to IEEE-519-2014 standards, as well as reducing control effort to two.

TABLE 7

D-STATCOM Switching States Arranged by Control Effort

| Switching State | | Error | Control Effort |
|---|---|---|---|
| Present | Next | ($\varepsilon$) | ($\Phi$) |
| 15 | 2 | 0.13 | 6 |
| 15 | 22 | 0.16 | 4 |
| 15 | 14 | 0.22 | 2 |
| 15 | 12 | 0.63 | 4 |
| 15 | 11 | 1.10 | 2 |
| 15 | 4 | 1.95 | 6 |

Figure 54:
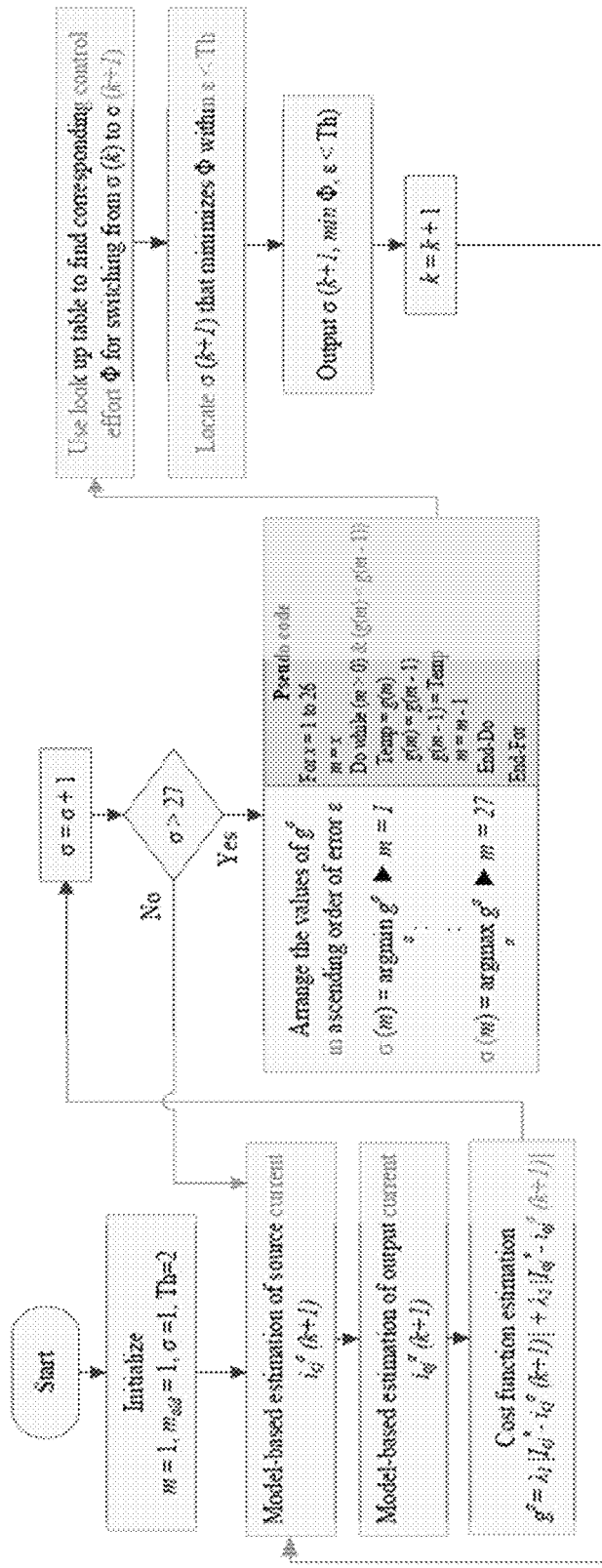
FIG. 54 is a flowchart of a controller that controls fidelity to improve reliability for the capacitor-less D-STATCOM according to an embodiment of the present disclosure.

As illustrated in FIG. 54, after arranging the next switching state number $\sigma(k+1)$ in ascending order according to error ($\varepsilon$), a lookup table based on Table 7 is used to determine the control effort ($\Phi$) for each transition. The outcome is a table that resembles Table 7. The user can specify a permissible error threshold value (Th) that guarantees performance. The outcome of the flowchart in FIG. 54 is a switching state $\sigma(k+1)$ that minimizes control effort (min$\Phi$) and is within the user-defined error threshold ($\varepsilon$<Th).

Simulation results show that using a suboptimal MPC cost function could be used to control and adjust fidelity. Also simulation results show that setting a threshold value also affects fidelity. As such concepts were proven in simulation, the present disclosure demonstrated a practical use for the technology to improve reliability.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power quality compensation method, comprising:
receiving, by a controller of a power quality compensation system, signals from one or more sensors configured to detect voltage and current from an input side and an output side of the power quality compensation system,
calculating reference signals, and
using model predictive control to track the reference signals,
wherein the power quality compensation system includes power electronic converter,
a controller configured to control the power electronic converter, and
a plurality of inductors connected to the power electronic converter, and
wherein the controller is configured to adjust switching frequency to reduce switching loss based on a threshold performance fidelity,
wherein as the performance fidelity rises above the threshold performance fidelity the controller is configured to adjust the switching frequency to a second switching frequency based on a cost function of the model predictive control which second switching frequency is a suboptimal switching frequency, and
wherein the threshold performance fidelity is user-specified.

2. The power quality compensation method according to claim 1, wherein the controller is based on a finite-set model predictive control to minimize a cost function, and wherein the cost function includes multiple terms each including an adjustable weighting function.

3. The power quality compensation method according to claim 1, wherein the controller is configured to perform auto-tuning on weight factors for multi-objective control.

4. The power quality compensation method according to claim 1, wherein the controller is configured to adjust frequency to improve reliability of the power electronic converter.

5. A non-transitory computer-readable medium storing a program that causes a power quality compensation system to perform the power quality compensation method according to claim 1.

6. A power quality compensation system, comprising:
an input filter, and
a power electronic converter, and
a controller configured to control the power electronic converter, and
a plurality of inductors connected to the power electronic converter,
wherein the controller is configured to adjust switching frequency to reduce switching loss based on a threshold performance fidelity,
wherein as the performance fidelity rises above the threshold performance fidelity the controller is configured to adjust the switching frequency to a second switching frequency based on a cost function of the model predictive control which second switching frequency is a suboptimal switching frequency, and
wherein the threshold performance fidelity is user-specified.

7. The power quality compensation system of claim 6, wherein the power electronic converter is connected to an electrical power system through the input filter, and wherein the input filter is configured to prevent signals from being coupled into the electrical power system.

8. The power quality compensation system of claim 6, wherein the power electronic converter connects to a three-phase power system, and wherein the power electronic converter includes three phase-legs each connected to a corresponding inductor.

9. The power quality compensation system of claim 6, wherein a number of phase-legs in the power electronic converter is more than a number of input phases of the power quality compensation system.

10. The power quality compensation system of claim 6, wherein the power electronic converter includes a matrix converter.

11. The power quality compensation system of claim 10, wherein each phase-leg of the matrix converter includes three bidirectional switches, and wherein the bidirectional switches includes two insulated-gate bipolar-transistor (IGBT) diode pairs connected in anti-parallel to support bidirectional current flow.

12. The power quality compensation system of claim 10, wherein the matrix converter includes four or more phase-legs.

13. The power quality compensation system of claim 12, wherein the controller switches to a redundant phase-leg when the controller detects fault.

14. The power quality compensation system according to claim 6, wherein the power quality compensation apparatus is configured to provide bus voltage regulation for an electrical power system.

15. The power quality compensation system of claim 6, wherein the controller is based on a finite-set model predictive control and includes a cost function.

16. The power quality compensation system according to claim 6, wherein the controller is configured to perform auto-tuning on weight factors for multi-objective control.

17. The power quality compensation system according to claim 6, wherein the controller is configured to adjust switching frequency to improve reliability of the power electronic converter.

\* \* \* \* \*